US007540342B1

(12) United States Patent
Ein

(10) Patent No.: US 7,540,342 B1
(45) Date of Patent: Jun. 2, 2009

(54) VIRTUAL WALKER APPARATUS

(76) Inventor: Robert John Ein, 4044 Palmetto Springs Way, Lexington, KY (US) 40513

( * ) Notice: Subject to any disclaimer, the term of this patent is extended or adjusted under 35 U.S.C. 154(b) by 220 days.

(21) Appl. No.: 10/390,309

(22) Filed: Mar. 17, 2003

Related U.S. Application Data

(60) Provisional application No. 60/366,187, filed on Mar. 21, 2002, provisional application No. 60/388,602, filed on Jun. 12, 2002.

(51) Int. Cl.
*B62D 51/04* (2006.01)

(52) U.S. Cl. .................................................... 180/19.1

(58) Field of Classification Search ................ 180/19.1, 180/19.2, 65.1, 65.5, 65.6, 65.8; 73/510
See application file for complete search history.

(56) References Cited

U.S. PATENT DOCUMENTS

| | | | | | |
|---|---|---|---|---|---|
| 3,189,345 | A | * | 6/1965 | Simpson | 482/67 |
| 3,314,494 | A | | 4/1967 | Weitzner | 180/208 |
| 3,397,883 | A | * | 8/1968 | Kiehn | 482/67 |
| 3,872,945 | A | | 3/1975 | Hickman et al. | 180/65.6 |
| 3,945,449 | A | | 3/1976 | Ostrow | 180/6.5 |
| 4,239,974 | A | | 12/1980 | Swander et al. | |
| 4,267,728 | A | | 5/1981 | Manley et al. | 73/172 |
| 4,280,578 | A | | 7/1981 | Perkins | 180/6.5 |
| 4,402,524 | A | | 9/1983 | D'Antonio et al. | |
| 4,426,884 | A | | 1/1984 | Polchaninoff | 73/172 |
| 4,456,086 | A | | 6/1984 | Wier et al. | 180/11 |
| 4,463,817 | A | * | 8/1984 | Mennesson | 180/65.5 |
| 4,554,930 | A | | 11/1985 | Kress | 600/587 |
| 4,745,930 | A | | 5/1988 | Confer | 600/592 |
| 4,771,394 | A | | 9/1988 | Cavanagh | 702/160 |
| 4,802,542 | A | | 2/1989 | Houston et al. | 180/65.5 |
| 4,809,804 | A | * | 3/1989 | Houston et al. | 180/65.5 |
| 4,985,947 | A | * | 1/1991 | Ethridge | 5/86.1 |
| 5,033,291 | A | | 7/1991 | Podoloff et al. | 73/172 |
| 5,168,947 | A | | 12/1992 | Rodenborn | 180/19.1 |
| 5,224,562 | A | * | 7/1993 | Reed | 180/6.5 |
| 5,357,696 | A | * | 10/1994 | Gray et al. | 36/136 |
| 5,390,753 | A | * | 2/1995 | Parker | 180/19.1 |
| 5,408,873 | A | | 4/1995 | Schmidt et al. | 73/862.625 |

(Continued)

OTHER PUBLICATIONS

Passive Unobtrusive Gait Monitor, Medical Automation Research Center, An Economical Device to Detect Gait Anomalies and Falls.*

(Continued)

*Primary Examiner*—Paul N Dickson
*Assistant Examiner*—Daniel Yeagley

(57) ABSTRACT

The invention uses specialized wheel sets to navigate over various surfaces. The invention has a primary drive wheel with two outrigger wheels to provide stability. In the basic motorized configuration of the apparatus, the user provides certain hand movements of the control mechanism, which in turn produces control signal(s). Incorporated into the invention is a power lifting mechanism, which aids the user to be elevated from a seated position to a standing position without any assistance. A built-in seat is incorporated within the invention. The built-in seat is a fold down type that is adjustable in height.

In the virtual mode, various user motion signals are relayed, by wireless means, to an embedded computer module, within the apparatus. This embedded computer provides control signals to operate the invention.

For ease of transport and erection, retractable/deployable units are incorporated into the design of the invention.

17 Claims, 39 Drawing Sheets

U.S. PATENT DOCUMENTS

| | | | | | |
|---|---|---|---|---|---|
| 5,411,044 | A | * | 5/1995 | Andolfi | 135/66 |
| 5,524,720 | A | | 6/1996 | Lathrop | 180/19.2 |
| 5,636,651 | A | * | 6/1997 | Einbinder | 135/67 |
| 5,795,269 | A | * | 8/1998 | Bawtree et al. | 482/66 |
| 5,862,825 | A | | 1/1999 | Leonard | 135/67 |
| 5,955,667 | A | | 9/1999 | Fyfe | 73/490 |
| 6,161,860 | A | | 12/2000 | Corneau | 280/642 |
| 6,259,372 | B1 | | 7/2001 | Taranowski et al. | |
| 6,301,964 | B1 | | 10/2001 | Fyfe et al. | 73/510 |
| 6,301,965 | B1 | | 10/2001 | Fyfe | |
| 6,308,439 | B1 | | 10/2001 | Ellis, III | 36/35 R |
| 6,394,205 | B1 | * | 5/2002 | Akuzawa | 180/19.3 |
| 6,536,544 | B1 | * | 3/2003 | Egawa et al. | 180/19.3 |
| 6,619,681 | B2 | * | 9/2003 | Gutierrez | 280/250.1 |
| 6,666,796 | B1 | * | 12/2003 | MacCready, Jr. | 482/51 |
| 2003/0010546 | A1 | * | 1/2003 | Roberts | 180/65.1 |
| 2003/0093021 | A1 | * | 5/2003 | Goffer | 602/23 |

OTHER PUBLICATIONS

Bledsoe Brace Systems, Medical Technology Inc, Walking Boot Design.*

Snug Seat Bronco Gait Trainner/Walker, Adaptivemall.com.*

* cited by examiner

VIRTUAL WALKER APPARATUS

The present application claims priority under 35 U.S.C. § 119(e) of Provisional Application No. 60/366,187 and 60/388,602, filed Mar. 21, 2002 and Jun. 12, 2002, respectively, the disclosures of which are included herein, in full, by reference.

BACKGROUND OF THE INVENTION

Technical Field

The present invention is directed to a walker apparatus adapted for operation in a basic powered and virtual mode of operation for assisting individuals that are handicapped with their mobility. This is accomplished by assisting the individual from a seated position, and operates as a powered unit, provides a seat for resting, storage of medical items and other objects and provides dual independent control. As regards the invention, a "virtual walker" is defined as a sensor driven, computer controlled, motorized walker. The sensors are located on a shoe-like device that is part of the overall apparatus which provides various force measurements which are associated with the gait of the user that are applied to the user's lower limbs during walking, turning and/or running sequences. These measurements are processed by the shoe-like device and relayed by a wireless link to the walker portion of the apparatus.

The electronics of the walker apparatus includes a microprocessor, which analyzes the gait parameters to correct any deficiencies in the user's gait and provide control guidance parameters to the mechanized portion of the walker portion of the apparatus in the virtual mode.

BRIEF DESCRIPTION OF THE PRIOR ART

Individuals with diverse disabilities ambulate with the use present day walkers that flood the marketplace. Most commercial walkers have not changed over the years from a basic design. The main objective of this invention is to provide mobility to certain handicapped individuals who are not adequately served by present day walkers. The invention will allow these individuals to move freely in many environments.

Thus, the goal of this invention is to develop a new and revolutionary walker to provide maximum mobility for certain handicapped individuals. The invention provides handicapped individuals the freedom to maneuver in most environments under conditions and operating capability not presenting and not provided by, commercial walker designs. The invention provides for an easily collapsible, stable walker for use by handicapped individuals with different types and degree of ambulatory conditions. These conditions can range from fracture, orthopedic surgery (such as joint replacement, spinal cord injuries, amputation, stroke, arthritic, and the effects of multiple sclerosis) to name a few.

One of the unique features of the invention is the ability to lift individuals from a seated position to a standing position from which the individual, then, may maneuver the walker as needed. The walker apparatus also has power steering incorporated into its design.

In the virtual mode of operation of the walker apparatus, steering and speed control is provided by gait parameters generated by the walker apparatus. Handicapped individuals who have both a single upper and lower functioning limb as the result of amputation, stroke, fracture, and or other abnormality can operate the walker apparatus with modest or no difficulty.

Senior citizens have a high mortality rate after sustaining a fracture from a fall, for example. Generally, those individuals do not expire from the broken bone but from complications, for example, pneumonia, cardiac problems, and others, as may result from immobility of the body. The invention in the walker apparatus will provide the needed exercise and stimulation of muscles and bones to alleviate these complications.

The walker portion of the invention is designed with a built-in adjustable seat to provide rest to the user and has compartments for storage of medical items such as oxygen and storage areas for other items such as groceries, gifts, books, and other necessary resorted to and relied upon by individuals.

DESCRIPTION OF THE PRIOR ART

The Walker Apparatus

Prior walker apparatus developed to assist handicapped individuals is well known. One typical patent to Hickman, U.S. Pat. No. 3,872,945. Several deficiencies are immediately noted when comparing Hickman to the present invention, namely the following: 1) a very high center of gravity which makes it highly unstable; 2) no storage space available for medical items such as oxygen bottles, tanks; and the like; and 3) not readily collapsible for ease of transport.

The patent to Perkins, U.S. Pat. No. 4,280,578, also is deficient in many respects including the following: 1) the difficulty or lack of achievability under practical conditions for the user to maintain a straight course of travel; 2) the center of gravity leading to instability; and 3) no storage space available for items of any type.

Another patent of the prior art issued to Weir et al, U.S. Pat. No. 4,456,086, suffers from several difficulties and deficiencies, including: 1) not readily collapsible; 2) a high center of gravity, as previously discussed; 3) the likelihood of high risk of injury to the user because the user is constrained by shoulder straps and knee clamps; 4) the apparatus is extremely cumbersome and not easily transportable; 5) the use of the apparatus is for riding not walking; and 6) the apparatus fails to assist the user to the seated location.

The patent by Mennesson, U.S. Pat. No. 4,463,817, also has a number of deficiencies when a comparison is made with the walker apparatus of the invention, as follows: 1) the user likely would require assistance in getting into the device; 2) the device is not fully collapsible; and 3) it is believed that patients with artificial limbs would have a difficult time operating this device.

The Houston et al, U.S. Pat. No. 4,802,542, are seen to present the following problems and deficiencies: 1) the apparatus has a very high center of gravity; 2) in many cases the requirement presents itself that someone must assist the user into the seat; 3) the user rides rather than walks; and 4) the apparatus is not easily collapsible.

Another prior art-type device is illustrated by Rodenborn, U.S. Pat. No. 5,168,947. The patent displays the following deficiencies: 1) the apparatus has a very high center of gravity; 2) the apparatus is not readily collapsible; and 3) the user likely would find it difficult to get onto the platform without assistance.

The apparatus described by Reed, U.S. Pat. No. 5,224,562, also has several deficiencies: 1) the apparatus has a high center of gravity; 2) the apparatus fails to include a seat arrangement; 3) the apparent provides no apparent arrangement for storage; and 4) a power lifting device to aid user in an upright position.

Finally, the patent to Lathrop, U.S. Pat. No. 5,524,720, includes the following deficiencies: 1) the apparatus is not readily collapsible; 2) the apparatus provides no assist to the user to get into an upright position; 3) the apparatus is extremely heavy (about 200 pounds); 4) the user of the apparatus rides rather than walks; and 5) it is believed that the upper portion of the device is not supported properly and a structural failure could develop in this area.

The Virtual Mode Operation of the Invention

Prior gait parameter acquisition systems as a footwear apparatus were developed to assist in gait analysis studies on individuals.

Prior inventions directed to this expertise include the patent to Confer, U.S. Pat. No. 4,745,930, that is seen to present the following deficiencies: 1) no force measurements acquired; 2) no internal data processor; 3) bulky wiring and 4) the inability to determine lateral motion.

In the patent to Cavanagh, U.S. Pat. No. 4,771,394, the following deficiencies are noted: 1) no force measurements acquired; 2) no internal data processor; 3) bulky wiring to external processor; 4) the device is not wireless and 5) the device is unable to determine lateral motion.

In the patent to Schmidt et al., U.S. Pat. No. 5,408,873, related to the determination of compressive forces on the foot, the following deficiencies are noted: 1) a very small contact surface to obtain force measurements; 2) the device does not measure force components in the heel area; 3) the device does not determine lateral force components; 4) the device includes no internal processor; and 5) the device includes bulky wiring to external processor.

In patents to Fyfe, U.S. Pat. Nos. 5,955,667 and 6,301,964B1, the apparatus fails to provide determination of heal strike forces in three dimensions, and includes the following deficiencies: 1) only heel force measurements are acquired; 2) no internal processor; and 3) bulky wiring to external processor.

U.S. Pat. Nos. 4,239,974 to Swander et al., 4,402,524 to D'Antonio et al., and 6,259,372B1 to Taranowski et al., to disclose aspects of discussion relating to the provision for self generated power for an apparatus.

SUMMARY OF THE INVENTION

This invention provides the necessary improvements to overcome the deficiencies noted in the prior art.

To this end, the walker portion of the invention has the following features:

1. engageable drive
2. internal lifting mechanism
3. power steering
4. adjustable holding rail
5. adjustable stability configuration
6. adjustable and retractable seat
7. extremely lightweight, and easily portable
8. operate as a powered wheelchair, with storage capability
9. forward/reverse motion capability "Kinematics" is defined as the science of motion. In human and animal movement, it is the study of the positions, angles, velocities and accelerations of body joints and segments. In humans, "gait" is described as the heel-strike, mid-stance and toe-off. An important phase of gait analysis is amount of up-down and sideways motion that an individual generates during walking or running activities. By being able to measure precise force components in the heel-strike along with the mid-stance and toe-off segment of a given gait sequence one can then perform analysis on that given individual and ascertain any abnormality in the gait.

The shoe-like portion of the invention has the following features:

1. three axis accelerometers in medial and lateral heel area
2. three axis accelerometers in medial and lateral sole area
3. piezo-electric generator in sole and heel
4. energy storage device, such as an internal battery source
5. extremely lightweight
6. wireless data link
7. error correction for data transfer The invention uses specialized wheel sets to negotiate over various surfaces. The invention has a primary drive wheel with two outrigger wheels to provide stability.

In the basic motorized configuration of the apparatus, the user provides certain hand movements of the control mechanism, which in turn produces a power assist control signal(s).

In the basic powered version the user will determine speed of the walker by sending the appropriate control signal to the drive unit. The motorized unit consists primarily of a drive motor, gear reduction unit and coupling mechanism.

The drive wheel requires some sort of tread design in order to maneuver properly in different types of terrain like standard automobile tires. Specialized tread designs are used for specific terrain or a generalized tread design that will be effective over most terrain.

The power lifting mechanism is incorporated into the invention and aids the handicapped individual to be elevated from a seated position to one of standing position without any assistance.

Steering is accomplished by control signals generated by the user to drive a reversible DC motor that rotates the forward drive wheel unit to the desired alignment direction.

A built-in seat is incorporated within the invention to provide a resting platform should the user require it during the use of the invention. The built-in seat is a fold down type that is adjustable in its height.

A built-in power source such as a lithium battery or some other power source (such as fuel cell(s), storage capacitor(s), etc.) will provide the power required for the control module. A sealed battery unit such as an AGM (Absorption Glass Mat) battery will provide the power source for the motorized units and power lifting mechanism. The purpose of the sealed AGM battery is to provide maximum power, deep discharge capability, rechargeablity, operate in extreme temperature ranges and to provide the greatest safety to the handicapped individual.

The shoe-like portion of the invention uses new technologies to create a new method to monitor and evaluate various gait parameters. Specifically these are in the areas of power development and management, embedded processing system, miniaturized sensors, error correction and miniature wireless communication links.

In the shoe-like portion of the invention, various parameters are obtained, processed and relayed to the walker portion by wireless means that relate to various gait measurements such as force, velocity and acceleration in the three-dimensional planes [pitch, roll and yaw] of each lower extremity for either animals or humans.

Miniature piezo-electric sensors obtain the force measurements in the both the sole and heel areas of each of the lower extremities. Acceleration is acquired by three-dimensional accelerometers located in the lateral and medial portions of the sole and heel areas.

The sensor data is processed in the embedded processor where the processor's programs can be altered to meet the desired objectives and where various gait parameters are determined such as acceleration, velocity, stride lengths, direction of movement and force vectors of each lower extremity at predetermined intervals. The processed data can be stored in the embedded processor memory.

This processed data is transmitted to a remote location. The transmission can either be by Infrared (IR) or Radio Frequency (RF) methods. The transmission method is determined by a given application. In some cases RF emissions can not be tolerated because of safety or interference potentials. In other conditions the local environment will interrupt IR transmission modes. The wireless link data is protected from corruption by error correction techniques.

Power is provided by internal batteries that are augmented by self contained piezo-electric power generators with storage of the generated power in storage devices such as capacitors. The capacitors in turn recharge the internal battery.

The clinicians who prescribe the use this invention will determine what parameters that are to be processed and/or where the desired output parameters are to be relayed.

The overall walker is designed for ease of use, transport and storage. In designing mobility to the walker, overall effectiveness and safety have not been compromised. For ease of transport and usage, the apparatus has multiple retractable components, which can be deployable with minimum effort and with safety checking circuits to ensure proper erection prior to its use.

The mobility of the walker is determined and measured by the ability of the walker's freedom of movement (percentage of the terrain over which the walker is mobile) and its average speed or travel time over any given terrain.

A walker's weight plus the handicapped individual's weight upon the walker and tracked footprint (the area of track which impacts any given surface) determine the resultant surface pressure that the walker imparts on any given surface. The surface strength, coupled with the walker's will determine the walker's mobility effectiveness and is defined as the walker's mobility index (WMI). The higher the WMI, the less mobile the walker becomes.

As a general rule of thumb, a lower WMI not only equates to better surface mobility but also indicates better performance on inclines, in non-stable surface (such as sand, snow, etc.), over obstacles/gaps crossings and when traversing vegetation.

From a mobility perspective, powered walkers offer the best solution for a versatile walker that is required to operate over diverse surfaces, including extremely rough surfaces, because tracks inherently provide a greater surface area than self-propelled wheels, resulting in a lower WMI.

A walker's mobility will be impacted by its traction ability over various surfaces (e.g., dry/wet soil, sand, snow, ice, carpets, rugs, etc.) and its ability to maneuver over obstacles, cross-gaps, etc.

The invention incorporates a very low WMI and uses weight reduction techniques such as using carbon composites or other similar materials to accomplish better mobility.

BRIEF DESCRIPTION OF THE DRAWINGS

Other objects and advantages of the present invention will become apparent from the following detailed description of the preferred embodiment thereof taken in conjunction with the accompanying drawings, wherein:

FIGS. 8A and 8B-14A and 14B are block diagram of the left and right foot electronics packages including several subsystem configurations.

DETAILED DESCRIPTION OF THE PREFERRED EMBODIMENTS

The Walker Apparatus the walker apparatus of the invention is illustrated in the main figure groupings of FIGS. 1-3 and 5, including the various individual figures "A". "B", "C", and so forth, within each main figure grouping. As described generally, the walker apparatus may be operated in a basic powered and virtual mode when in a fully assembled, operating condition, illustrated in FIGS. 1A and 1B. The structure of the walker apparatus also is capable of being collapsed from the fully assembled, operating condition when readied for transport, storage, or any one of a myriad of other reasons. The action of collapsing the walker apparatus of the invention may be carried out with relative ease through movement and interaction of individual components pivotally, or by "embedding" parts, more particularly telescoping a part in a manner that its movement is within an adjacent part or alongside the part, or by other well-known actions and capabilities. As previously discussed, a feature of the invention is the capability of conversion of the walker apparatus from a condition of assembly to one of disassembly, and in return to initial condition. This aspect of the invention will be discussed in greater detail as the full description of the walker apparatus unfolds. Another aspect of the invention, also previously discussed, is the built-in capability of prevention of the walker apparatus functioning in the assembled condition unless and until all of the structural components are properly positioned, for example, in a fully extended or fully pivoted operative disposition of use when returned from the collapsed position.

Figure 1A:
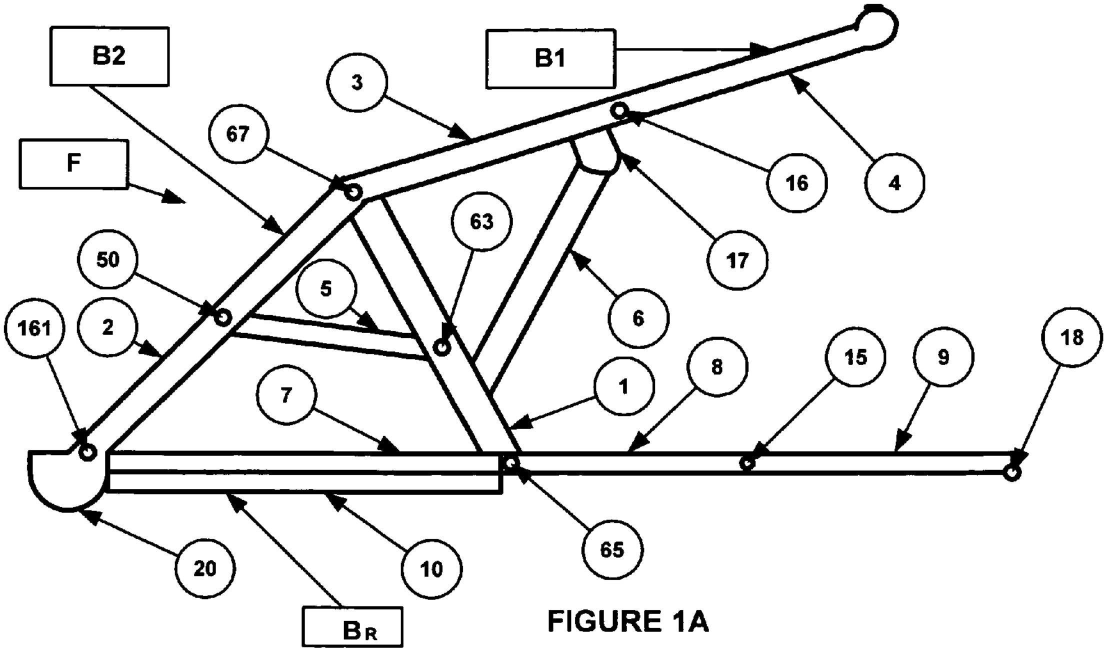
FIG. 1A is a side view of the invention in the operational engaged mode configuration.
Figure 1B:
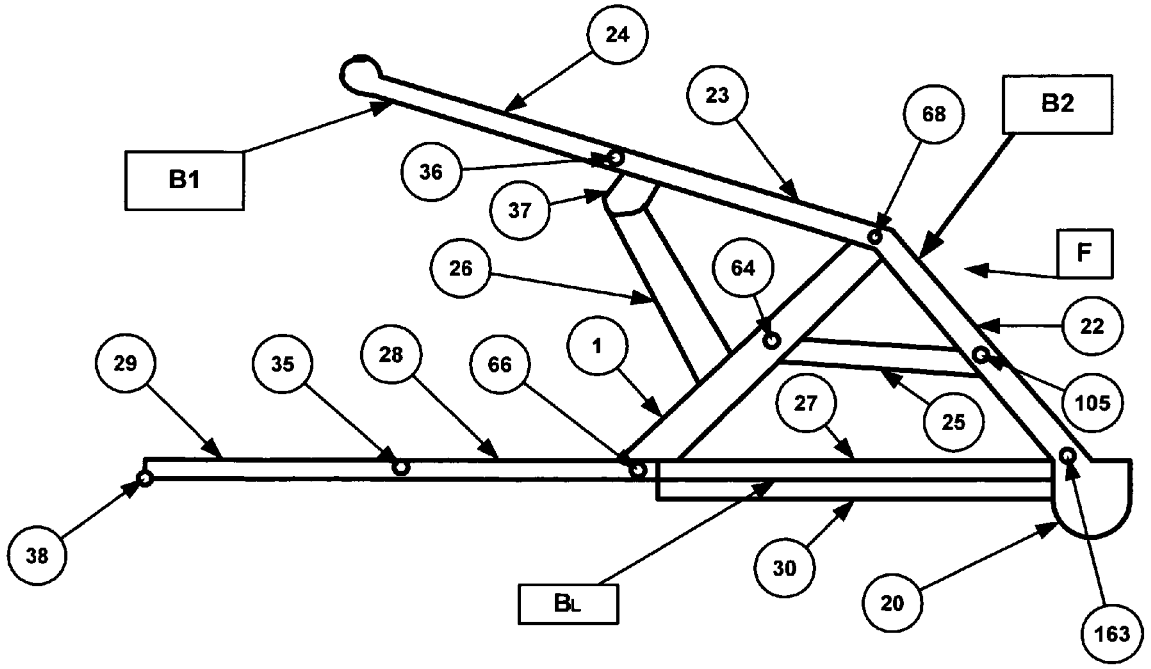
FIG. 1B is the opposite side view of the invention in the operational engaged mode configuration.
Figure 1C:
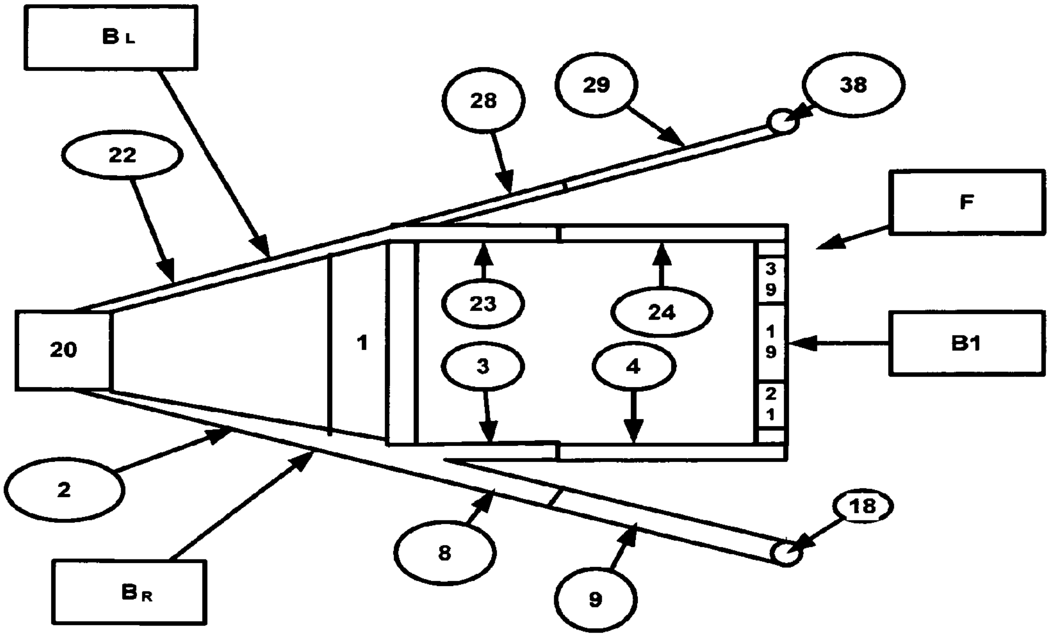
FIG. 1C is the plan view of the invention in the operational engaged mode configuration.
Figure 1D:
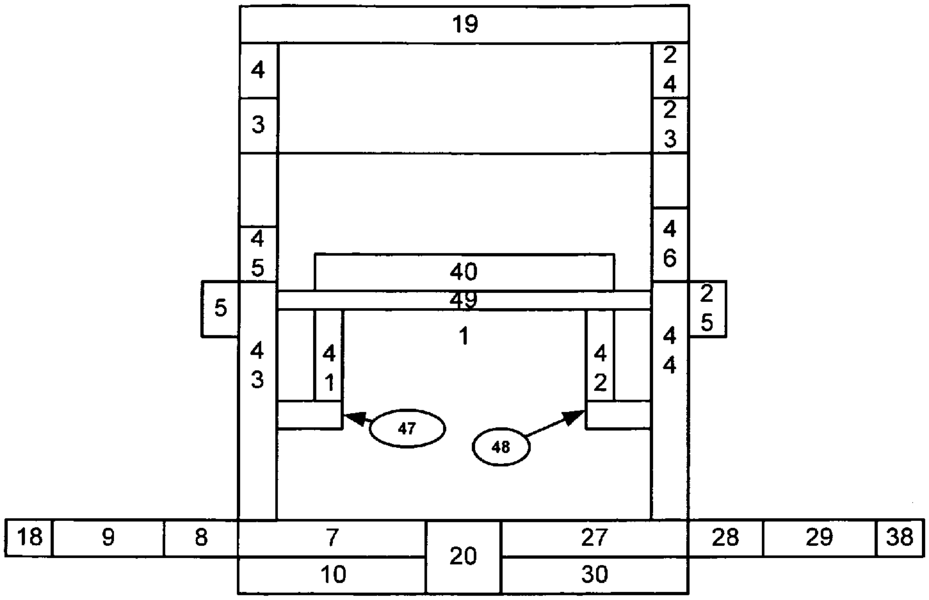
FIG. 1D is the end view of the invention in the operational engaged mode with the seat-engaged configuration.

FIGS. 1A-1C comprising two elevation views and a plan view illustrate the walker apparatus of the invention by their schematic presentation of the various structural elements that make up frame F. The discussion within the written description in many instances identifies the structural elements as right-side and left-side structural elements. Typically, the identifying nomenclature, "right-side," will refer to the structural elements in FIG. 1A, when viewing the walker apparatus from the front. Thus, the identifying nomenclature, "left-side", will refer to the structural elements in FIG. 1B, also when viewing the walker apparatus from the front. However, if the structural elements of the walker apparatus are viewed from the rear the identifying nomenclature will reverse, as may be appreciated, in connection with the description and a consideration of operation, for example, of the apparatus for operating the lifting assembly B2 seen in FIG. 1C, but principally as seen in FIG. 1F.

Frame F may be considered to provide generally a base B, a lifting bar handle 19 of lifting bar assembly B1, and intermediate mounting structure B2 carried by the Base B for supporting the lifting bar assembly B1 over base B.

Referring specifically to FIGS. 1A and 1B, base B includes a leg support unit ($B_R$) including segments 7, 8 and 9, together with leg support unit ($B_L$) that includes leg segments 27, 28, and 29 (base B and leg support units $B_R$ and $B_L$ are considered to be the same). Each leg segment of the leg support units ($B_R$) and ($B_L$), and for that matter other component parts of the walker apparatus to be described as the description continues, have structural specification characteristics of length, width, and cross-section, for example, permitting the components to meet conditions of operation requiring strength and other characteristics of performance under various and differing operating conditions. These features and others, such as capabilities of materials, manufacture, and construction for the most part are considered to be within the knowledge of those skilled in the art. Therefore, unless it is important for a full and complete understanding of the invention and its important aspects, the description will not launch into any specific discussion of any individual component. The discussion, however, as it unfolds will address with a degree of specificity features of the structure regarding the capability of conversion of the walker apparatus from, and in return to, an operative mode of operation.

Leg segments 7-9 of the leg support unit A ($B_R$) and leg segments 27-29 of leg support unit ($B_L$) of the walker apparatus, and the other structural components to be described, are connected together in a manner to accommodate any one or more of several required actions when it I required to collapse the structure of the walker apparatus from the operative condition of frame F as seen in FIGS. 1A-1C. This requirement generally follows a desire, for example, to store or transport the walker apparatus from one location to another. Following a period of storage or movement of the walker during transport it will be necessary to return the structures to their assembled, operative state of operation of FIGS. 1A-1C. This operation may be carried out with relative ease reversing the operation therefore concluded.

Figure 3A:
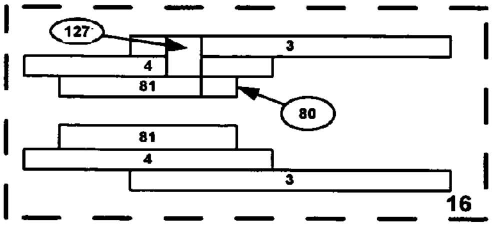
FIGS. 3A-3D are views in section of the form of locking configuration of several structural components of the walker apparatus in the operational mode configuration.
Figure 3B:
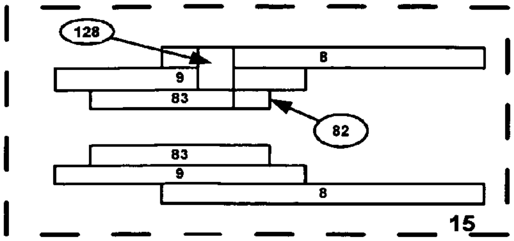
Figure 3C:
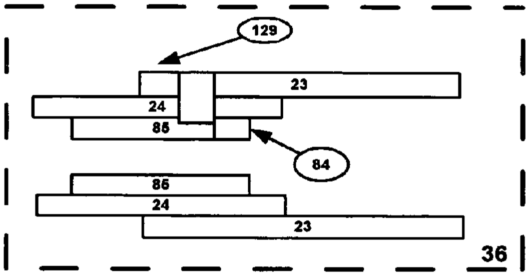
Figure 3D:
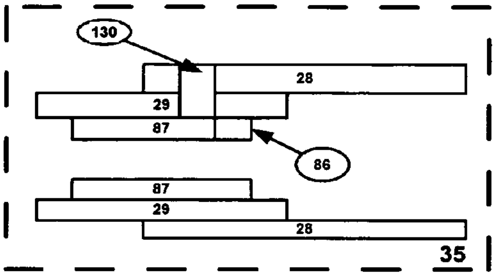
Figure 3E:
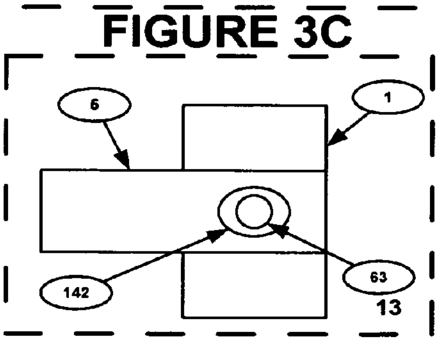
FIGS. 3E-3N are views illustrating further forms of locking configurations of structural components of the walker apparatus in the operational mode configuration.
Figure 3F:
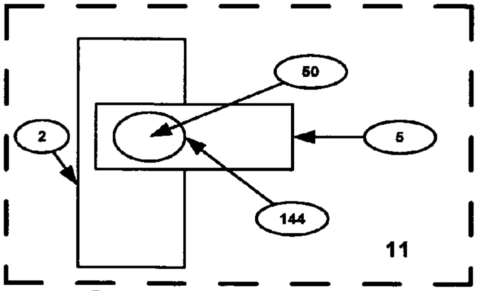
Figure 3G:
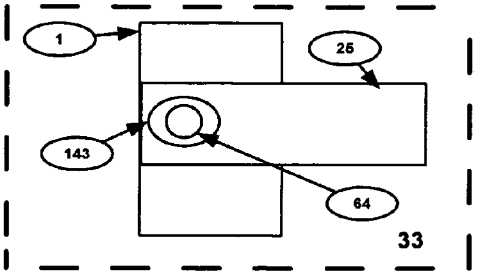
Figure 3H:
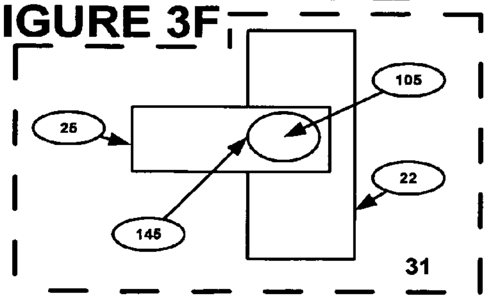
Figure 3I:
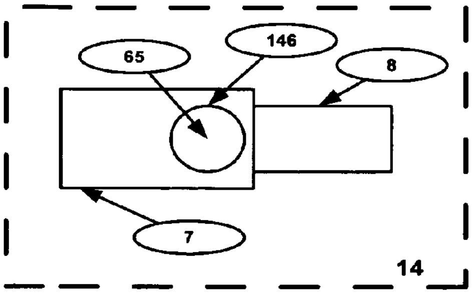

FIGS. 3B and 3I illustrate the connection of segments of the leg support unit ($B_R$) including leg segments 8 and 9, and leg segments 7 and 8, respectively.

FIG. 3B is a cross-section of the mating end portions of the leg segments 8 and 9 together with mating sleeve 83 that surrounds the segments. The mating sleeve 83 is attached to segment 9 in a manner permitting movement of segment 8 relative to the attached components. The mating sleeve 83 may be attached to the segment 9 by an adhesive compound or the equivalent and coupled by a quick-release locking mechanism unit 128 into the right-side main lift bar section. The micro-switch 82 is engaged (closed) under the condition that the quick-release locking mechanism unit 128 is properly and remains properly installed. Another switch is responsive to the positioning of leg segment 9, as the leg segment 9 locates to the fully extended position relative to the segment 8.

Further specifies to amplify upon the discussion above and the discussion below regarding FIG. 3D, referring leg segment 8 and 9, and leg segments 28 and 29, will be brought out during the discussion directed to FIGS. 5E and 5F as the description unfolds.

FIG. 3I is a side elevation view of the mating end portions of leg segments 7 and 8 together with mating sleeve unit 146. Leg segments 7 and 8 are attached by the mating sleeve unit 146. Leg segments 7 and 8 are attached by the mating sleeve unit 146 and held in place by locking fastener 65 cooperatively located within the mating sleeve unit 146.

Figure 3J:
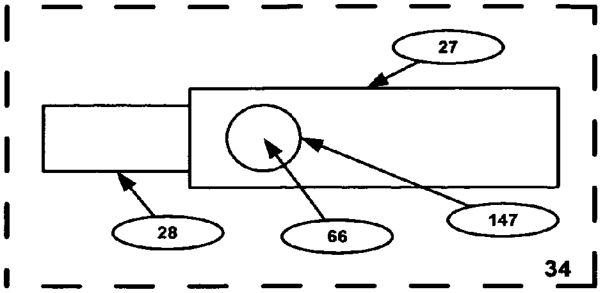
Figure 3K:
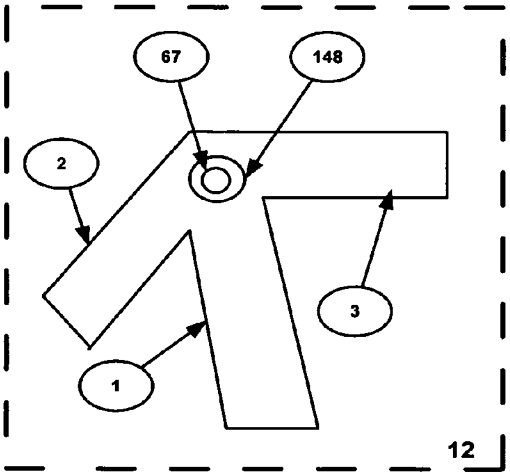
Figure 3L:
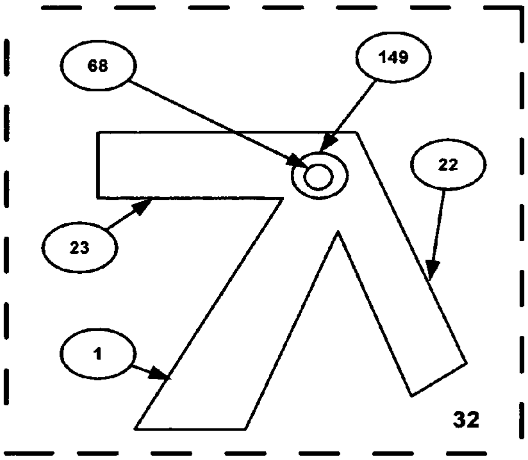
Figure 3M:
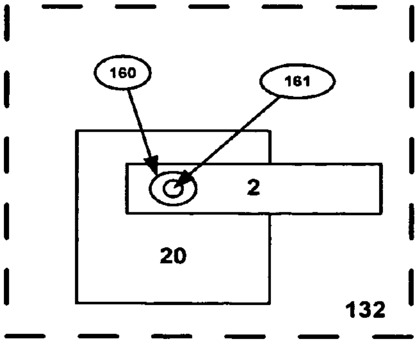
Figure 3N:
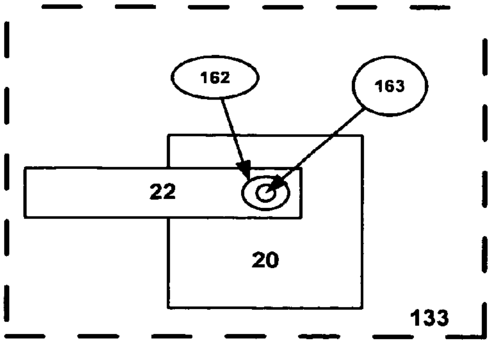

FIGS. 3D and 3J illustrate the connection of leg segments of the leg support unit (B) including leg segments 28 and 29, and leg segments 27 and 28, respectively.

FIG. 3D is a cross-section of the mating end portions of the leg segments 28 and 29 together with a mating sleeve 87 that surrounds leg segments 28 and 29. The mating sleeve 87 is attached to leg segment 29 in a manner permitting movement of leg segment 28 relative to the attached components. The mating sleeve 87 may be attached to leg segment 29 by an adhesive compound or the equivalent and coupled by a quick release locking mechanism unit 130 into the left-side main lift bar section. A micro-switch 86 is engaged (closed) under conditions that the quick release mechanism 130 is properly and remains properly installed. Another switch is response to the positioning of leg segment 29, as the leg segment locates to the fully extended position relative to leg segment 28.

FIG. 3J is a side elevation view of the mating end portions of leg segment 27 and 28 together with a mating sleeve unit 147. Leg segments 27 and 28 are attached by the mating sleeve unit 147 and held in place by a locking fastener 66 cooperatively located within the mating sleeve unit 147.

A drive mechanism 20 provides a mounting for one end of each leg support unit ($B_R$) and ($B_L$) at a front location of the walker apparatus, and a pair of outrigger wheel assemblies 18 and 38 provides a mounting at the opposite end of each leg support unit $B_R$ and $B_L$, at a rear location of the walker apparatus. The leg support units $B_R$ and $B_L$ come together at the front location within the region of drive mechanism 20 and may be connected to a housing of the drive mechanism using any one of various types of mounting configurations providing a secure, strong, and stable support for the walker apparatus.

The outrigger wheel assembly 18 is mounted on leg segment 9 of the leg support unit ($B_R$) within the vicinity of its end furthest removed from the front location. Similarly, the outrigger wheel assembly 38 is mounted on leg segment 29 of leg support unit ($B_L$) within the vicinity of its end furthest removed from the front location. Again, any of the various types of mounting configurations providing a secure, strong, and stable support for the outrigger wheel assemblies 18 and 38 on a respective leg segment of the leg support units ($B_R$) and ($B_L$) may be used.

The leg support units ($B_R$) and ($B_L$) each diverge along their rearward extension so that wheel assemblies 18 and 38 together the drive mechanism 20 define a three-point support of the base B on a surface. The angle of divergence is acute, and may be in the range, for example, of from approximately 20° to 40° as determined by operating requirements. Typically, a three-point support will permit ease of movement of the walker apparatus both in the basic powered and virtual mode of operation and appropriate, internal structural strength and stability characteristics required for safety in operation of apparatus of the type described.

The intermediate mounting structure B2 of Frame F (FIGS. 1A-1C) includes three cooperating triangular frameworks, each substantially equilateral in outline. The frameworks may be seen in FIGS. 1A-1C. One framework comprises incline main strut 2, leg support unit ($B_R$), and a frame member 1. Another framework comprises incline main strut 22, leg support unit ($B_L$), and frame member 1. Yet another framework comprises frame member 1 and the incline main struts 2 and 22. The frameworks also introduce substantial support capability required by movable apparatus, such as the walker apparatus of the present invention.

The intermediate structure B2 of frame F is mounted on Base B in a manner that is now addressed.

The framework illustrated in FIG. 1A, formed partially by incline main strut 2 and frame member 1, is mounted on leg support unit ($B_R$) between drive mechanism 20 and the point of connection of segments 7 and 8.

Frame member 1 illustrated in FIGS. 1A-1C is a planer, generally rectangular, planar construction. The frame member 1 extends in one direction (horizontal) between leg support units ($B_R$) and ($B_L$), throughout a distance equal to the angle of divergence of the leg support units, and the spaced location of the connection of leg segments 7 and 8 relative to the drive mechanism 20. The frame member 1 also extends from a location within the leg support units ($B_R$) and ($B_L$) vertically to the region of an axis through the pivot locations 65 and 66. The mating sleeve unit 146 is of a length to extend into the confronting edge surface of frame member 1 throughout a distance considered satisfactory. The locking fastener 65 secures the parts in their mounted position.

The lower end of the main incline strut 2 is connected to drive mechanism 20. As discussed, the drive mechanism 20 may be supported within a housing including a neck portion. The main incline strut 2 extends toward the neck portion and a location substantially along its vertical axis, on the right side. A mating bearing sleeve 160 is received through the main strut 2 into the neck. A pivot fastener 161 secures the components.

The other end of main incline strut 2 and frame member 1 are connected together completing the framework. To this end, a mating bearing sleeve unit 148 is received through main strut 2 and into the confronting edge surface of frame member 1. A pivot fastener 67 completes the connection and secures the components.

The framework illustrated in FIG. 1B, formed partially by incline main strut 22 and frame member 1, is mounted on leg support unit ($B_L$) between drive mechanism 20 and the point of connection of segments 27 and 28. The mounting particulars are similar to those described regarding the mounting of the framework of FIG. 1A.

The opposed, confronting edge of frame member 1 is disposed within the region of the pivot connection of leg segments 27 and 28 of leg support unit ($B_L$) and the mating sleeve unit 147 is extended into the surface along the edge of frame member 1 uniting the frame member and leg segments 27 and 28. The locking fastener 66 secures the parts in their mounted position.

The lower end of the main incline strut 22 is connected to drive mechanism 20. To this end, the main incline strut 22 extends toward the neck portion and a location substantially along its vertical axis, on the opposite side of the mounting location of main incline strut 2. A mating bearing sleeve 162 is received through the incline main strut 22 into the neck. A pivot fastener 163 secures the components.

Finally, the other end of the main incline strut 22 and frame member 1 are connected together completing the framework. To this end, a mating bearing sleeve unit 149 extends through main incline strut 22 into the confronting edge surface of frame member 1. A pivot fastener 68 completes the connection and secures the components.

A brace unit 5 extends between frame member 1 and the main incline strut 2 of the framework within the right-side of the intermediate support structure B2. The brace unit 5 is located in a disposition somewhat closer to the apex than the base of the framework. It is believed that this choice of location better enhances the structural support capability provided by the framework and, in turn, by the intermediate support structure B2 in support of the lifting bar assembly B1.

The brace 5 is located to the inside of the main incline strut 2 and along the edge of the side of frame member 1. A mating bearing sleeve unit 142 is received through one end of the brace and into the frame member 1. A pivot fastener 63 is received by the mating bearing sleeve and secures the structures together. Similarly, a mating bearing sleeve unit 144 is received through both the brace 5, within the region of the other end, and main incline strut 2. A locking fastener 50 is received into the mating bearing sleeve to secure the structures.

A similar brace unit 25 extends between frame member 1 and the main incline strut 22 of the left-side framework, in the orientation discussed above. A mating bearing sleeve 145 is received through both the brace 25 and main incline strut 22. A locking fastener 105 is received into the mating bearing sleeve to secure the structures. A mating bearing sleeve unit 143 is also received through the brace 25 and into the frame member 1. A pivot fastener 64 is received by the mating bearing sleeve unit 143 and secures the parts together.

The brace unit 25 is disposed in same general orientation of the brace unit 5. As such, the brace unit 25 also extends between the main incline strut 22 and the frame member 1 somewhat closer to the apex of the framework for the reasons previously stated.

The lifting bar assembly B41 is best seen in FIG. 1C includes a U-shaped lifting bar member having a right-side leg, a left-side leg and a lifting bar handle 19. The right-side leg (also illustrated in FIG. 1A) includes a lifting bar section 3 and a lifting bar extension 4, while the left-side leg (also illustrated in FIG. 1B) includes lifting bar section 23 and a lifting bar extension 24. The lifting bar handle 19 that connects lifting bar extension sections 4 and 24 at an end functions as a lifting bar handle. FIG. 1C illustrates the lifting bar assembly in the lifting mode of operation with both the right-side lifting bar section 23 and lifting bar extension section 24, and left-side lifting bar section 3 and lifting bar extension section 4 in their fully extended configuration. FIG. 1C also illustrates the leg segment units $B_R$ and $B_L$ including leg segments 7-9 (now on the left-side) and leg segments 27-29 (now on the right-side) in their fully extended configuration, also. In addition, FIG. 1C illustrates generally the location of control units 21 and 39, perhaps better illustrated in FIGS. 4A and 4B, respectively. Thus, the control unit 21 comprises the left control unit and control unit 39 comprises the right control unit.

Lifting bar section 3 and lifting bar extension section 4 of the right-side leg of lifting bar member are connected together using the same structural concepts as applied in connecting leg segments 8 and 9 of the right-side leg support unit.

FIG. 3A is a cross-section of the mating end lengths of the lifting bar section 3 and lifting bar extension section 4 together with a mating sleeve 81 that surrounds both the lifting bar section 3 and lifting bar extension section 4. The mating sleeve 81 is attached to the lifting bar extension section 4 in a manner permitting movement of lifting bar section 3 relative to the attached components. The mating sleeve 81 is attached to lifting bar extension section 4 by an adhesive compound or the equivalent and coupled by a quick-release locking mechanism unit 127 into the right-side lifting bar section 3. A micro-switch 80 is engaged (closed) and remains engaged under conditions that the quick-release locking mechanism unit 127 is properly installed. Another switch is responsive to the positioning of lifting bar extension, as the lifting bar extension 4 locates to the fully extended position relative to lifting bar section 3.

Lifting bar section 23 and lifting bar extension section 24 of the left-side leg of lifting bar member, also connected together, are connected according to the structural concepts employed in connecting the sections of the right-side leg of the lifting bar assembly.

FIG. 3C is a cross-section of the mating end lengths of the lifting bar section 23 and lifting bar extension section 24 together with a mating sleeve 85 that surrounds the lifting bar section 23 and lifting bar extension section 24. The mating sleeve 85 is attached to the lifting bar extension 24 in a manner permitting movement of lifting bar section 23 relative to the attached components. The mating sleeve 85 is attached to lifting bar extension section 24 by an adhesive compound or the equivalent and coupled by a quick-release locking mechanism unit 129 into the left-side lifting bar section 23. A micro-switch 84 is engaged (closed) and remains engaged under conditions that the quick-release locking mechanism unit 129 is properly installed. Another switch is responsive to the positioning of the lifting bar extension section 24 as the lifting bar extension section moves to and locates in the fully extended position relative to lifting bar section 23.

The lifting bar assembly B1 extends from and is secured to frame F at the pivot locations 67 and 68, also serving as pivot mounting locations for the right-side and left-side frameworks illustrated in FIGS. 1A and 1B, respectively. To this end, the mating bearing sleeve unit 148 received through main incline strut 2 is also received through lifting bar section 3 before extending into the confronting side surface of frame member 1. The pivot fastener 67 retains the structures in place. In a similar manner, the mating bearing sleeve unit 149 received through lifting bar section 23 before extending into the confronting side surface of frame member 1. The pivot fastener 68 retains the structures in place.

A linkage arm 6 extends between a bolt/nut assembly unit 88 of a lifting bar drive mechanism 45 and an anchor assembly 17. The anchor assembly 17 is supported by lifting bar section 3 within the region of its ends near the location of connection of lifting bar section 3 and lift bar extension section 4. The anchor assembly 17, for example, may include a pair of confronting plates and the linkage arm 6 may be received between the plates. A pivot pin (not shown) also received through the plates will secure the linkage arm for movement following movement of the bolt/nut assembly unit 88, as will be discussed. The bolt/nut assembly 88 may be connected to the linkage arm 6 by any means that may be convenient and applicable for the movements to be obtained.

Figure 5A:
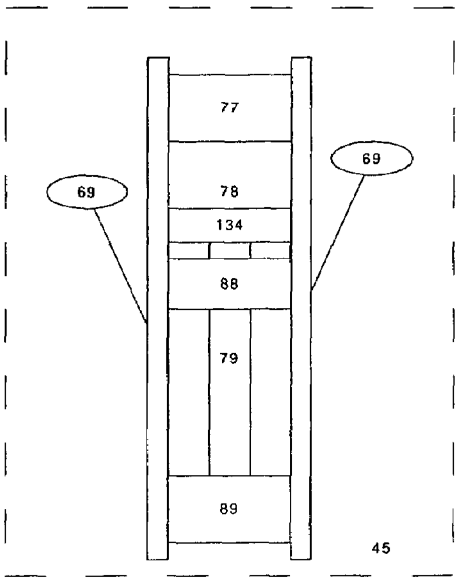
FIGS. 5A-5F are views in section of several drive mechanisms for actuating alternately a pair of spaced cut-off switches.

The lifting bar drive mechanism 45, referring now to FIG. 5A, includes a sleeve assembly 69 having a pair of spaced legs extending from a web having an elongated length. The web may be secured to the rear surface, on the "left-side", as seen in FIG. 1A, of frame member 1 in any convenient manner. The spaced legs of the sleeve define a channel, and a lip extending along each leg serves to retain the bolt/nut assembly unit 88 within the channel permitting only movement in one linear direction of the other.

With reference to FIG. 5A, the lifting bar drive mechanism 45 includes a motor 77, a gear box 78, a screw drive unit 79, and a screw holder switch unit 89. The screw drive unit 79 is coupled to the gear box 78 and supported by the screw holder switch unit 89 for during the bolt nut assembly unit 88 in one or the other of the opposite directions as determined by motor 77 operation.

A cutoff switch 134 is located within the sleeve assembly 69 in position for engagement by bolt/nut assembly unit 88 when it reaches its maximum point of travel in one direction. Therefore, when bolt/nut assembly unit 88 completes the path of travel in that direction it contacts and activates the cutoff switch 134. Similarly, when bolt/nut assembly unit 88 reaches its maximum point of travel in the other direction it contacts and activates screw holder/switch unit 89.

A linkage arm 26 extends between a bolt/nut assembly unit 99 of a lifting bar drive mechanism 46 and an anchor assembly 37. The connection of components and the manner of their movement and interaction duplicates that of the structures just described. Thus, anchor assembly 37 is supported by lifting bar section 23 within the region of its ends, near the location of connection of lifting bar section 23 and lifting bar extension 24. The anchor assembly 37, for example, also may include a pair of confronting plates for receipt of the linkage arm 26. A pivot pin (not shown) is received through the plates to secure the linkage arm for movement following movement of the bolt/nut assembly unit 99, as will be discussed. The bolt/nut assembly unit 99 may be connected to the linkage arm 26 by any means that may be convenient and applicable for the movements to be obtained.

Figure 5B:
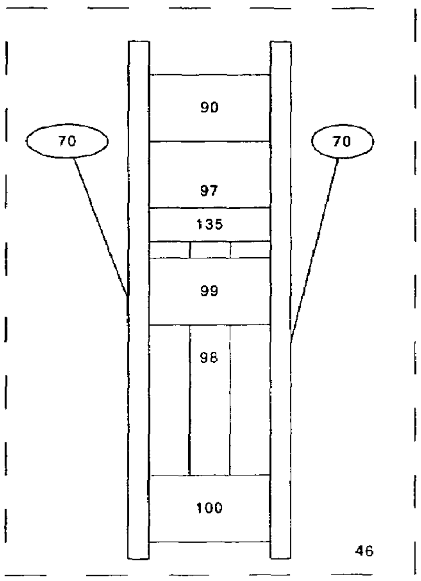

The lifting bar drive mechanism 46, referring now to FIG. 5B, includes a sleeve assembly 70 having a pair of spaced legs extending from a web elongated in length. The web is secured along its length to the rear surface, on the "right-side", as seen FIG. 1B, of frame member 1 in any convenient manner. The spaced legs define a channel, and a lip extending along each leg serves to retain the bolt/nut assembly 99 within the channel permitting only movement in one linear direction of the other.

With reference to FIG. 5B, the lifting bar drive mechanism 46 includes a motor 90, a gear box 97, a screw drive unit 98, and a screw holder switch unit 100. The screw drive unit 98 is coupled to the gear box 97 and supported by the screw holder switch unit 100 for during the bolt nut assembly unit 99, as determined by reversible motor 90.

A cutoff switch 135 is located within the sleeve assembly 70 in position for engagement by bolt/nut assembly unit 99 when it reaches its maximum point of travel in one direction. Therefore, when bolt/nut assembly unit 99 completes the path of travel in that direction it contacts and activates the cutoff switch 135. Similarly, when bolt/nut assembly unit 99 reaches its maximum point of travel in the other direction it contacts and activates screw holder/switch unit 100.

Operations of similar nature to that described through movement of the lifting bar handle 19 of the lifting bar assembly are carried out in response to actions in the collapse of lifting bar sections 3 and 23, together with lifting bar extension sections 4 and 24 of the right-side and left-side lifting bar handle, respectively, and leg segments 8 and 28, together with leg segments 9 and 29 of the right-side and left-side segment units $B_R$ and $B_L$, respectively.

Figure 5C:
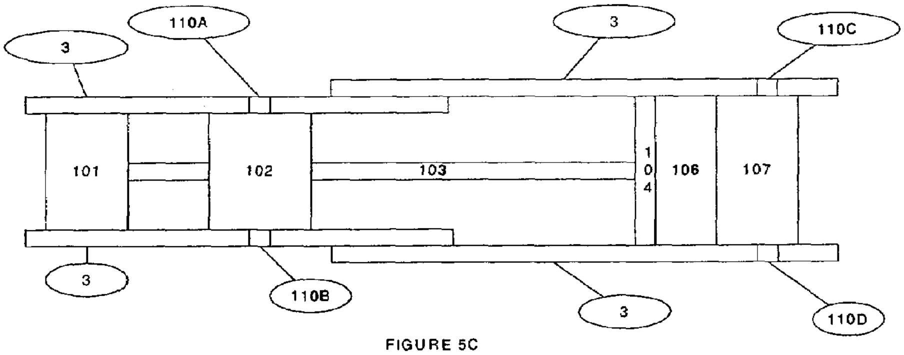

Referring to FIG. 5C, lifting bar section 3 is cylindrical in cross-section and includes a short-length cylindrical section having an outer diameter of slightly smaller dimension than the inner diameter of the major length. The outer cylinder is fixed while the short-length section is supported in movement and adapted to slide within the larger cylinder of the lifting bar section 3 to and fro between opposite, predetermined limit positions.

A motor 107 and a gear box unit 106 coupled to the motor are fixed within the major length of lifting bar section 3 by a pair of set screws 110C and 110D that cooperate within openings in the cylinder. A screw drive unit 103 is coupled to the gearbox unit 106 at one end and supported at the other end by a housing of cut-off switch 101. A bolt nut assembly 102 is carried by the screw drive unit 103 and driven in one direction or the other by the motor 107. The short-length cylinder is connected to the bolt nut assembly 102 by a set screw 110A and 110B in the manner of mounting motor 107. Thus, the short-length cylindrical section and bolt nut assembly 102 move in unison under control of the motor. Cutoff switch 101 is activated by the bolt nut assembly 102 following movement to a predetermined limit in one direction and cutoff switch 104 is activated by the cylindrical surface of the short-length cylinder following movement in the opposite direction to a predetermined limit. The motor 107 is activated to drive in one rotational direction of the other determined by the positioning of switch 72 of the left-side control unit 21 (see FIG. 4A).

The left-side lifting bar handle including lifting bar section 23 and lifting bar extension section 24 may be collapsed and then returned to the operating mode of the walker apparatus, providing the same functions and switch activations discussed above.

Figure 5D:
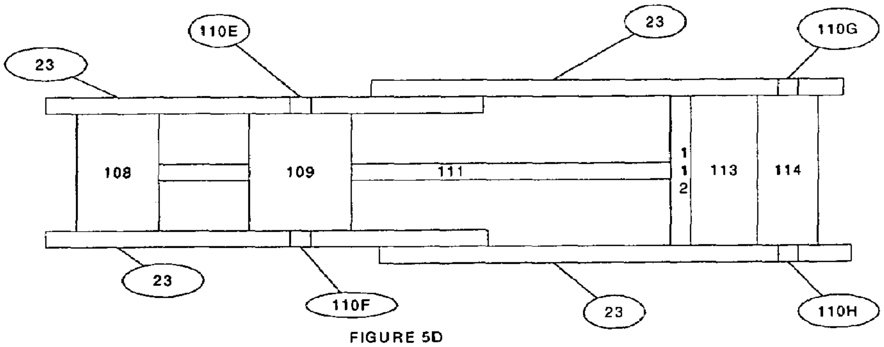

Turning to FIG. 5D, lifting bar section 23 is cylindrical in cross-section and includes a short-length cylindrical section having an outer diameter of slightly smaller diameter than the inner diameter of the major length. The outer cylinder is fixed while the short-length section is supported in movement and adapted to slide to and fro between opposite, predetermined limit positions.

A motor 114 and a gear box unit 113 coupled to the motor are fixed within the major length of lifting bar section 23 by a pair of set screws 110G and 110H that cooperate within openings in the cylinder. A screw drive unit 111 is coupled to the gearbox unit 113 at one end and supported at the other end by a housing of cut-off switch 108. A bolt nut assembly 109 is carried by the screw drive unit 111 and driven in one direction or the other by the motor 114. The short-length cylinder is connected to the bolt nut assembly 109 by a set screw 110E and 110F in the manner of mounting motor 114. Thus, the short-length cylindrical section and bolt nut assembly 109 move in unison under control of the motor. Cutoff switch 108 is activated by the bolt nut assembly 109 following movement to a predetermined limit in one direction and cutoff switch 112 is activated by the cylindrical surface of the short-length cylinder following movement in the opposite direction to a predetermined limit. The motor 114 is activated to drive in one rotational direction of the other determined by the positioning of switch 92 of the left-side control unit 39 (see FIG. 4B).

The following discussion is directed to the structure of leg support units $B_R$ and $B_L$ and particularly the action of collapsing leg segments 8 and 9, and leg segments 28 and 29, as well as the return of the leg segments to the operative positioning.

Figure 5E:
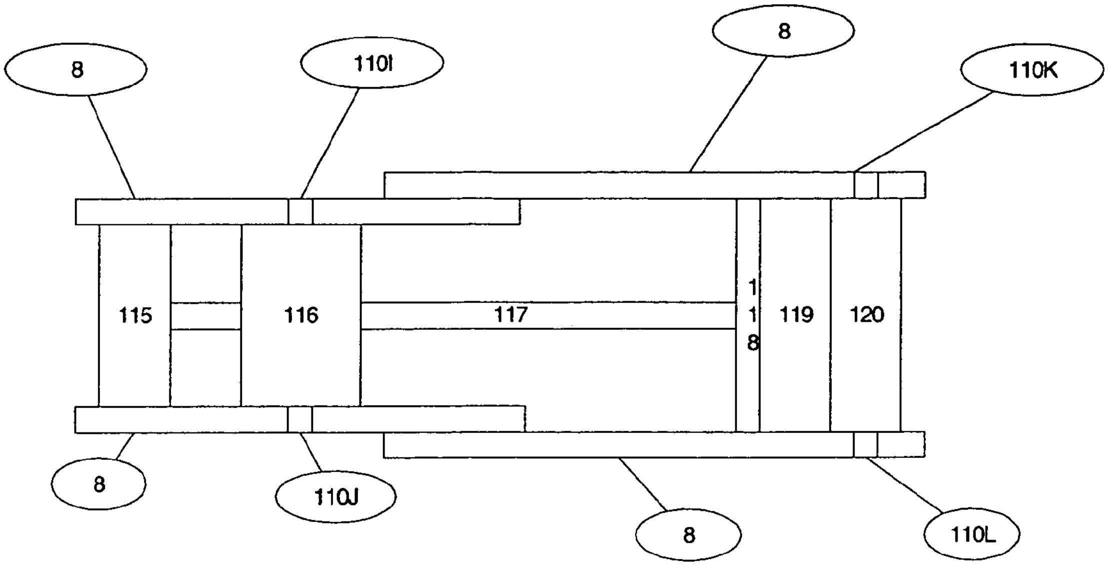

Referring to FIG. 5E, leg segment 8 is cylindrical in cross-section and includes a short-length cylindrical section having an outer diameter of slightly smaller dimension than the inner diameter of the major length. The outer cylinder is fixed while the short-length section is supported in movement and adapted to slide to and fro between opposite, predetermined limit positions.

A motor 120 and a gear box unit 119 coupled to the motor are fixed within the major length of leg segment 8 by a pair of set screws 110K and 110L that cooperate within openings in the cylinder. A screw drive unit 117 is coupled to the gearbox unit 119 at one end and supported at the other end by a housing of cut-off switch 115. A bolt nut assembly 116 is carried by the screw drive unit 117 and driven in one direction or the other by reversible motor 120. The short-length cylinder is connected to the bolt nut assembly 116 by a set screw 110I and 110J in the manner of mounting motor 120. Thus, the short-length cylindrical section and bolt nut assembly 116 move in unison under control of the motor 120. Cutoff switch 115 is activated by the bolt nut assembly 116 following movement to a predetermined limit in one direction and cutoff switch 118 is activated by the cylindrical surface of the short-length cylinder following movement in the opposite direction to a predetermined limit. The motor 120 is activated to drive in one rotational direction of the other determined by the positioning of switch 73 of the left-side control unit 21 (see FIG. 4A).

Figure 5F:
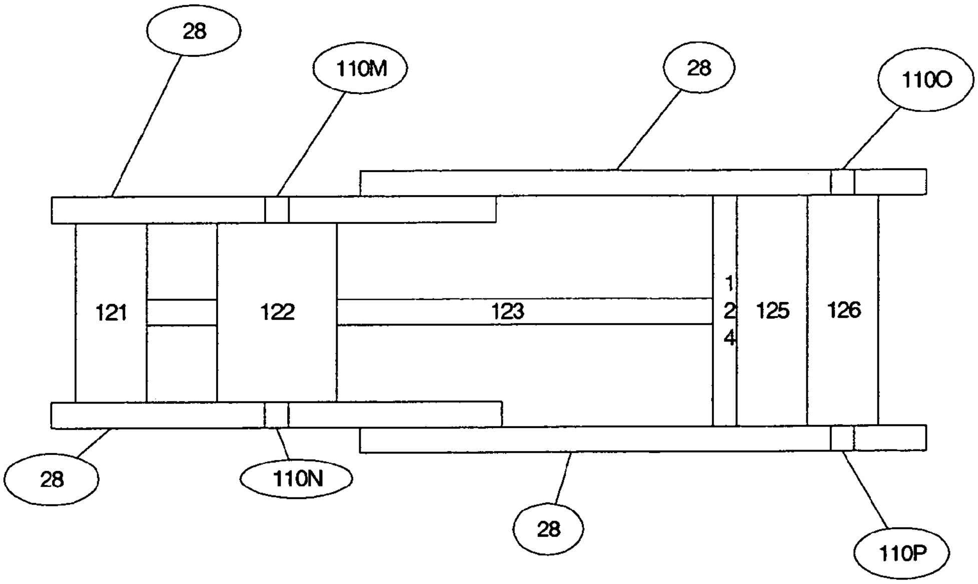

Referring to FIG. 5F, leg segment 28 is cylindrical in cross-section and includes a short-length cylindrical section having an outer diameter of slightly smaller dimension than the inner diameter of the major length. The outer cylinder is fixed while the short-length section is supported in movement and adapted to slide to and fro between opposite, predetermined limit positions.

A motor 126 and a gear box unit 125 coupled to the motor are fixed within the major length of leg segment 28 by a pair of set screws 110O and 110P that cooperate within openings in the cylinder. A screw drive unit 123 is coupled to the gearbox unit 125 at one end and supported at the other end by a housing of cut-off switch 121. A bolt nut assembly 122 is carried by the screw drive unit 123 and driven in one direction or the other by reversible motor 126. The short-length cylinder is connected to the bolt nut assembly 122 by a set screw 110M and 110N in the manner of mounting motor 126. Thus, the short-length cylindrical section and bolt nut assembly move together under control of the motor. Cutoff switch 121 is activated by the bolt nut assembly 122 following movement to a predetermined limit in one direction and cutoff switch 124 is activated by the cylindrical surface of the short-length cylinder following movement in the opposite direction to a predetermined limit. The motor 126 is activated to drive in one rotational direction of the other determined by the positioning of switch 93 of the left-side control unit 39 (see FIG. 4B).

A non-skid assembly unit 10 is mounted to the underside of the leg support unit $B_R$ substantially along the length of segment 7. A similar non-skid assembly unit 30 is mounted to the underside of the leg support unit $B_L$ substantially along the length of segment 27 (see FIGS. 1A, 1B, and 1D). The lower surface of non-skid assembly units 10 and 30 contains an irregular pattern and also has a capability of creating a force of suction between the non-skid assembly unit and the surface on which the walker apparatus resides during the lifting/lowering operations of the lift bar assembly.

Figure 1E:
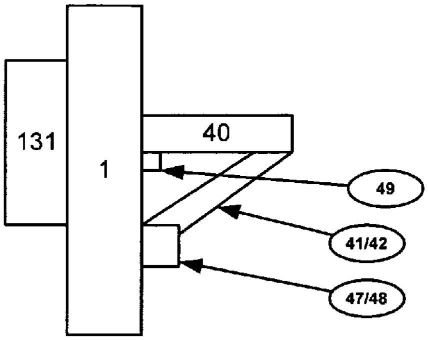
FIG. 1E is partial side view of the FIG. 1D.
Figure 1F:
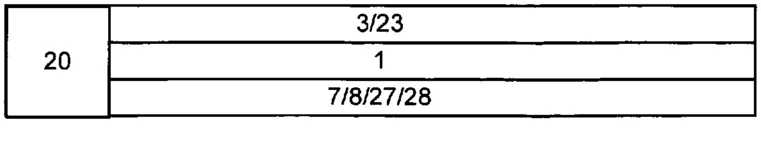
FIG. 1F is a side view of the walker apparatus in collapsed configuration.

The lifting bar assembly B1, deployed in the manner of operation, includes a support 49 and a seat 40 secured to the support in a cantilever fashion, see FIG. 1E. Support 49 extends between a pair of spaced lifting bar mechanisms 45 and 46 described heretofore in connection with the discussion directed to FIGS. 5A and 5B, and is connected to the former by means of the nut/bolt assembly unit 88 of the lifting bar drive mechanism 45, and to the latter by means of nut/bolt assembly unit 99 of lifting bar mechanism 46. Thus, support bar 49 moves in concert with the moving cycle of the lifting drive mechanisms 45 and 46, upward and downward, under control of the reverse drive imparted to each nut/bolt assembly unit by motor 77 and 90, respectively. The drive of the motor 77 is controlled by control 71 of the left-side control unit 21, and the drive of the motor 90 is controlled by control 91 of the right-side control unit 39. Both controls are located on the handle 19 of the lifting bar assembly B1 and control up-down movement of seat 40.

Seat 40 is also mounted on the left side by a support brace 41 and a support bracket 47 connected to the support brace 41 and received by a mounting rail 43. The mounting rail 43 that guides the support bracket 47 in movement a may comprise a portion of the lifting bar drive mechanism 45. The structures are duplicated on the right side by a support brace 42 and a support bracket 48 connected to the support brace 42 and received by a mounting rail 44. The mounting rail 44 that guides the support bracket 48 in movement may comprise a portion of the lifting bar drive mechanism 46. Support brace 41 and support brace 42 are connected within the region of the cantilever extension of seat 40 thereby to introduce an added measure of stability to the seat 40.

A compartment 131 supported on the front planer surface of frame member 1 may be used for any purpose, for example, to carry groceries, books, and so forth.

Figure 2A:
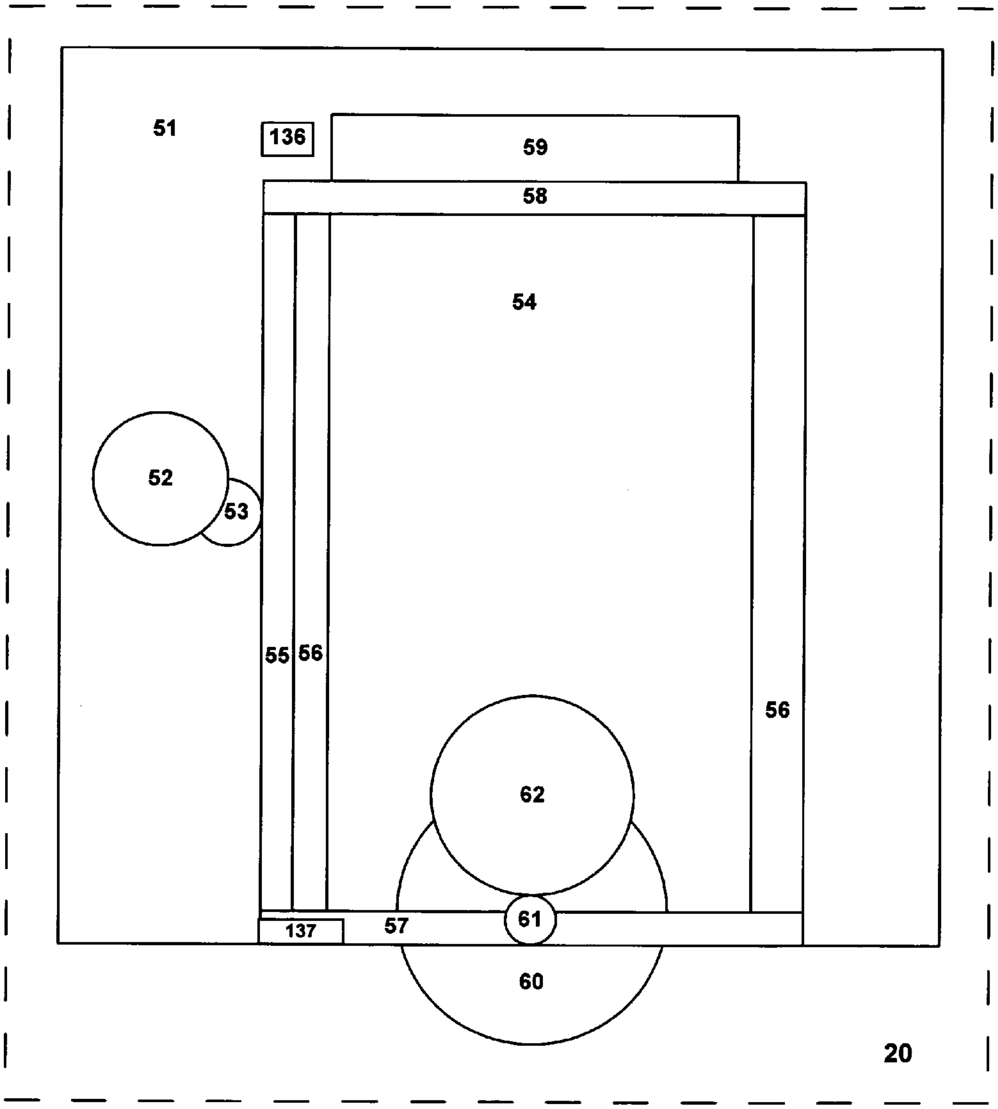
FIGS. 2A and 2B are views of the power drive mechanism of the walker apparatus illustrating an engaged and disengaged mode configuration.
Figure 2B:
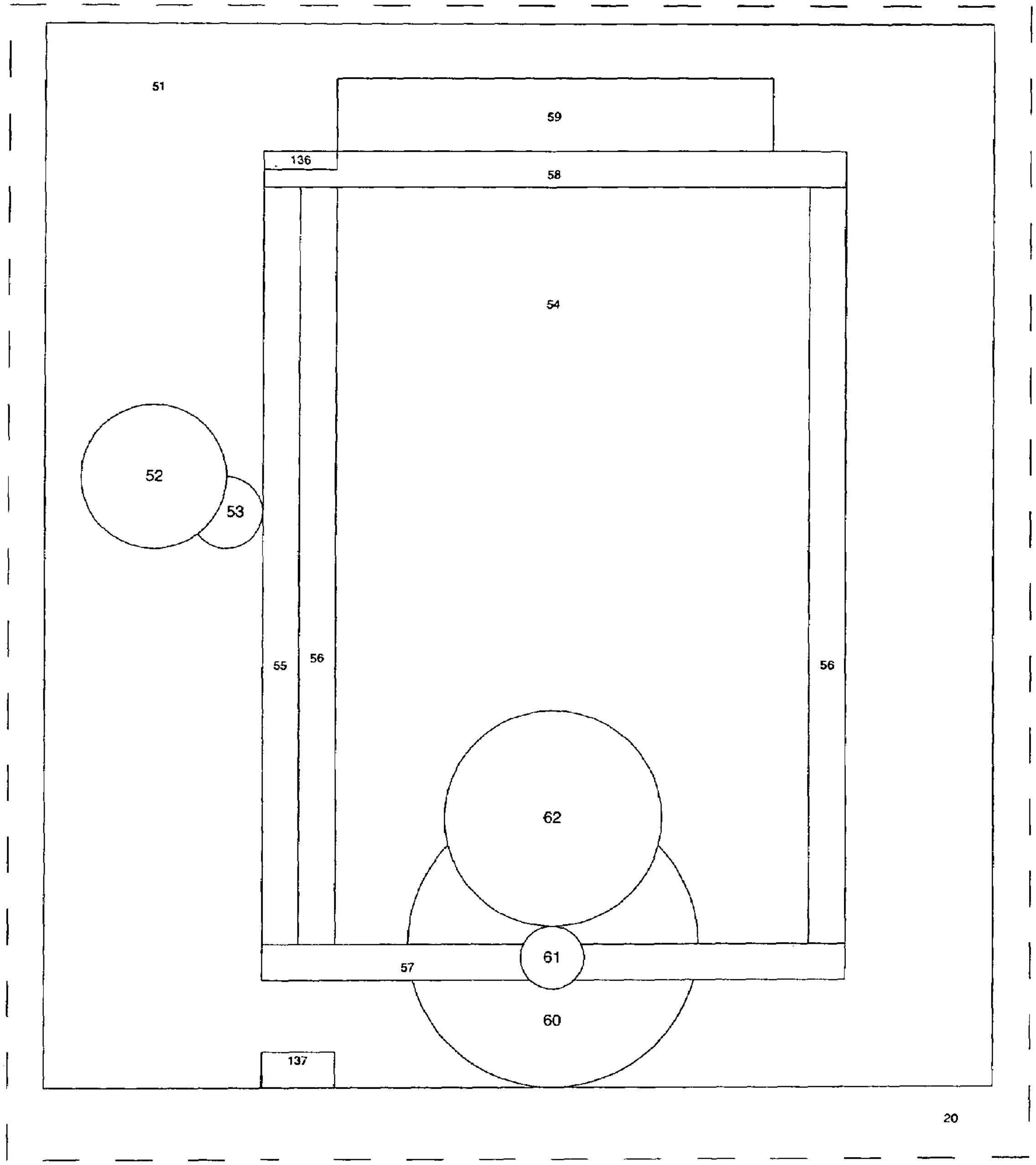

Finally, before a commencing on a full and complete discussion of the electronics configuration, reference is directed to FIGS. 2A and 2B, each illustrating a cross-sectional view taken generally along the plane of the main front to rear axis of the walker apparatus to provide a full understanding of the drive mechanism unit 20 and its operation.

Drive mechanism unit 20 is supported within a housing unit 51 that also support the leg segments units $B_R$ and $B_L$ and main incline struts 2 and 22 comprising the legs of the frameworks seen in FIGS. 1A and 1B.

Drive mechanism 20 includes drive motors 52 and 62, both capable of providing a reverse driving output. The drive motor 52 controls an actuating means described below to activate alternately micro-switches 136 and 137. The drive motor 62, on the other hand, controls a drive wheel unit 60 for driving the walker apparatus in the forward and rearward directions. The drive mechanism 20 provides an engaged mode for both the powered and virtual mode versions of the walker apparatus of the invention.

Drive motor 52 is coupled to gearbox 53 which in turn is mounted to drive a rack assembly mounted for movement under control of the motor 52 either upward or downward as seen in FIGS. 2A and 2B. Particularly, the rack assembly unit 55 under control of motor 52 drives a cylindrical body including a sleeve bearing unit 56, a hollow rotary sleeve unit 54 on the opposite side of the sleeve bearing unit 56, a rotary joint assembly 57 at the top of the cylindrical body and a rotary joint assembly 58 at the bottom of the cylindrical body. Each rotary joint assembly 57 and 58 is connected to the hollow rotary sleeve unit 54.

The hollow rotary sleeve unit 54 as configured is capable of withstanding transverse loads that may be expected in operation of the drive mechanism 20, that act in any direction.

The cylindrical body including the sleeve bearing unit 56 and hollow rotary sleeve unit 54 is directly controlled by rack assembly unit 55 under control of the input drive of motor 52. Thus, motor 52 drives the cylindrical body in movements toward and into engagement with one or the other of micro-switches 136 and 137. Micro-switch 137 is activated when the drive mechanism 20 acting through the cylindrical body is fully engaged.

Wheel unit 60 is mounted for movement on rotary joint assembly 57. The wheel unit 60 is directly controlled by the motor 62 acting through drive gearbox 61 in both forward and reverse drives. The wheel unit 60 is also controlled in movements to the right and left, thereby controlling the path taken by the walker apparatus. A rotary drive assembly 59 provides this measure of directional input. The rotary drive assembly 59 is mounted within housing unit 51 and coupled to the rotary drive assembly 58. The driving input to the rotary joint assembly 58 is coupled to the rotary joint assembly 57 through the hollow rotary sleeve 54.

The hollow rotary sleeve unit 54 is attached to each rotary joint assembly 57 and 58 and the input of rotary joint drive assembly 59 controls movement of the wheel unit 60 as the rotary joint assembly 57 moves rotationally around the axis of the sleeve bearing unit 56.

FIG. 2A illustrates the drive mechanism 20 in the engaged, basic powered and virtual mode of operation possibly following activation of micro-switch 137, and FIG. 2B illustrates the drive mechanism 20 in the disengaged position.

The Electronics Configuration Powered Mode of Operation

Figure 6A:
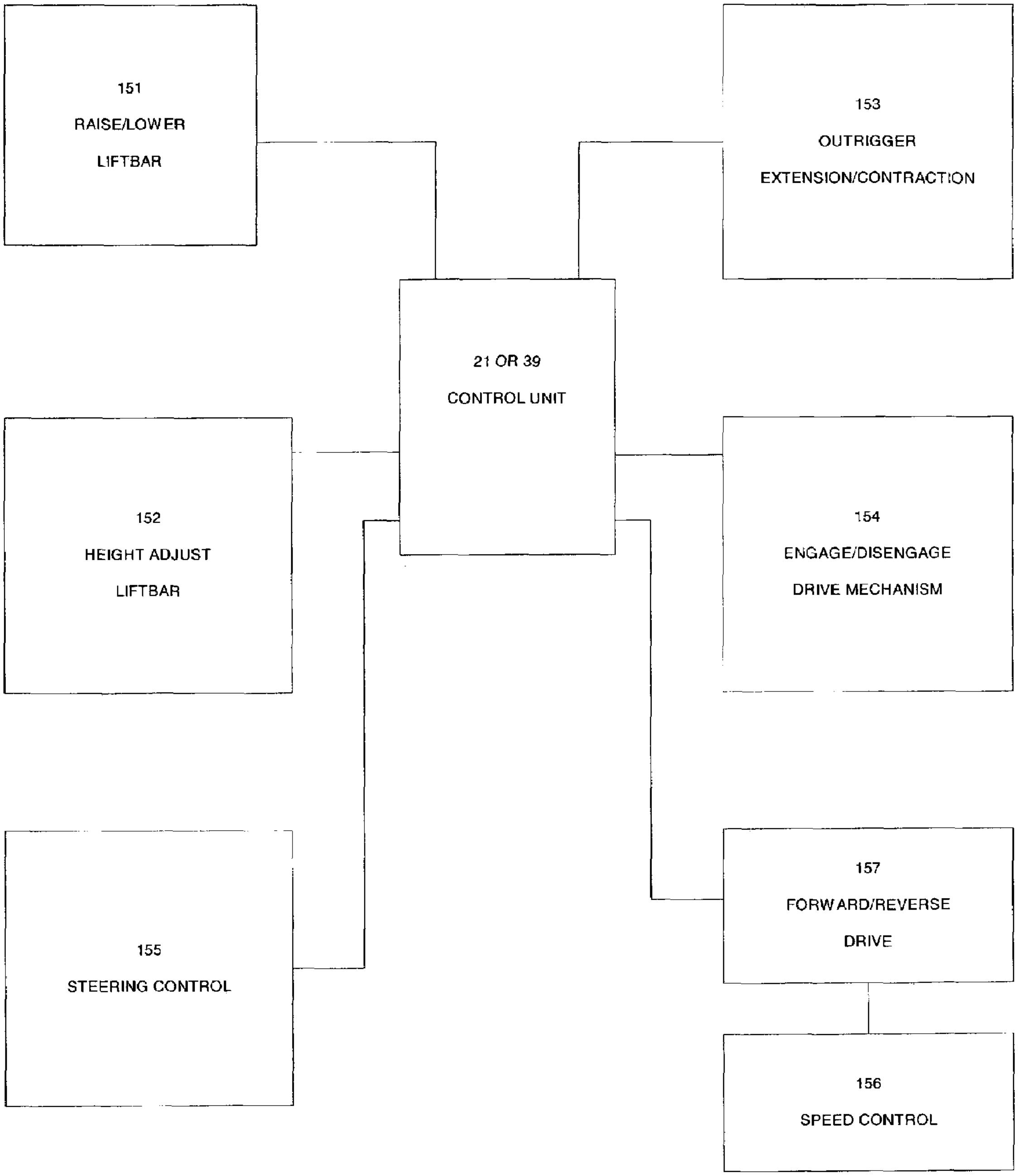
FIGS. 6A-6B are block diagram for the basic powered version and virtual mode version of the electronics configuration.
Figure 6B:
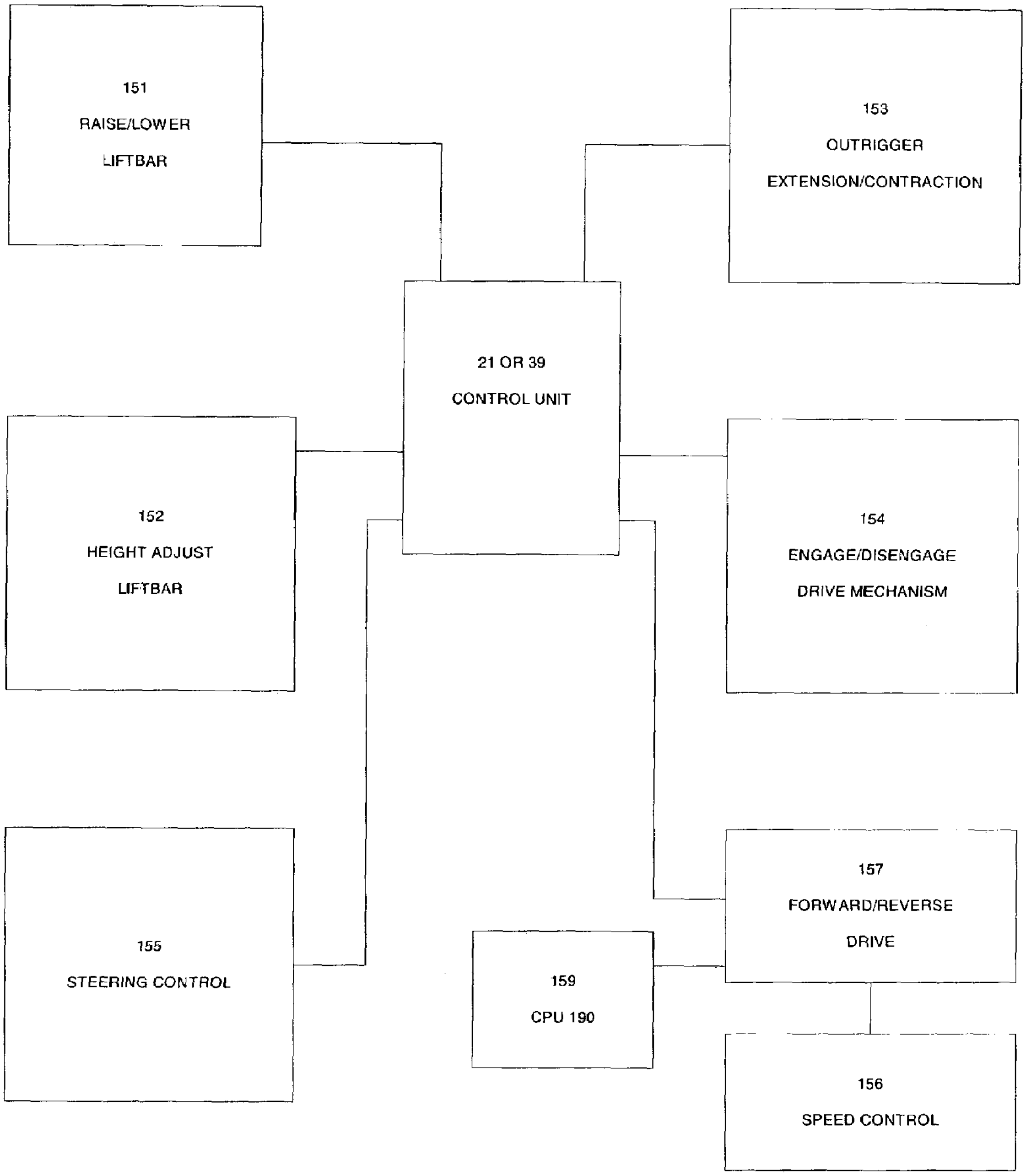

The electronics for the basic powered version of the walker apparatus is illustrated in the block diagram of FIG. 6A, while the electronics for the virtual mode version of the walker apparatus is illustrated in the block diagram of FIG. 6B.

The block diagram of FIG. 6A includes a raise/lower lift bar electronic circuit 151, a height adjustment for lift bar electronic circuit 152, an outrigger extension/contraction electronic circuit 153, an engage/disengage drive mechanism electronic circuit 154, a steering mechanism electronic circuit 155, a forward/reverse drive electronic circuit 157, a power source 170 (not shown), and a controller unit or transceiver unit 21, 39. Each circuit 151-155 and 157 is connected directly to controller unit 21, 39. Speed control electronic circuit 156, on the other hand, is connected to controller unit 21, 39 through forward/reverse drive electronic circuit 157 providing speed control of the drive in both directions of movement. The block diagram comprises the circuitry illustrated in FIGS. 6C-6K. The specifics of the circuitry will be discussed in greater particularity as the description continues.

Figure 4A:
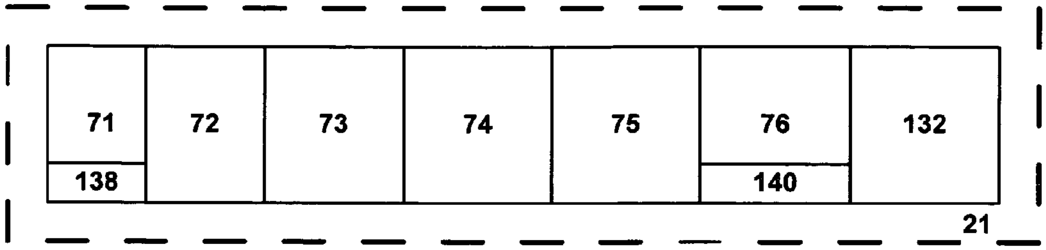
FIGS. 4A-4B are views of the operative controls of a right and left control module.

Referring to FIG. 4A, controller unit 21 is made up of several controls 71-76, 132, 138 and 140 for controlling aspects of operation of the basic powered and virtual mode version of the walker apparatus. The individual controls are located on the bar handle 19 (see FIG. 1D) of the lifting assembly mechanism, previously discussed.

Control 71, located on the bar handle 19 within the region of the left side a illustrated in FIG. 1D, is the left-side lifting bar handle up/down switch; control 72 is the left side lifting bar extension/retraction switch; control 73 is the left side support legs (support legs $B_R$ and $B_L$) extension/retraction switch; control 74 functions to engage/disengage drive mechanism unit 20 from the left side; control 75 functions as a variable resistor providing steering signals from the left side; control 76 functions as a variable resistor providing speed signals to the drive motor 62 from the left side; control 132 is an on/off basic powered and virtual mode switch for the power drive unit; control 138 is the left-side activation switch; and control 140 is the forward/reverse switch for the left side.

Figure 4B:
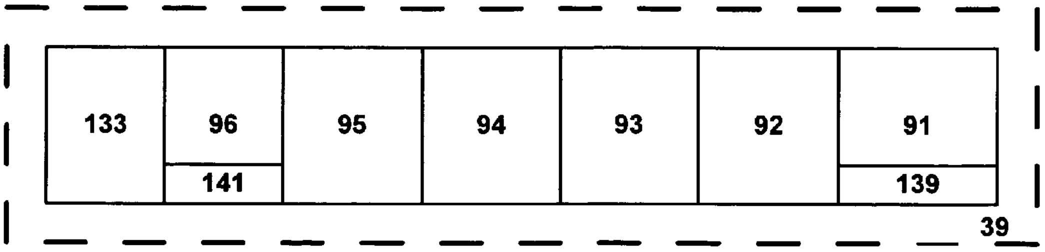

Referring to FIG. 4B, controller unit 39 likewise is also made up of several controls 91-96, 133, 139 and 141 also operative for the basic powered and virtual mode version of the walker apparatus. The individual controls are located on the bar handle 19 of the lift mechanism. Similar to the arrangement of FIG. 4A, the controls are located on the bar handle 19 of the lift mechanism and the first of the controls is positioned on the bar handle 19 within a right hand location. The first control, control 91, is the right-side lifting bar handle up/down switch; control 92 is the right side lifting bar extension/retraction switch; control 93 is the right side support legs (support legs $B_R$ and $B_L$) extension/retraction switch; control 94 functions to engage/disengage drive mechanism unit 20 from the right side; control 95 functions as a variable resistor providing steering signals from the right side; control 96 functions as a variable resistor providing speed signals to the drive motor 62 from the right side; control 133 is an on/off basic powered and virtual mode switch for the power drive unit; control 139 is the right-side activation switch; and control 141 is the forward/reverse switch for the right side.

FIG. 6B illustrates the electronics for the virtual mode version of the walker apparatus. The circuit configuration of FIG. 6B duplicates the circuit configuration of FIG. 6A, and includes, in addition, the circuitry of block 159 electronically connected to control unit 21, 39 through forward/reverse drive electronic circuit 157. Block 159 is connected to CPU 190 (see FIG. 6J) providing an input control of the walker apparatus for both speed and direction. The circuitry of block 159 will be described with the other electronics in connection with the discussion directed to FIGS. 6C-6J.

Figure 6C:
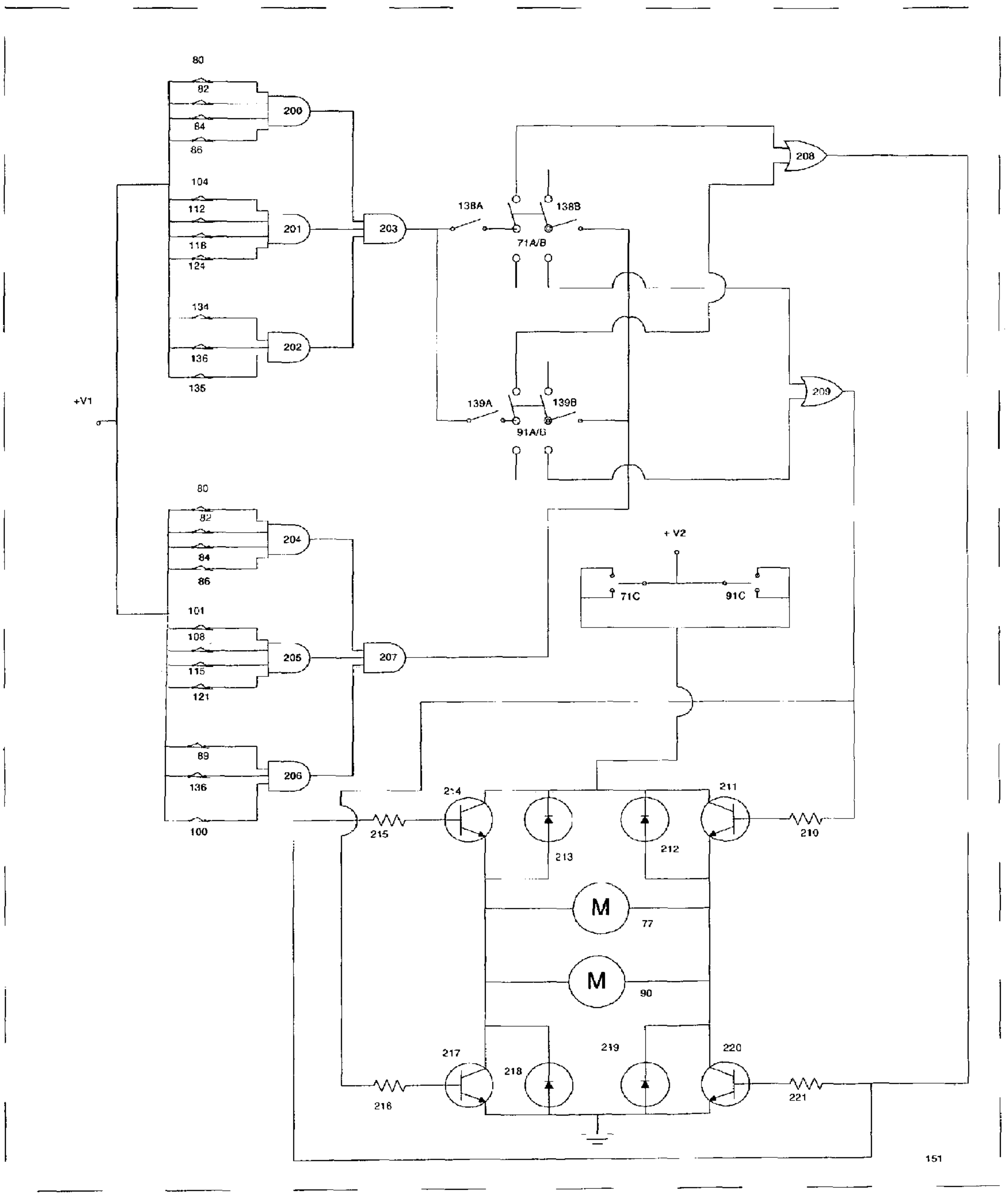
FIGS. 6C-6K are schematic diagrams of various operative mode configurations and power supplies.

Turning to FIG. 6C, the walker apparatus is readied to both the basic powered and virtual modes of operation by a sequence of operations starting with the operation of raising or lowering the lifting bar assembly (illustrated in FIG. 1D, including opposed lifting bar sections 3 and 23, lifting bar section extensions 4 and 24, as well as lifting bar handle 19) through activation of one or the other of a left-side switch 138 or right-side switch 139, respectively. For example, the user may select the left-side switch 138 and determine one of two functions of raising or lowering the lifting bar under control of switching member 71.

Similarly, the user may select the right-side switch 139 to determine the same functions of raising and lowering the lift bar under control of switching member 91. If the lifting bar is to be raised, the switch member 71 is raised (the "Up" direction in FIG. 1D). If the switch member 71 is lowered the lift bar likewise will be lowered. The same operation will be achieved through use of the right-side switch 139 and switch member 91.

The electrical system introduces several safety features will become apparent through a consideration of the logic illustrated in the circuitry switch to minimize the likelihood of injury being sustained by the user of the walker apparatus.

First, the lifting bar extension section 4 not only must be fully extended it must be properly assembled with lifting bar section 3, and remain in the proper assembled condition, for activation of switch 80. As will be recalled, with further reference to FIG. 3A, switch 80 is engaged when those conditions are fulfilled and the locking mechanism 127 is engaged.

Switches 82, 84, and 86 are activated under similar conditions, all as previously discussed with reference to FIGS. 3B-3D. The sequence of operation that follows may be to assemble lifting bar extension section 24 and lifting bar section 23, fully extend the components and insert locking mechanism 129 to activate switch 84; assemble leg segment 9 and leg segment 8, fully extend the components and insert locking mechanism 128 to activate switch 82; and assemble leg segment 29 and leg segment 28, fully extend the components and insert locking mechanism 130 to activate switch 86.

When these conditions are attained both AND gates 200 and 204 will provide a logic output.

The logic output at AND gate 200, and similarly the logic output at AND gate 204, provides one of several inputs controlling AND gates 203 and 207, respectively, to electrically connect switches 138 and 139 through their let and right switch arms A and B (the positions in FIG. 6C, for example) to power at +V1.

Several operations are required to provide a logic output at AND gate 205. Particularly, lifting bar assembly handle 19 (through full extension of lifting bar extension section 4 in relation to lifting bar section 3 must be fully extended to activate switches 101, and lifting bar extension section 24 in relation to lifting bar section 23) must be fully extended to activate switches 105, 108 (see FIGS. 5C and 5D). Similarly, leg segments 9 and 29 must be fully extended in relation to leg segments 8 and 28 for activation of switches 115 and 121, respectively.

The operations of full extension of all structures resulting in an input at each input terminal of AND gate 205, also result in the presence of a signal at each respective input of AND gate 201, and consequently a logic output at AND gate 201.

As previously discussed, cut-off switch 101 is activated to the "on" condition from a condition normally "off" when bolt nut assembly unit 102 reaches a limit location corresponding to maximum travel in the opposite direction nut bolt assembly unit 102 reaches its limit location corresponding to maximum travel in the opposite direction nut bolt assembly 102 activates cut-off switch 104 to the "off" condition from a normally "on" condition. Thus, when lifting bar section 3 and lifting bar extension section 4 are fully "embedded" the control at the input of AND gate 205 responsive to that action is lost. AND gate 205, thus, has no logic output.

The cooperative actions of other structures illustrated in FIGS. 5D-5F are the same, and together with the cooperative action of the structures illustrated in FIG. 5C. affects the presence or absence of an input at the respective input terminals of AND gates 201 and 205. To this end, each input of AND gate 205 is controlled by a cut-off switch that normally is in the "off" condition and activated to the "on" condition representing full extension of a pair of cooperating structures. AND gate 201, on the other hand, provides an output at all times, except when any or all pairs of cooperating structures are fully "embedded". AND gate 205 will have lost its output when any or all pairs of cooperating structures release from the fully extended position in collapse in the fully "embedded".

The final conditions to meet in the lift bar assembly raising mode is that both the left-side lift motor cut-off switch 134 and right-side lift motor cut-off switch 135 are engaged, and the drive mechanism 20 is also in the disengaged mode under condition that switch 136 is activated "on". If the several conditions are met, AND gate 202 will provide an output logic signal. Assuming, the conditions are met, AND gate 202 will produce a logic output.

In the lowering mode of operation, AND gate 206 will produce an output logic signal under the conditions that the left-side lift motor cut-off switch 89 is not engaged and the right-side lift motor cut-off switch 100 is also not engaged, and the drive mechanism unit 20 is in the disengaged mode with switch 136 engaged.

The operation of AND gate 202 is controlled by lifting bar assembly handle 19 in the bar raising mode. A logic output will appear at AND gate 202 under conditions that both the left and right-side lift motor cut-off switches 134 and 135 are not engaged, and drive mechanism unit 20 is in the disengaged mode with switch 136 engaged. Likewise, AND gate 206 will provide a logic output under conditions that both left and right-side lift motor cut-off switches 89 and 100 are not engaged, and drive mechanism 20 is in the disengaged mode with switch 136 engaged.

As described, a logic output will exist at AND gate 203 under circumstances of a logic output at each of AND gates 200, 201, and 202 in the raising mode of operation. The logic output at AND gate 203 is recognized at OR gate 209 through either switch 71 or 91. In the lowering mode of operation an output will exist at AND gate 207 under circumstances of a logic output at each of AND gates 204, 205, and 206. The logic output at AND gate 207 is recognized at OR gate 209 through either switch 71 or 91.

The direction of the drive of reversible motors 77 and 90 is determined by operation of OR gates 208 and 209, and an H-bridge network comprising resistors 210, 215, 216, and 221; diodes 212, 213, 218, and 219; and NPN power transistors 211, 214, 217, and 220. The resistors provide proper bias for the transistors, and eliminate any excessive current that may overheat and/or destroy a transistor.

The H-bridge is wired in a manner that only two transistors are "on" at any time. For example, when transistors 214 and 220 are "on", the motors (M) 77 and 90 turn in one direction. When transistors 211 and 217 are "on", the motors 77 and 90 turn in the opposite direction. When all transistors 211, 214, 217, and 220 are "off", the motors 77 and 90 are still. As a power saver, switches 71C and 91C serve to connect/disconnect power source +V2 from the H-bridge. The logic circuits are powered by a power source +V1.

Figure 6D:
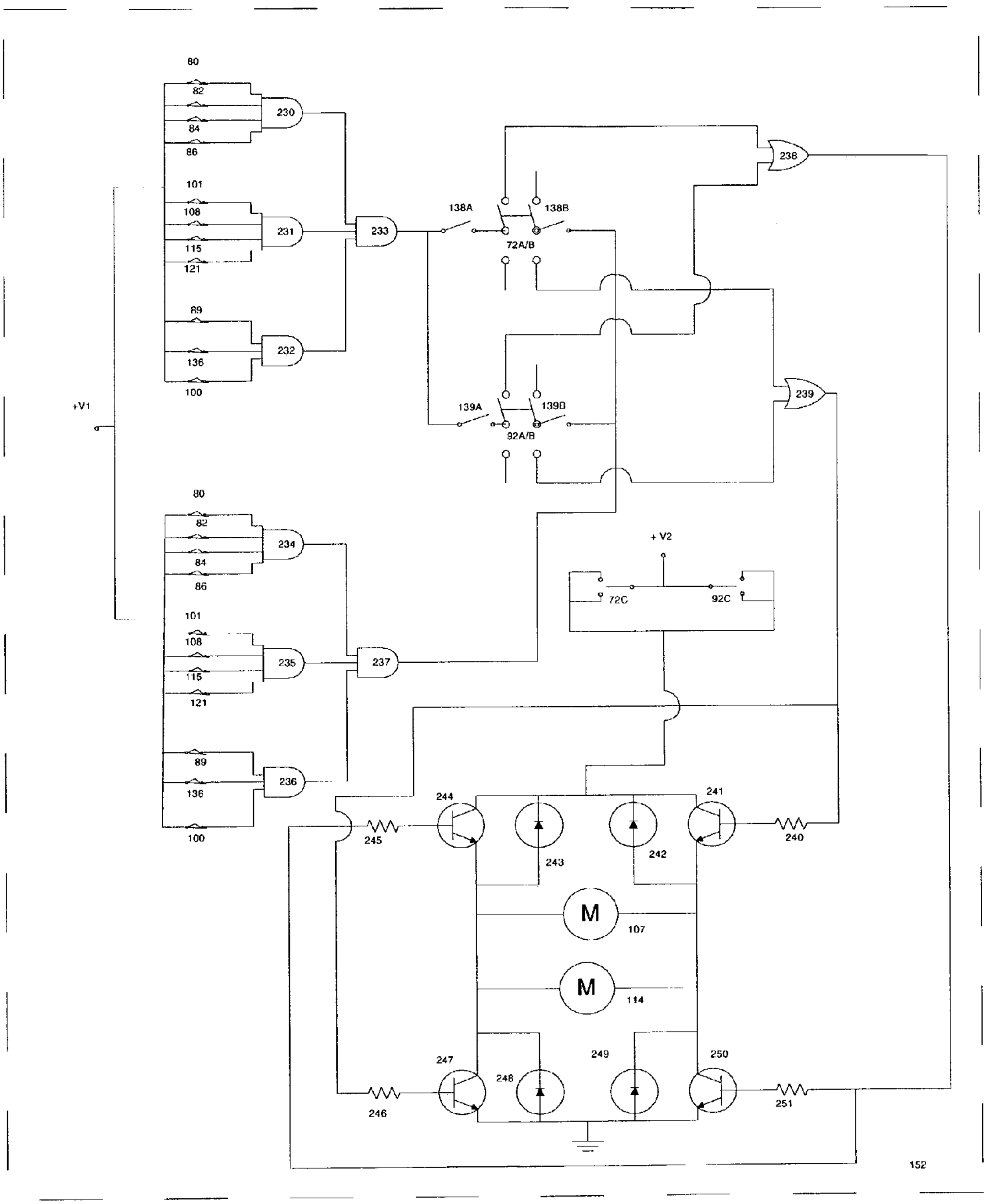
Figure 6E:
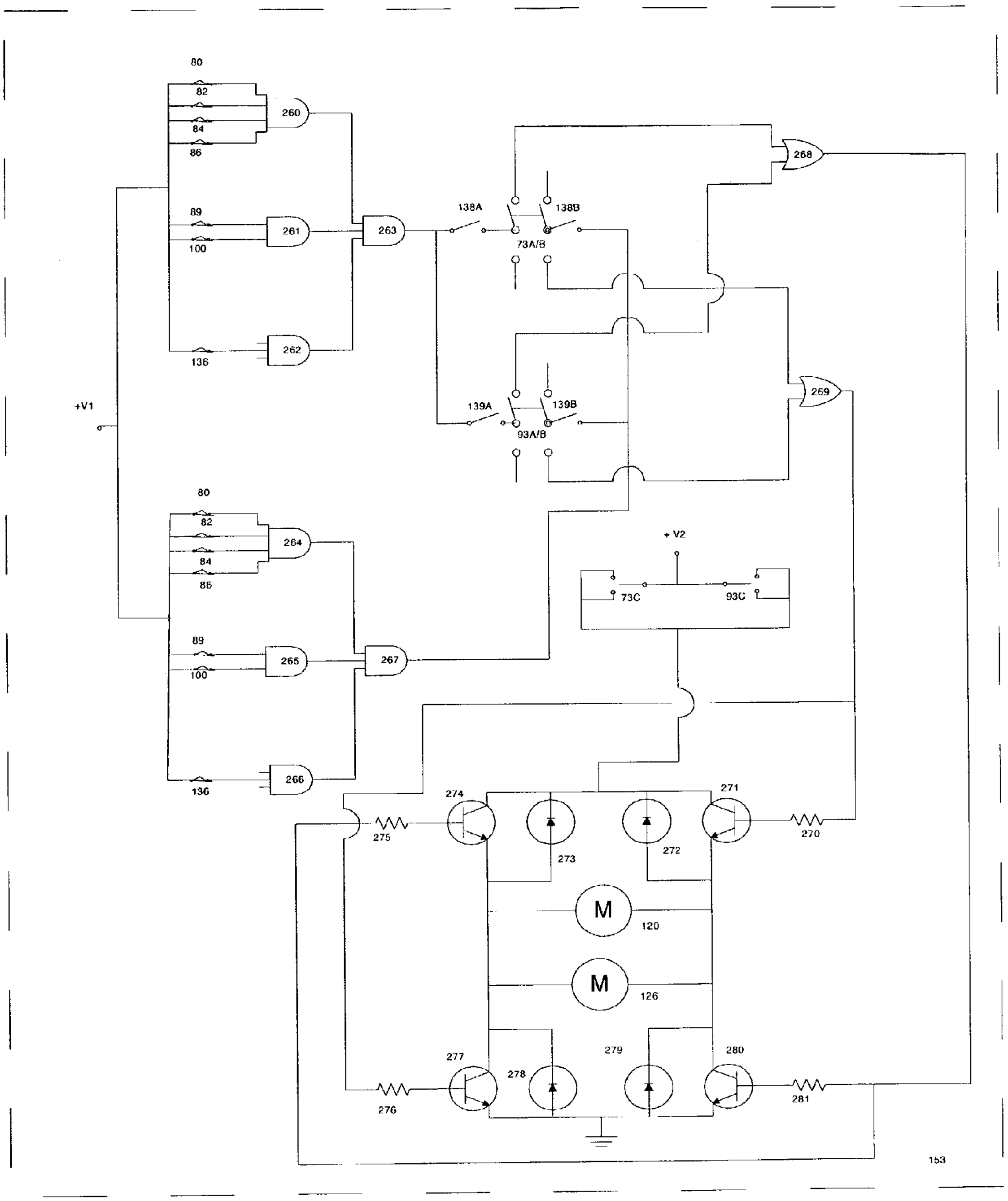
Figure 6F:
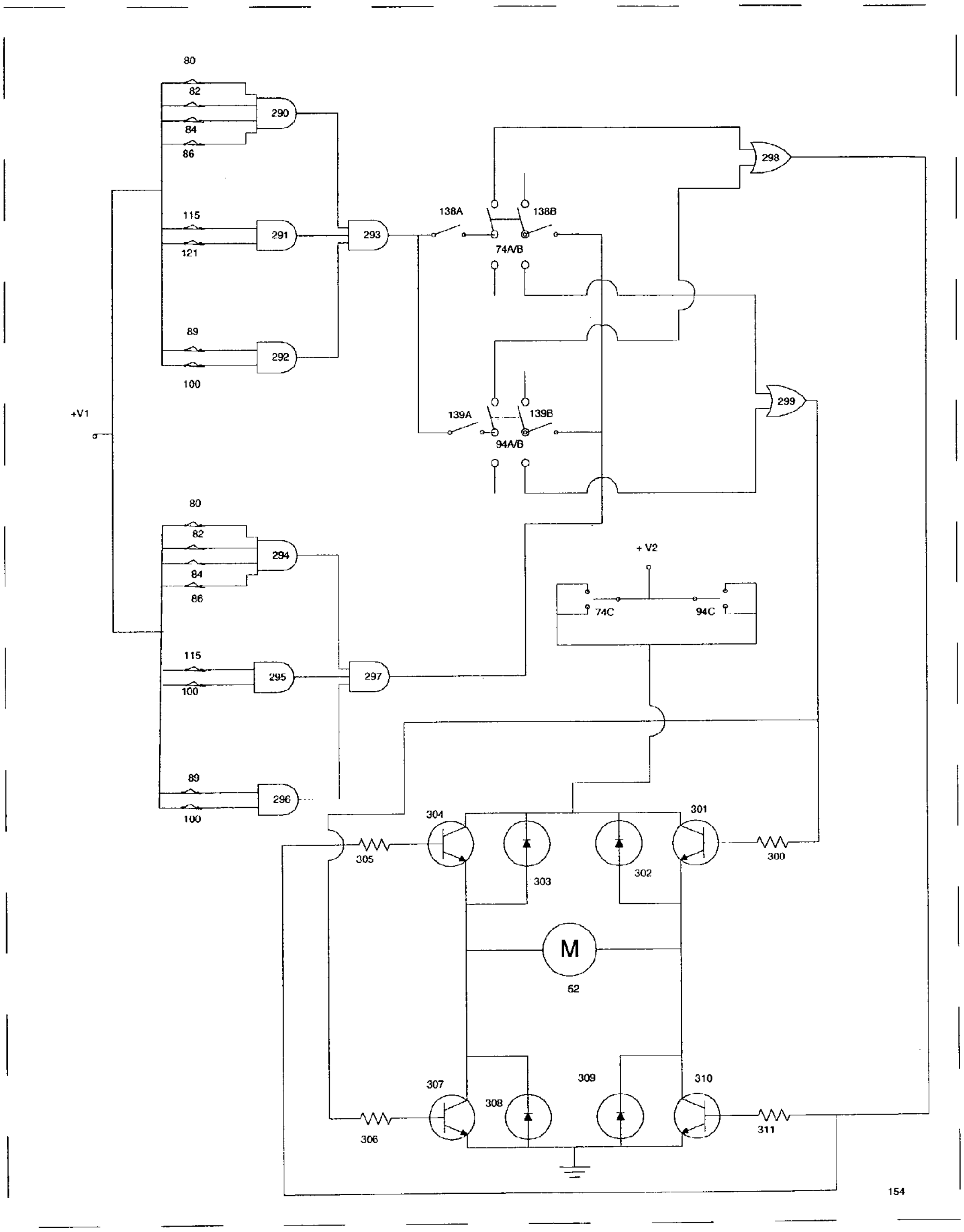

It goes without saying that motors 77 and 90 controlled by the H-bridge in FIG. 6C, as well as the motors 107 and 114 controlled by the H-bridge in FIG. 6D, for example, could be replaced by a single motor, and likewise, the motor 52 controlled by the H-bridge in FIG. 6F, for example, could be replaced by a pair of motors. The particular selection of one or a pair of motors in the several figures, however, has been determined primarily by a consideration of size and weight of the walker apparatus thereby to provide ease in handling and overall convenience in operation.

The details of operation of the H-bridge in each of electronic circuit 152 (FIG. 6D) and 153 (FIG. 6E) are identical in operation to that operation discussed in connection with electronic circuit 151. Similarly, the H-bridge is connected to power source +V2 by a dual-operating switch, like switch 71C and 91C. And, the H-bridge is controlled by logic output of a pair of OR gates, like OR gates 208 and 209. The details of operation of the H-bridge in electronic circuit 154 (FIG. 6F) substantially duplicates the operation of the electronic circuit 151 (FIG. 6C) except for the use of a single motor 52 having a reversible drive, rather than a pair of motors like motors 77 and 90 of electronic circuit 151. The difference in these electronic circuits regarding operation is in the operation of the logic of each circuit in the control of operation of the OR gates providing an input to the H-bridge.

The logic providing an output at AND gates 233 and 237 of the height adjustment circuit for controlling the height of the lift bar, at AND gates 263 and 267 of the outrigger extension/contraction circuit, and at AND gates 293 and 297 of the engage/disengage drive mechanism circuit differ somewhat in connection with the security features incorporated into the logic circuit, but the circuit controlled by the logic applications is the same as the circuit discussed in connection with the discussion of FIG. 6C.

Turning to the height adjustment circuit for controlling the height of the lift bar (FIG. 6D), the user of the walker apparatus in both the basic powered and virtual modes selects either the left-side switch 138 or the right-side switch 139 to commence movement of the lift bar assembly for adjustment or any other purpose. At that point in time, a selection of a particular function may be made, such as extending or retracting the lift bar assembly. The selection may be made by moving control switch 72, assuming the left-side switch 138 was selected to extend the lift bar assembly or retract the lift bar. The same selection may be made by moving control 92, assuming the right-side switch 139 was selected.

The same safety features incorporated in the walker apparatus, as discussed above, affect the operation of the logic in both the basic powered and virtual modes of operation in control of the circuit for the height adjustment capability.

Under the criteria previously discussed, each of AND gates 233 and 237 recognize an input and provide an output to one or the other of OR gates 238 and 239 if the safety switches responsive to conditions of proper assembly of components that permit receipt of a locking mechanism, and fully extended leg segment and lift bar section components are "on", and in the lowering mode the left-side lift motor cut-off switch 89 is not engaged, the right-side motor cut-off switch 100 is not engaged, and the drive mechanism 20 is in the disengaged mode with switch 136 engaged.

Turning to the outrigger extension/contraction circuit (FIG. 6E), the user of the walker apparatus in both the basic powered and virtual modes selects either the left-side switch 138 or the right-side switch 139 to commence operation in extension/contraction of the outrigger legs. At that point in time, a selection of a particular function may be made, such as extending or retracting the outrigger legs. The selection may be made by moving control switch 72, assuming the left-side switch 138 was selected to extend or retract the outrigger legs. The same selection may be made by moving control switch 93, assuming the right-side switch 139 was selected.

The same safety features incorporated in the walker apparatus, as discussed above, affect the operation of the logic in both the basic powered and virtual modes of operation in control of the circuit for adjusting (expansion or contraction) of the outrigger legs.

Under the criteria previously discussed, each of AND gates 263 and 267 recognize an input and provide an output to one or the other of OR gates 268 and 269.

Turning to the engage/disengage drive mechanism circuit (FIG. 6F), the user of the walker apparatus in both the basic powered and virtual modes selects either the left-side switch 138 or the right-side switch 139 to commence the function to perform, i.e., the engagement or disengagement of the drive of the steering mechanism. The selection may be made by moving control switch 73, assuming the left-side switch 138 was selected to engage the steering mechanism or disengage the steering mechanism. The same selection may be made by moving control switch 94, assuming the right-side switch 139 was selected.

Again, the same safety features incorporated in the walker apparatus, as discussed above, affect the operation of the logic in both the basic powered and virtual modes of operation in control of the circuit for engagement/disengagement of the steering mechanism.

Under the criteria previously discussed, each of AND gates 293 and 297 recognize an input and provide an output to one or the other of OR gates 298 and 299. To this end, AND gates

290 and 294 each provide an output when the components are properly assembled and a locking mechanism is install to secure the components, both of the leg segments are fully extended, and both the left-side lift motor cut-off switch 89 and right-side motor cut-off switch 100 are not engaged.

Figure 6G:
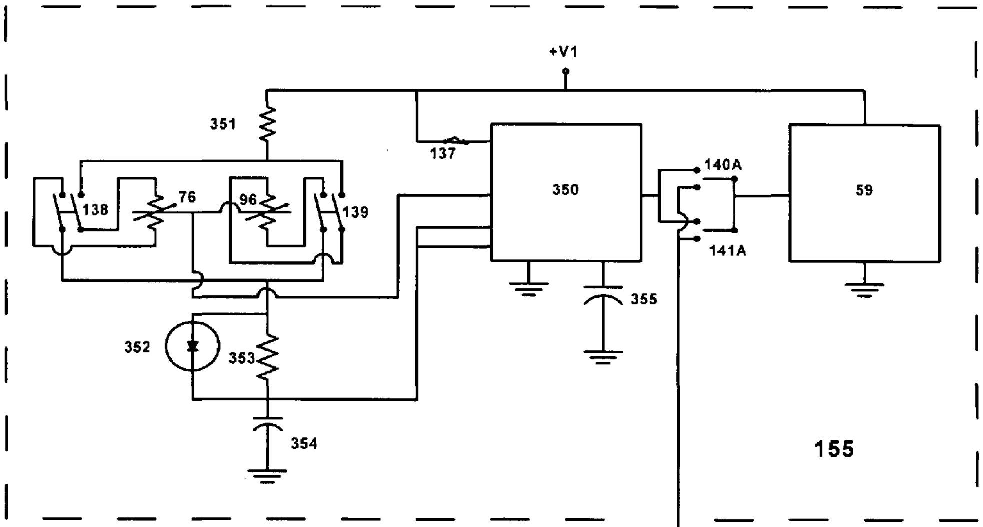

FIG. 6G illustrates the details of the electronic circuit providing the drive mechanism a measure of steering capability. The particular mode of operation of basic powered or the virtual mode of operation is determined, once again, by selecting either the left-side switch 140A, or the right-side switch 141A. Once a selection is made, either the left-side switch 138 or left-side switch 139 is controlled to start the steering control for the drive mechanism unit 20.

A potentiometer 76, if the left-side switch 138 is selected, induces the drive unit acting through a servomotor to turn in a direction, either left or right. Alternatively, a potentiometer 96, if the right-side switch 139 is selected, induces the same steering capability. A servomotor, unlike a DC motor, is specifically designed for position control applications.

The circuit of FIG. 6G includes a timer chip 350 whose function is to generate pulses whose widths vary in length. If the pulse width increases the servo moves counter-clockwise, and if the pulse width decreases the servo moves clockwise. A resistor/capacitor network including resistors 321, 351 and the potentiometer combination 76/96 and capacitor 355 determine the width duration of each pulse. A resistor 353 and capacitor 355 determine the dwell time between pulses. The angular position of the servomotor is determined by the width (more precisely, the duration of the width) of each pulse. The actual length of the pulse varies with each specific servomotor model.

The potentiometer 76/96 provides varying voltage to a timer chip 350 for generation of pulses of varying widths. The control circuit within the servomotor correlates the voltage with timing of the incoming digital pulses and generates an error signal if the voltage is incorrect. The error signal is proportional to the difference between the position of the potentiometer and the timing of the incoming timing signal. To compensate, the error signal turns the motor. When voltage from the potentiometer and the timing of the digital pulses match, the error signal generated is zero and the motor stop turning. The servomotor unit in this circuit is denoted as component 59.

Figure 6H:
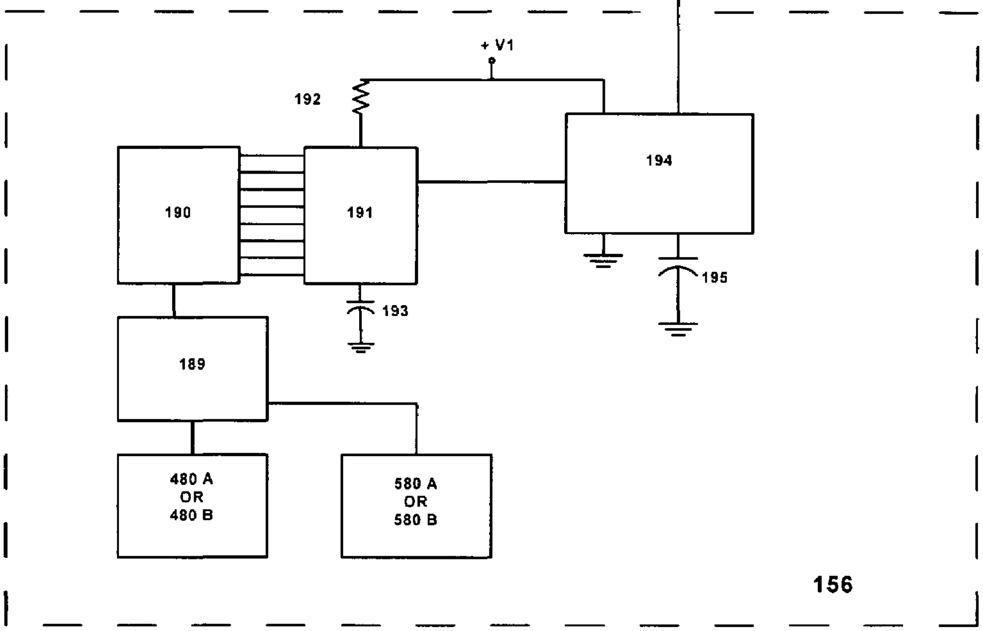

FIG. 6H illustrates the details of the peed speed control electronic unit 156 which is adapted for use with the virtual mode of operation to provide steering control to the servomotor 59. The user in this adaptation provides sensor information from a shoe-like comprising an aspect of the invention to a transceiver unit 480A and 480B, or a transceiver unit 580A and 580B. The transceiver unit selected controls microprocessor 190 through UART unit 189. The output of the microprocessor controls digital potentiometer 191. Any stray signals are removed by capacitor 193.

The digital potentiometer 191 is connected to timer chip 194 for purposes of generation of pulses of varying width. As indicated, as the pulse increases in width (more precisely, in duration) the servomotor moves counter-clockwise, and when the pulse decreases in width the servomotor moves clockwise. The duration of the pulse width is determined by a resistor/capacitor network including of digital potentiometer 191 and capacitor 195; the dwell duration is determined by resistor 192. The angular position of the servomotor is determined by the width of the pulse that may vary with each servomotor model.

The timer chip 194 generates a pulse of varying width in response to the output of the digital potentiometer 191 that varies voltage level. The control circuit within the servomotor correlates the voltage with the timing of the incoming digital pulses and generates an error signal if the voltage is incorrect. The error signal is proportional to the difference between the position of the potentiometer and the timing of the incoming signal. To compensate, the error signal turns the servomotor. When the voltage from the potentiometer and the timing of the digital pulses match, the error signal generated is zero and the servomotor stop turning. The servomotor unit is component 59 of FIG. 6G.

Figure 6I:
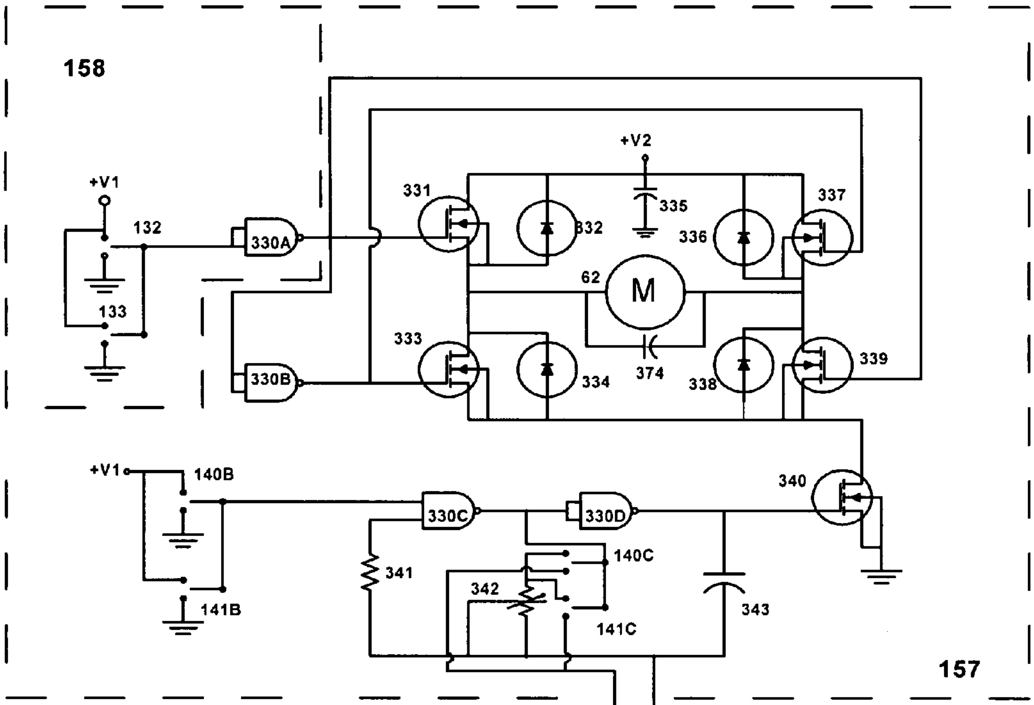

FIG. 6I illustrates the forward/reverse electronic circuit 158 used in both the basic powered and virtual mode configurations of the walker apparatus. In a manner like the selection process previously described in electric circuit 157, the user selects either left-side switch 140B, or the right-side switch 141B, to connect the power drive of the circuit to a source of power at +V1. The circuit is adapted to introduce the capability of speed control for the power drive.

A NAND gate 330 functions as an astable multivibrator or pulse generator for generating pulses of varying width or duration. A potentiometer 342 is controlled for controlling increases and decreases in the duration of the pulses at the output of NAND gate 330D. The longer the duration of each pulse, the faster the drive of motor 62. On the other hand, the shorter the duration of each pulse, the slower the motor speed. Speed therefore is determined by the power input to motor 62.

The circuit includes an H-bridge MOSFET circuit to increase the power output. MOSFET circuits do not require resistors for purpose of proving bias, and can carry higher currents than standard transistors.

The direction of drive of the motor is determined by the voltage applied to NAND gate 330A.

Figure 6J:
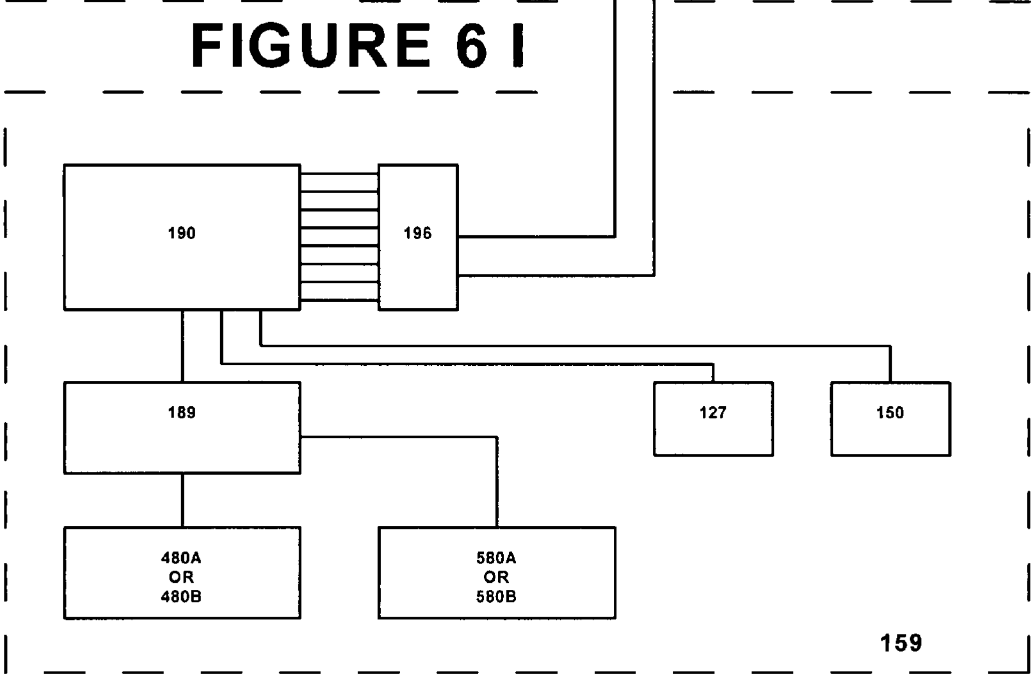

The user selects either the left-side switch 132 or the right-side switch 133 to select the direction that the walker apparatus will travel. The circuit of FIG. 6J provides directional control for the power drive. The direction of the reversible motor 62 is determined by the H-bridge network including the following components: MOSFETs 331, 333, 337, 339, and 340; diodes 332, 334, 336, and 338; NAND gate 330B; and capacitors 343 and 374. The H-bridge is wired in such a way that only two MOSFETs are "on" at any time. When MOSFETs 331 and 338 are "on", the motor 62 turns in one direction; when MOSFETs 333 and 337 are "on", the motor 62 turns in the other direction. When all the MOSFETs are "off", the motor does not turn.

FIG. 6J illustrates the electronic circuit 159 which is used in the virtual mode configuration of use of the walker apparatus. The user selects either the left-side switch 140C or the right-side switch 141C to connect digital potentiometer 196 (used in replacement of potentiometer 342 in the electronic circuit 157) to a microprocessor 190. Transceiver units 480A and 480B, transceiver units 580A and 580B, are also connected to the microprocessor 190 via UART unit 189. Right-hand pressure 127 and left-hand pressure sensor 150 provide pressure inputs that the user applies to the virtual mode adaptation of the walker apparatus. These inputs along with inputs from the shoe-like sensor determine the speed and direction of movement of the walker apparatus in the virtual mode adaptation. The output of the microprocessor controls digital potentiometer 196 for purpose of speed control.

Figure 6K:
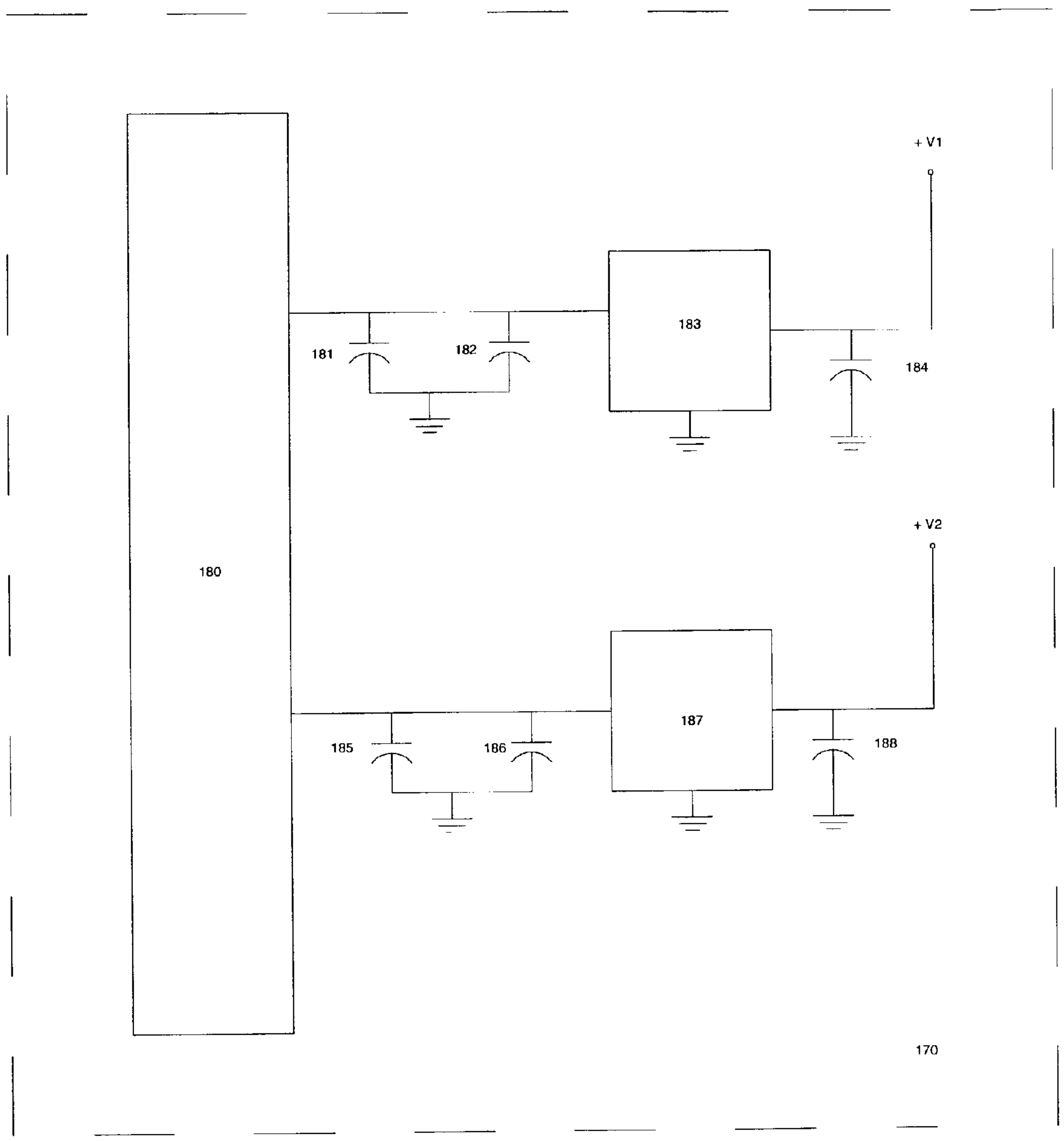

FIG. 6K illustrates a power supply for the walker portion of the walker apparatus. A source of power 180 of any type, such as a battery, fuel cell, hybrid, and so forth powers the apparatus. A grouping of capacitors 181, 182, 185, and 186 provide a filtering capability to remove any high and low frequency ripples that may be present at the voltage output. A voltage regulator module 183 produces +V1 and voltage regulator 187 produces +V2. Capacitors 184 and 185 remove any voltage spikes generated by voltage regulators 183 and 187.

Virtual Mode of Operation

Figure 7A:
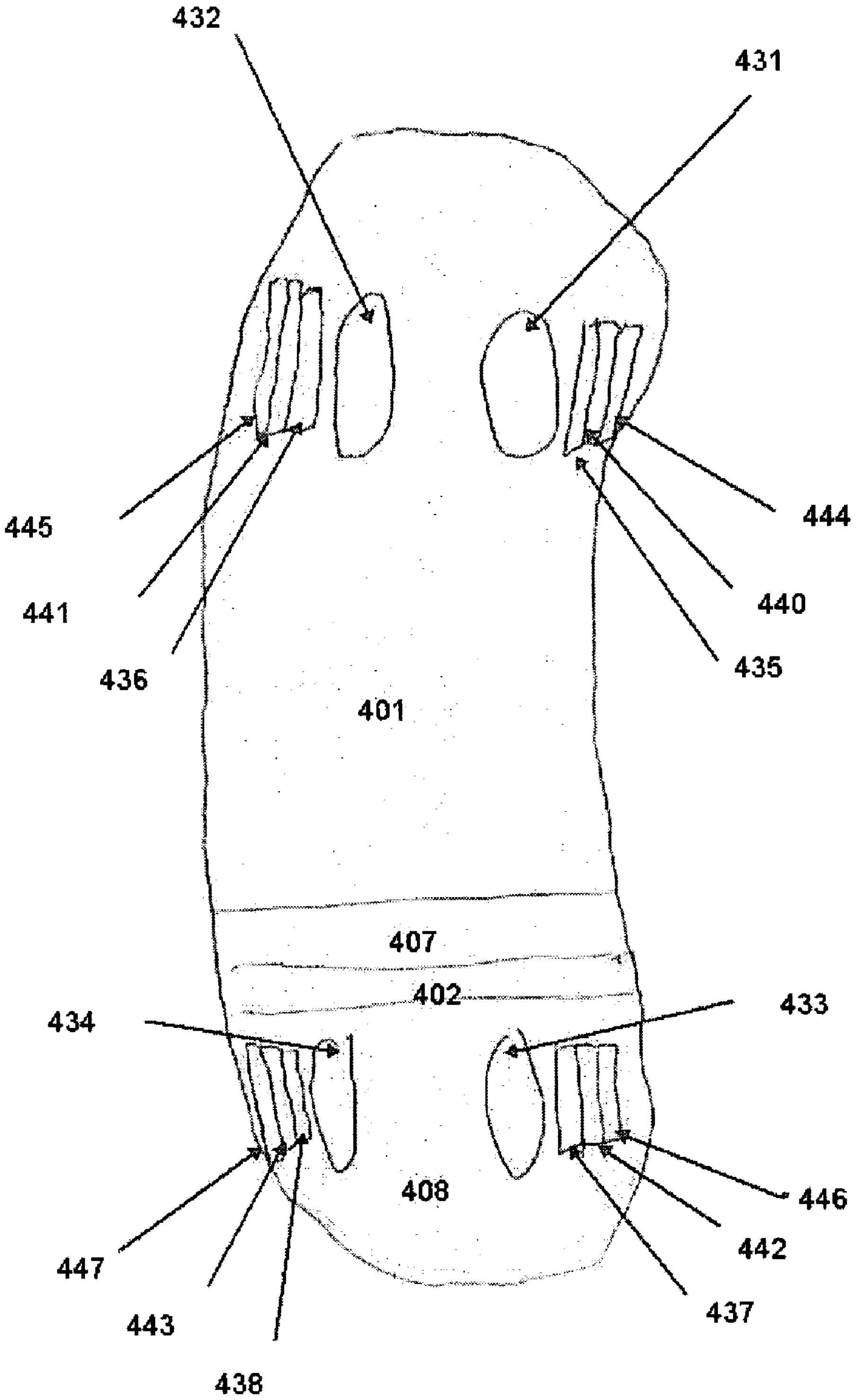
FIGS. 7A-7F are views of the left foot and right foot covering illustrating the location of critical units.

FIG. 7A illustrates the bottom surface of a shoe-like portion (particularly the left shoe-like portion, hereafter referred to as the "left shoe"). A sole plate 401 is supported by the left shoe and, in turn, supports in an embedded manner a plurality of sensors, each at critical locations, capable of generating information used in the control of operation of the walker apparatus in the virtual mode configuration of the present invention. More particularly, the sole plate unit 401 supports the sensor in paired arrangements across the width of the sole plate, in front of the location of the arch, in region generally of the ball of the foot, and on opposite sides of the main axis through the foot from heel to toe. A first pair of sensors 431 and 432 comprises pressure sensors within locations closest to the main axis. The remaining sensors of each pair are located laterally outward of the pressure sensors 431 and 432, and include X-axis accelerometer sensors 435 and 436, Y-axis accelerometer sensors 440 and 441, and Z-axis accelerometer sensors 444 and 445.

A piezo-electric generator element 407 is embedded into and extends across the width of the sole plate unit 401 further toward the heel section 408, preferably in the region of transition from the arch to the heel. An electronics package 402 is embedded in the sole plate 401 to the rear of piezo-electric generator element 407, and also extends across its width of the heel portion 408.

A grouping of paired sensors in an arrangement like the arrangement to the front of the left shoe is also supported by the sole portion 401 within the heel portion 408. The sensors include a second pair of pressure sensors 433 and 434 in the same general location of the sensors 431 and 432, relative to the main axis. The additional sensors of each pair disposed laterally outward of the pressure sensors 433 and 434 include X-axis accelerometer sensors 437 and 438, Y-axis accelerometer sensors 442 and 443, and Z-axis accelerometer sensors 446 and 447.

The output signal from each pressure sensor 431, 432, 433 and 434, as well as the signal outputs from the X-, Y-, and Z-axis accelerometers 435-438, and 440-447 are sent to a microprocessor unit 451 for processing.

Figure 7B:
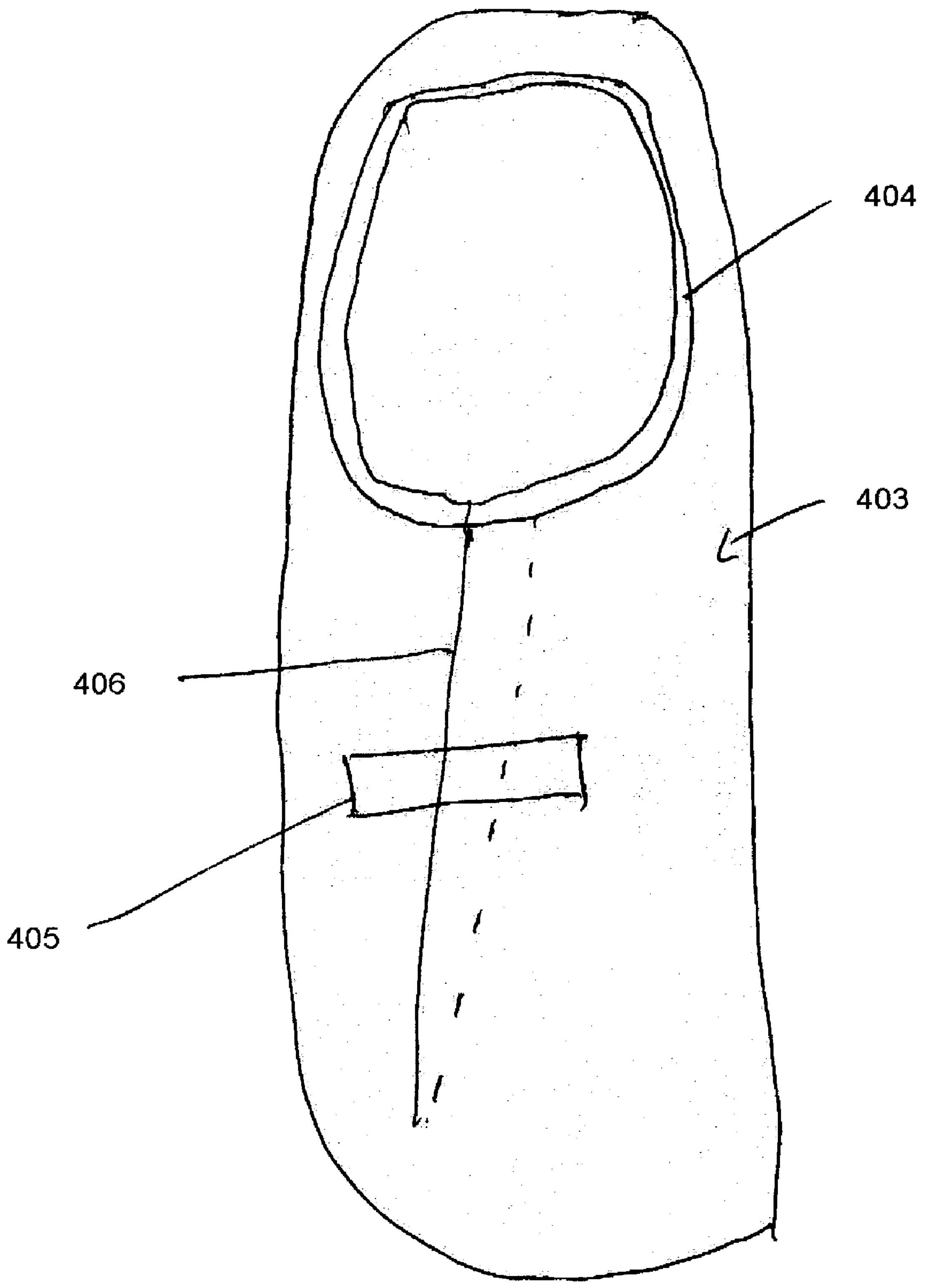

FIG. 7B illustrates the top of the left shoe and a shoe liner 403. The shoe liner 403 is in the form of a wrap received over the shoe, extending around the heel, forward of the instep region on opposite sides of the ankle, and toward and around the toe. The wrap overlaps along a slit edge 406 and may be secured in place by a strap 405 which may be a cooperating Velcro® type material. An antenna element 404 is built into the material of the shoe liner in position to surround the ankle for transmission and reception of RF signals.

Figure 7C:
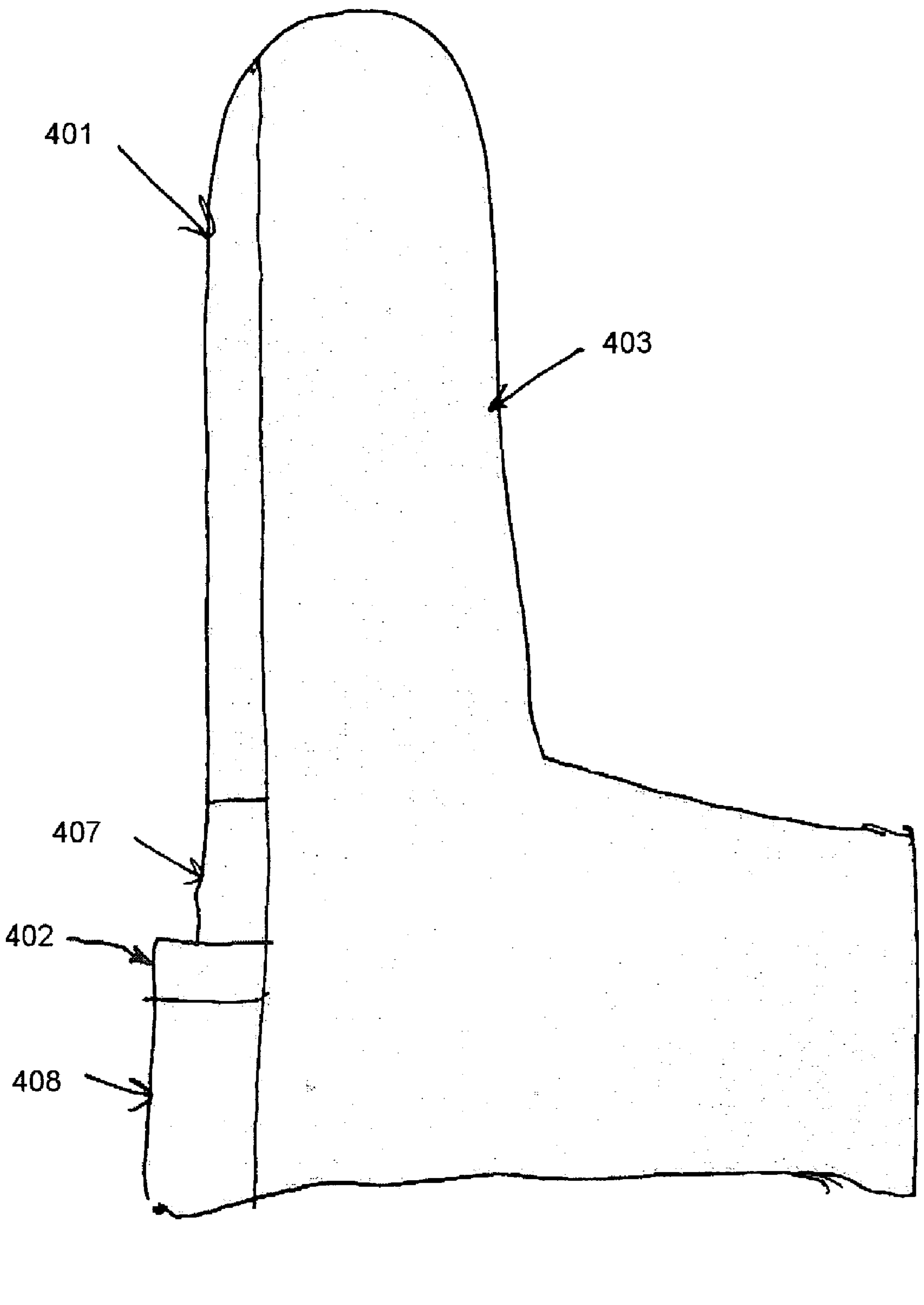

FIG. 7C, the side view of the left foot configuration, illustrates the sole plate unit 401, the electronics package 402, piezo-electric generator element 407, shoe liner 403, and heel section 408.

Figure 7D:
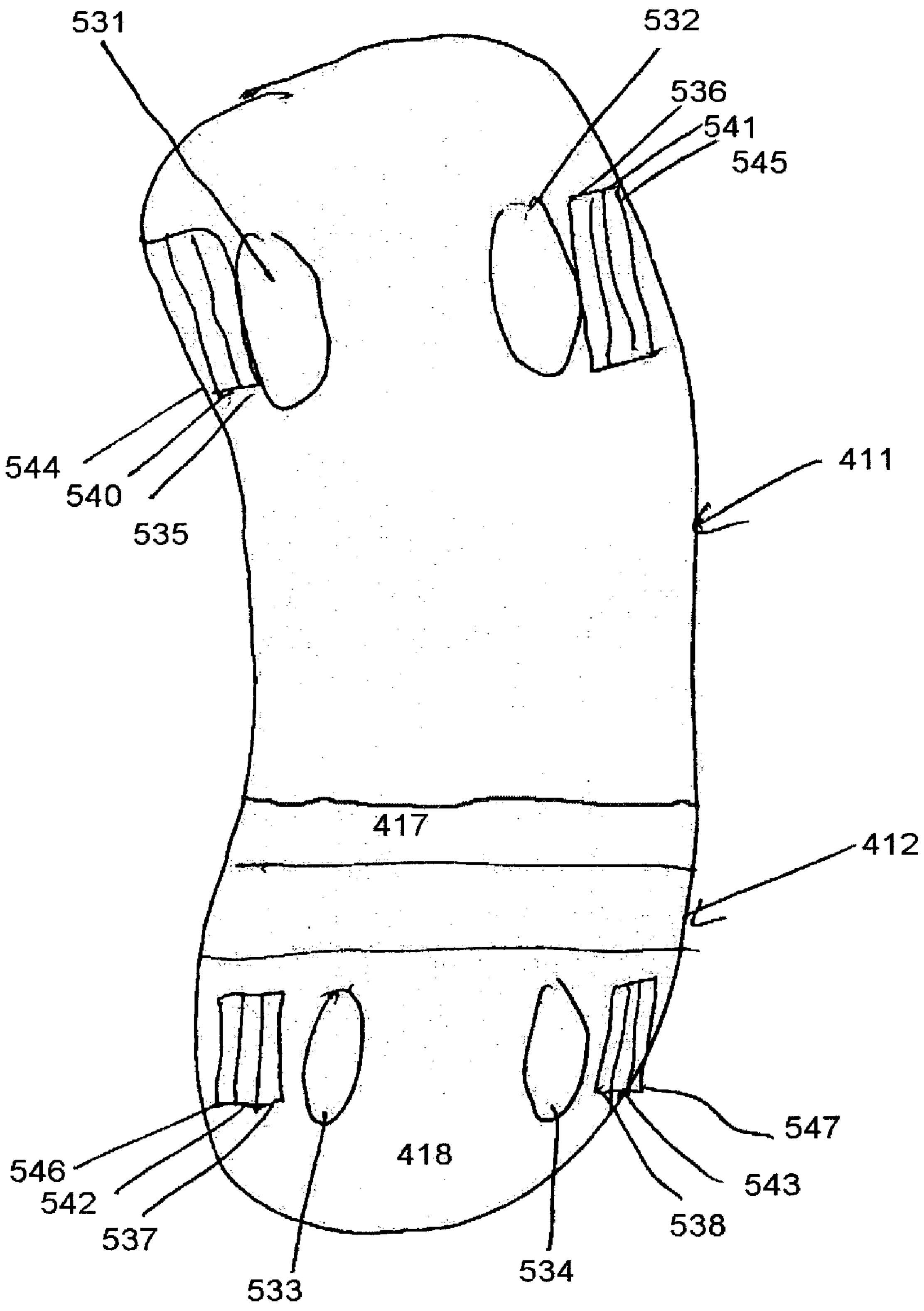
Figure 7E:
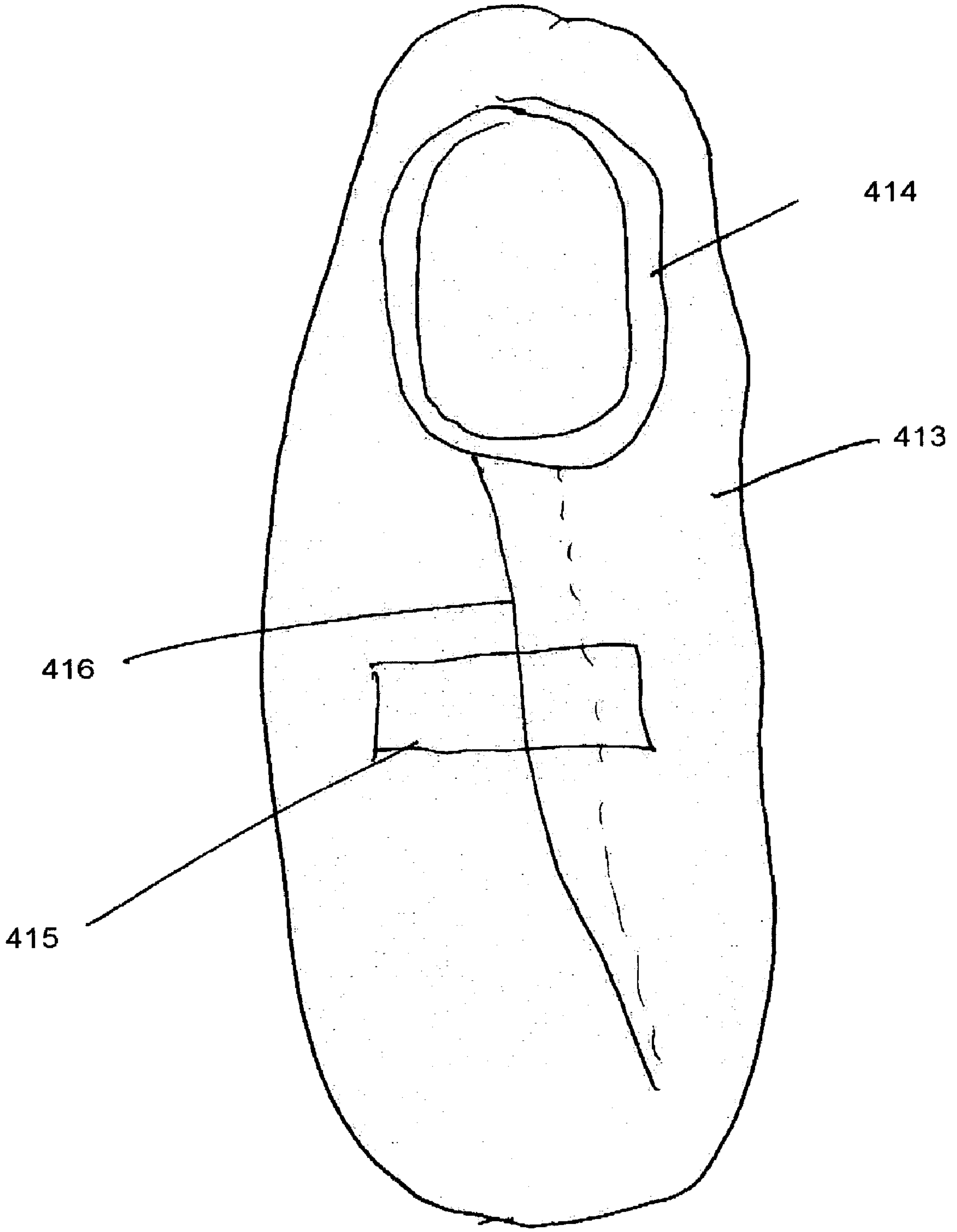
Figure 7F:
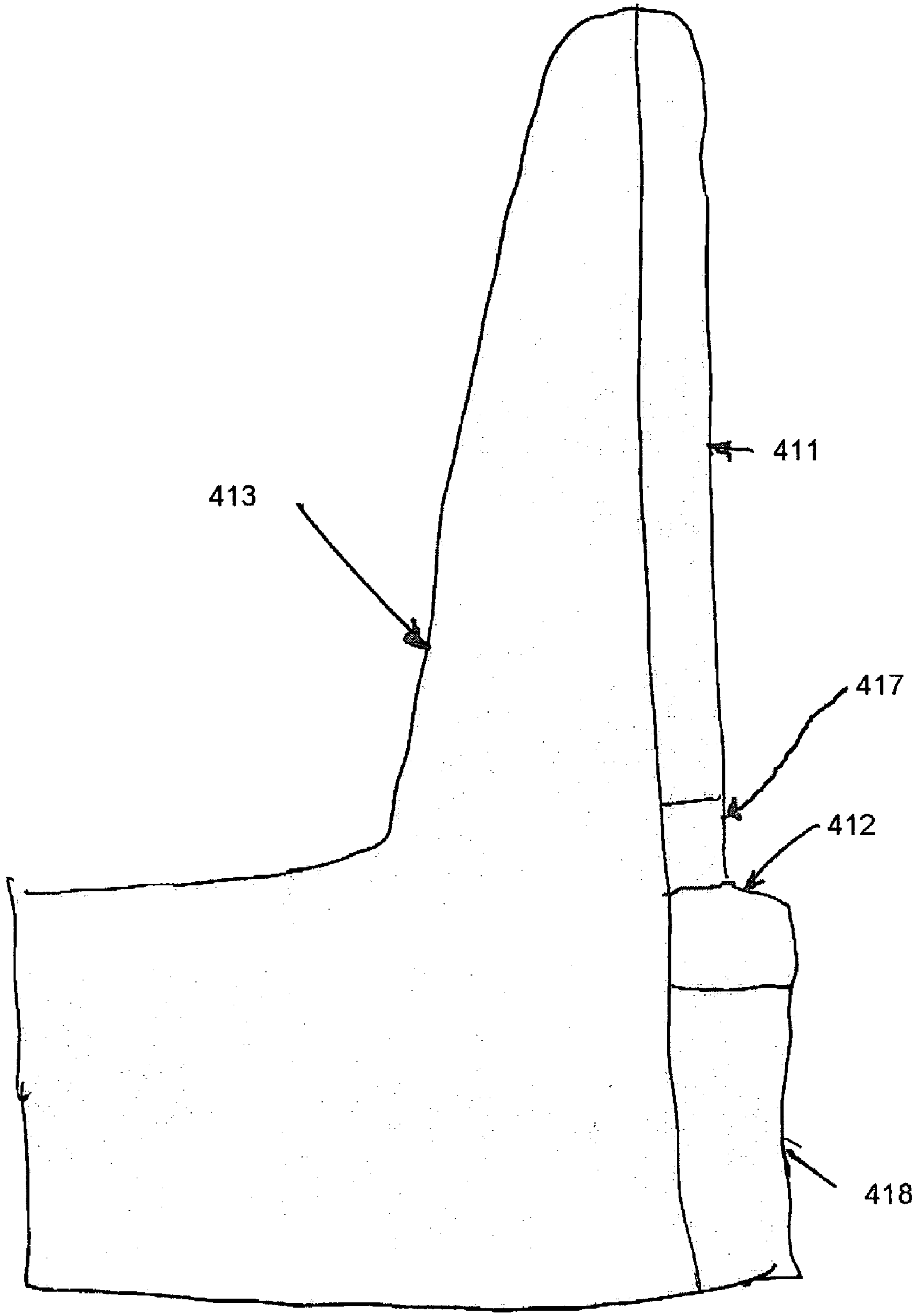

FIGS. 7D-7F illustrate the right shoe, duplicating exactly, except for the different foot, the illustrations off FIGS. 7A-7C and the previous discussion of several structural configurations, the location of structure, and both the purposes and aims achieved by the structures. To this end, FIG. 7D illustrates the bottom surface of a shoe-like portion (particularly the right shoe-like portion, hereafter referred to as the "right shoe"). A sole plate is supported by the right shoe and, in turn, supports in an embedded manner a plurality of sensors, each at critical locations, capable of generating information used in the control of operation of the walker apparatus in the virtual mode configuration of the present invention.

As discussed, a sole plate 411 supports front and rear sensors 531, 532, and 533, 534, front and rear X-axis accelerometer sensors 535, 536, and 537, 538, front and rear Y-axis 540, 541 and 542, 543, and Z-axis accelerometer sensors 544, 545 and 546, 547. In addition, sole plate supports a piezo-electric generator element 417 and an electronics package 412.

FIG. 7E duplicates FIG. 7B and illustrates the right shoe and shoe liner 413. The shoe liner 413, the manner of attachment of the wrap at 415, and the antenna element 414 each duplicate similar structure and functions as illustrated and described in FIG. 7B. FIG. 7F duplicates FIG. 7C and illustrates a side view of the right foot configuration including sole plate 411, the electronics package 412 and piezo-electric generator element 417, both embedded in the sole plate 411, shoe liner 413, and heel section 418.

Figure 8A:
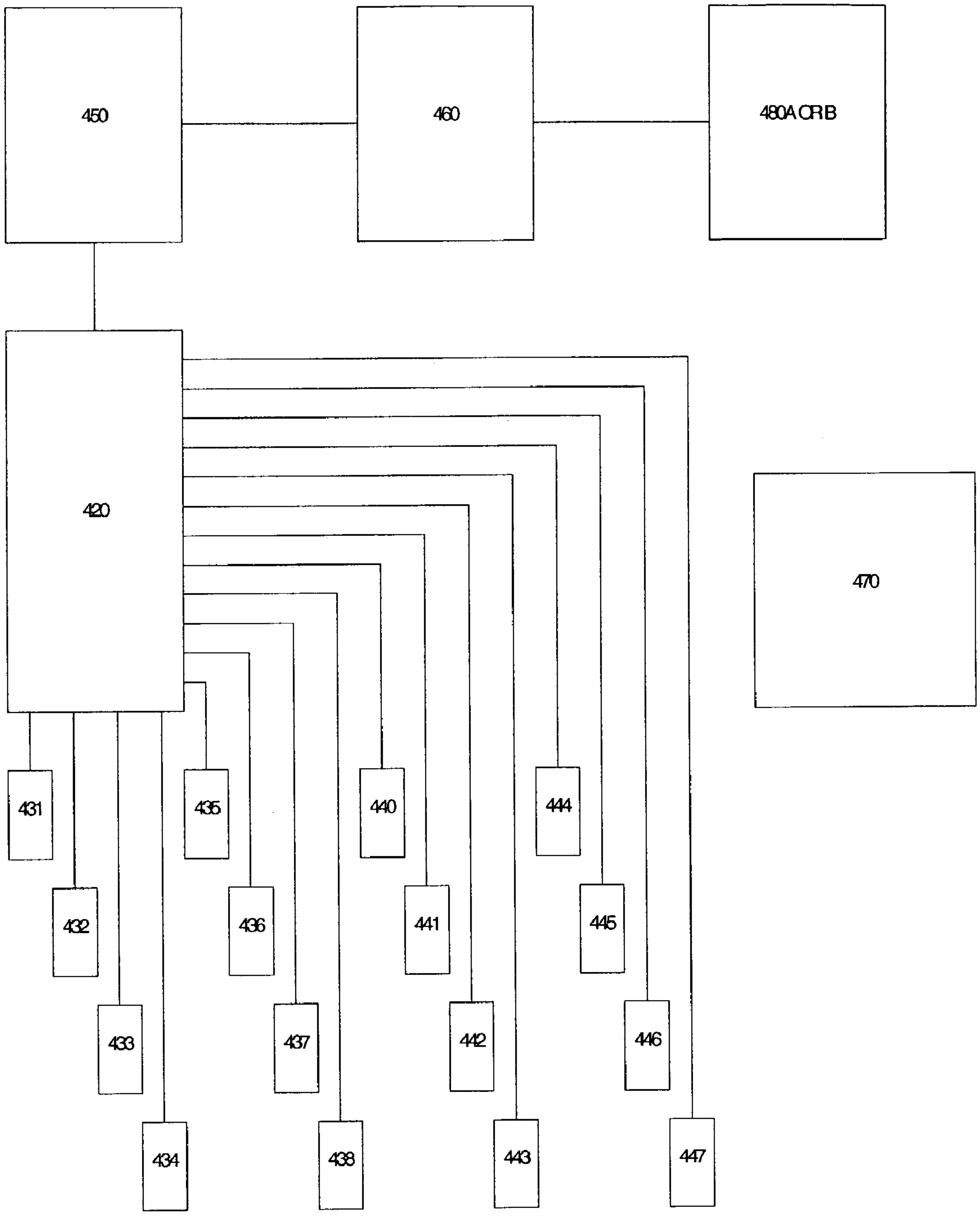

FIG. 8A is a block diagram for the left foot electronics package configuration. Signals from the several sensors, left foot, and both the front and rear locations, including pressure sensors 431, . . . , X-axis accelerometer sensors 435, . . . , Y-axis accelerometer sensors 441, . . . , and Z-axis accelerometer sensors 444, . . . are connected to a sensor input sub-system 420. The outputs from the sensor sub-system 420 in turn are connected to either IR transmitter unit 480A or RF transmitter unit 480B through controller sub-system 450 and encoder sub-system 460. Power sub-system provides the necessary energy to operate the electronics package 402.

Figure 8B:
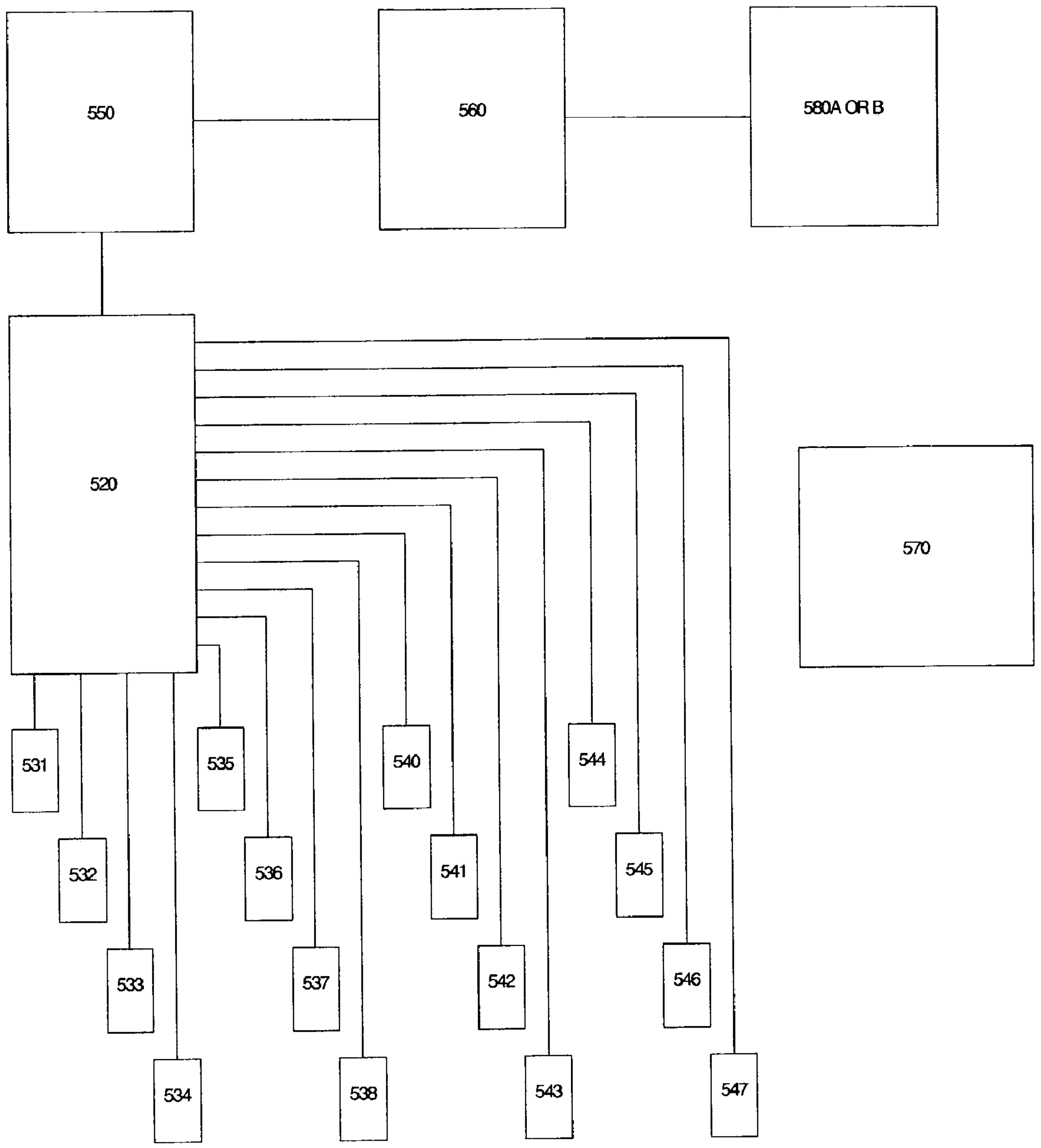

FIG. 8B is a block diagram for the right foot electronics package configuration. Signals from the several sensors, right foot, and both the front and rear locations, including pressure sensors 531, . . . , X-axis accelerometer sensors 535, . . . , Y-axis accelerometer sensors 541, . . . , and Z-axis accelerometer sensors 544, . . . are connected to a sensor input sub-system 520. The outputs from the sensor sub-system 520 in turn are connected to either IR transmitter unit 580A or RF transmitter unit 580B through controller sub-system 550 and encoder sub-system 560. Power sub-system provides the necessary energy to operate the electronics package 412.

Figure 9A:
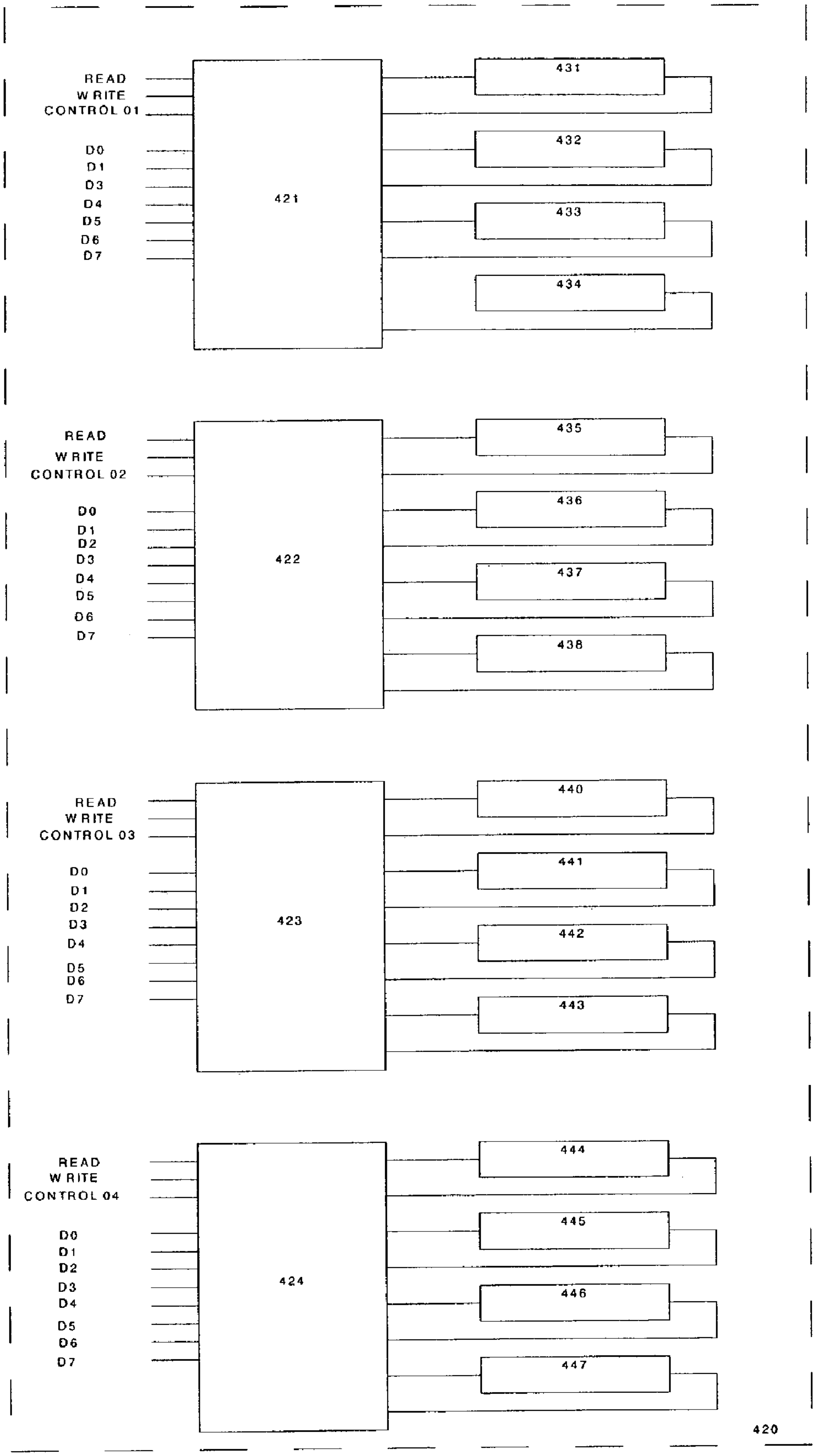

FIG. 9A is a block diagram of the sensor input to sub-system 420 generated by the sensors supported on the left foot. Sensor signals from the pressure sensors 431-434 are connected to input buffer unit 421, sensor signals from X-axis accelerometer sensors 435-438 are connected to input buffer unit 422, sensor signals from Y-axis accelerometers 440-443 are connected to input buffer unit 423, and sensor signals from Z-axis accelerometer sensors 444-447 are connected to input buffer unit 424. These sensors generate varying DC voltages, which relate linearly to the pressure that is applied to each sensor, mounted respectively to the front and rear of the insole plate unit 401.

Figure 9B:
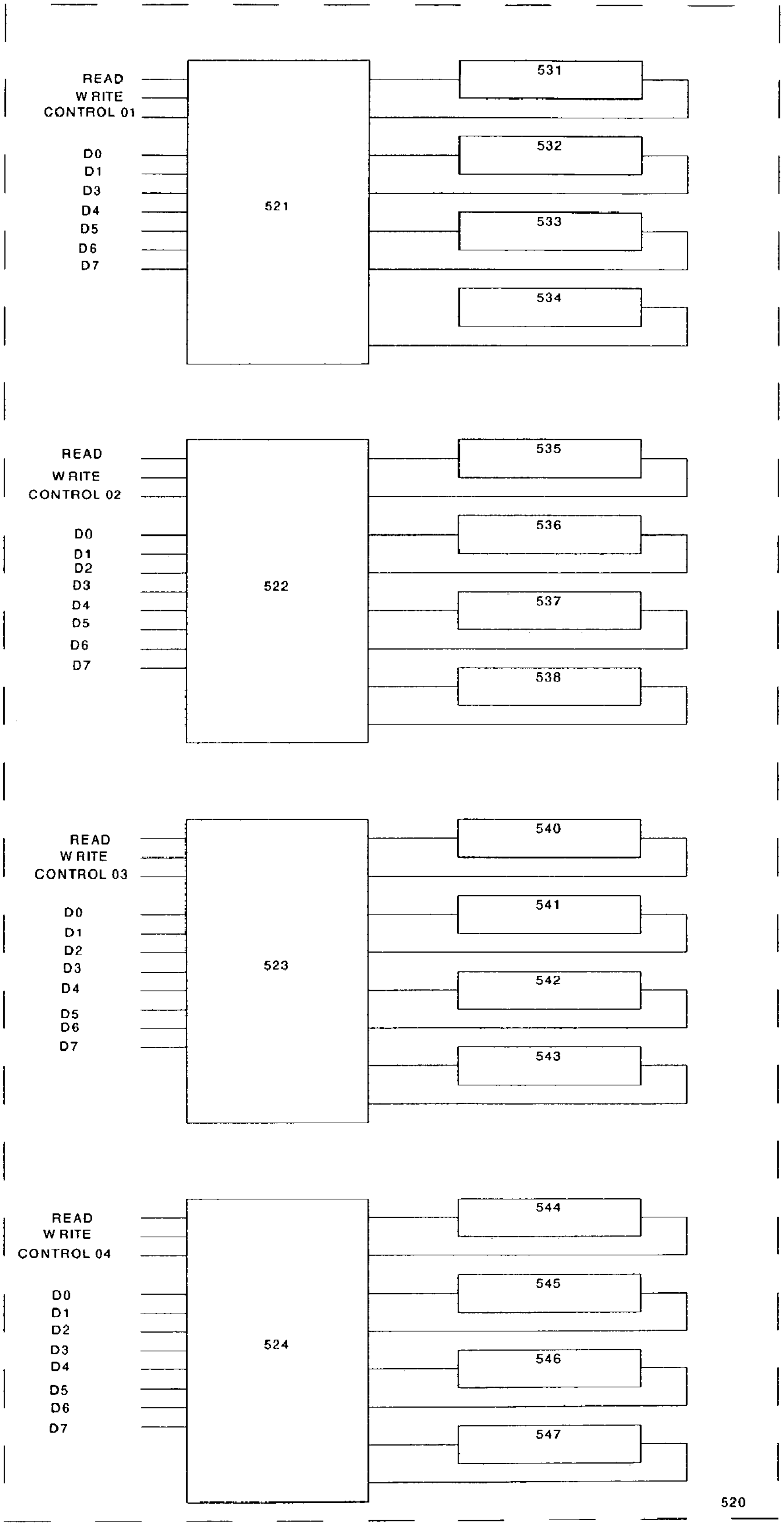

FIG. 9B is a block diagram of the sensor input to sub-system 520 generated by the sensors supported on the right foot. Sensor signals from the pressure sensors 531-534 are connected to input buffer unit 521, sensor signals from X-axis accelerometer sensors 535-538 are connected to input buffer unit 522, sensor signals from Y-axis accelerometers 540-543 are connected to input buffer unit 523, and sensor signals from Z-axis accelerometer sensors 544-547 are connected to input buffer unit 524. These sensors generate varying DC voltages, which relate linearly to the pressure that is applied to each sensor, mounted respectively to the front and rear of the insole plate unit 411.

Figure 10A:
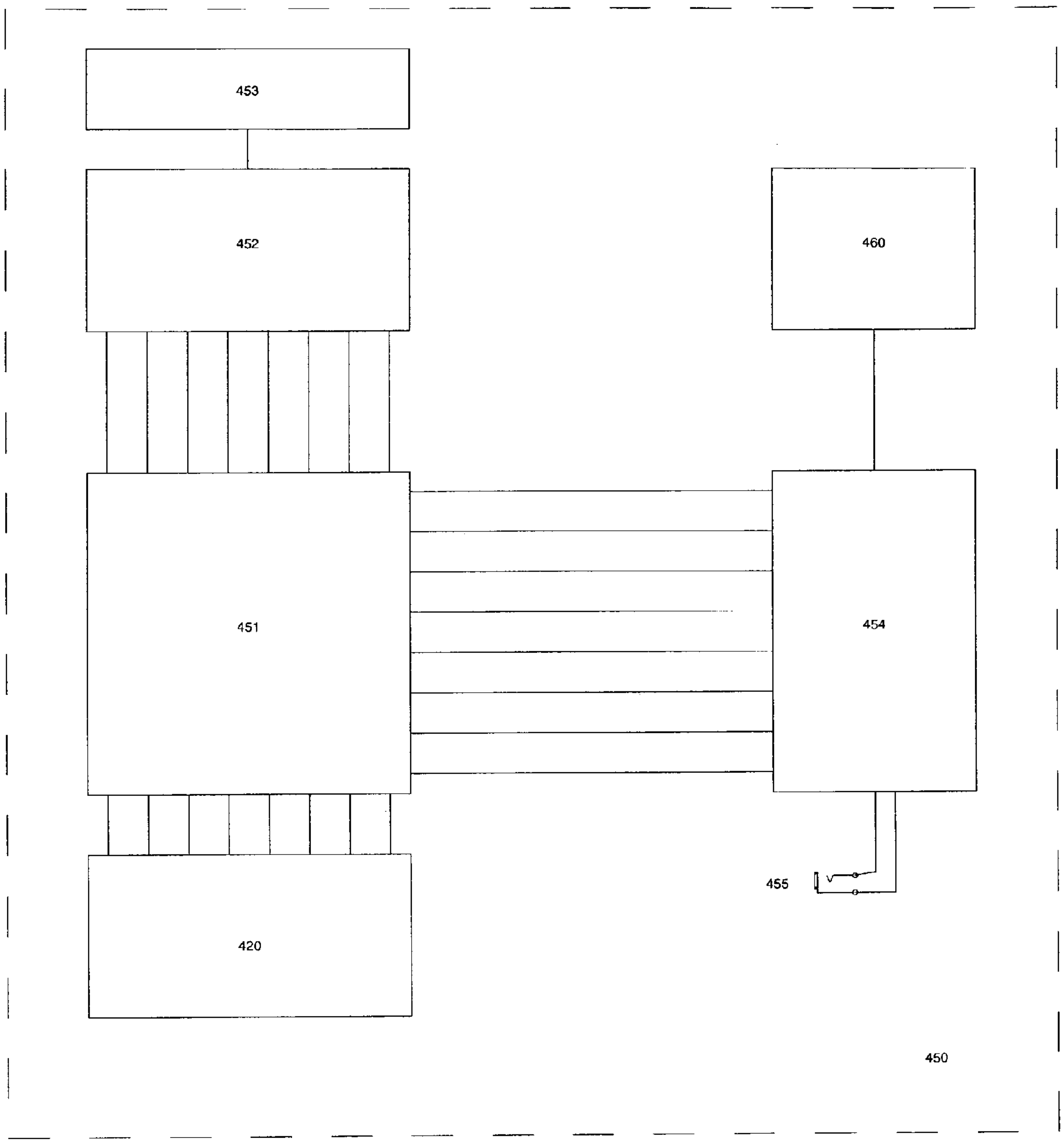

FIG. 10A is a block diagram of the operation of controller sub-system 450 in response to the signals generated by the sensors in the left shoe. Sensor signals within the sensor input sub-system 420 convert the DC voltage analog signals into parallel digital signals, which are then connected to the microprocessor unit 451. Computer programs are stored in memory unit 452 which process these digital signals from the sensor and generate gait parameters which are stored in memory unit 452 or are transferred to UART unit 454. The 555-timer unit 453 provides timing for the microprocessor unit 451 and sleep mode control for the electronics package 402. The microprocessor unit 451 interfaces with encoder sub-system 460 by means of the UART unit 454. The microprocessor can be directly accessed via the input/output jack 455 by means of the UART unit 454, which can provide programming instruction to memory unit 452 or be able to access data from memory unit 452 via the microprocessor 451.

Figure 10B:
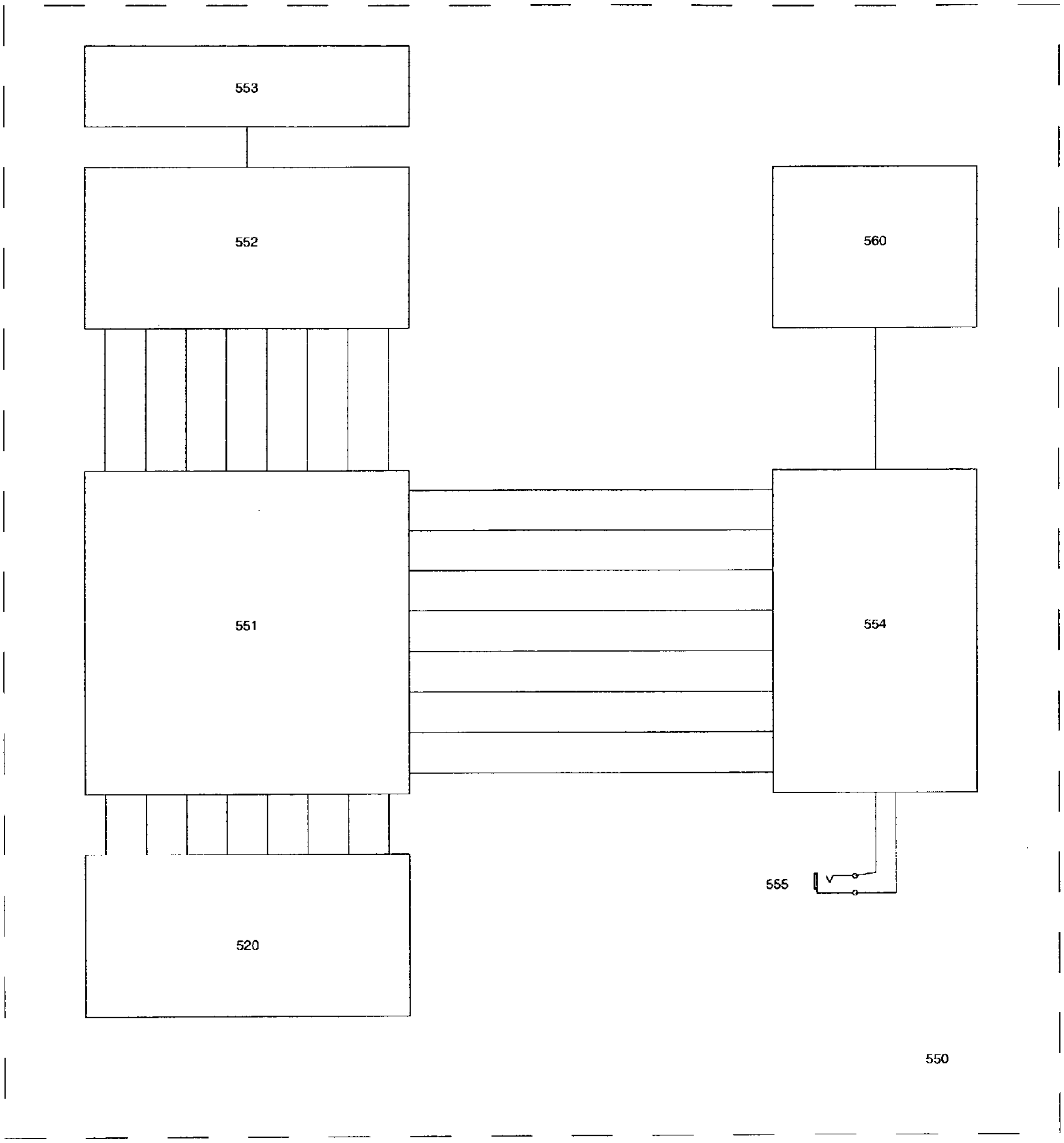

FIG. 10B is a block diagram of the operation of controller sub-system 550 in response to the signals generated by the sensors in the right shoe. Likewise, sensor signals within the sensor input sub-system 520 convert the DC voltage analog signals into parallel digital signals, which are then connected to the microprocessor unit 551. Computer programs are stored in memory unit 552 which process these digital signals from the sensor and generate gait parameters which are stored in memory unit 552 or are transferred to UART unit 554. The 555-timer unit 553 provides timing for the microprocessor unit 551 and sleep mode control for the electronics package 412. The microprocessor unit 551 interfaces with encoder sub-system 560 by means of the UART unit 554. The microprocessor can be directly accessed via the input/output jack 555 by means of the UART unit 554, which can provide programming instruction to memory unit 552 or be able to access data from memory unit 552 via the microprocessor 551.

Figure 11A:
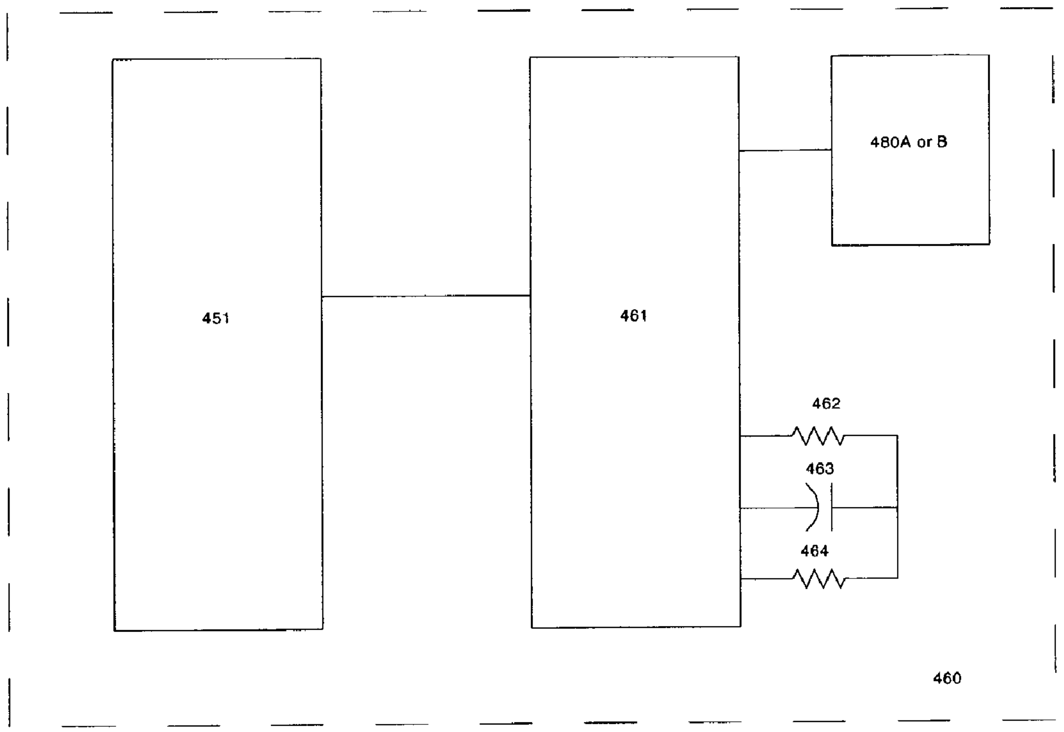

FIG. 11A shows the overall block diagram of the left foot encoder sub-system 460. A microprocessor is connected to remote control encoder unit 461, where resistors 462 and 464 and capacitor 463 set the frequency of the on-chip oscillator which in turns controls the width of the transmitted pulse. The output of the remote control encoder unit 461 is connected to either the IR transmitter sub-system 480A or the RF transmitter sub-system 480B.

Figure 11B:
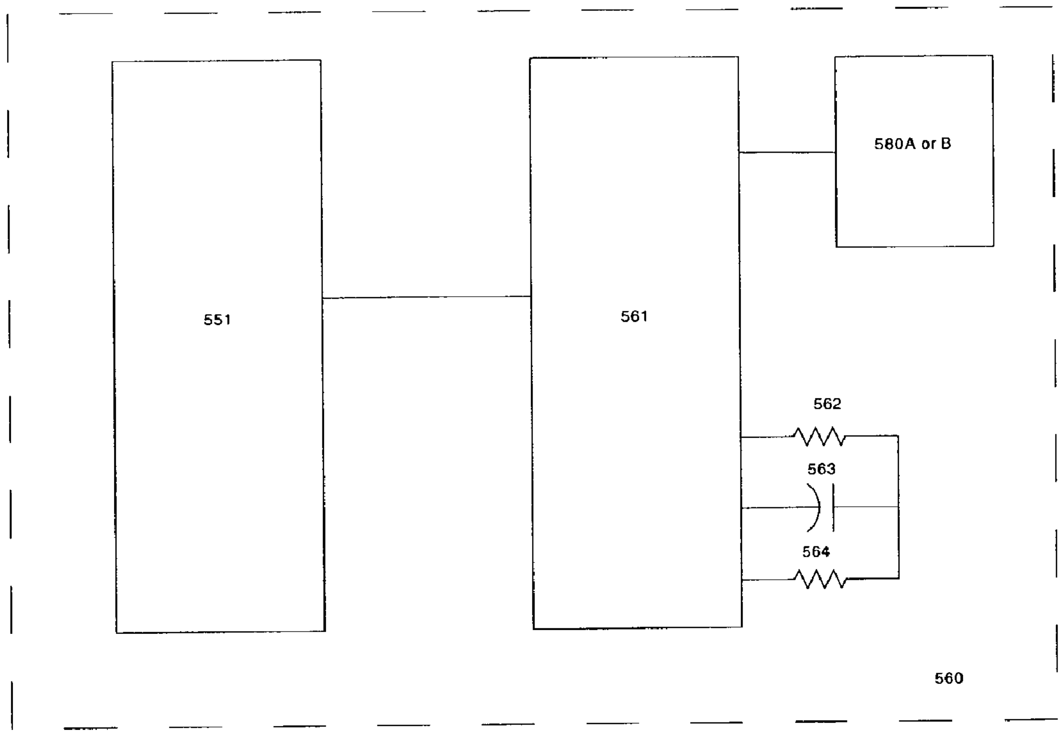

FIG. 11B shows the overall block diagram of the right foot encoder sub-system 560. A microprocessor is connected to remote control encoder unit 561, where resistors 562 and 564 and capacitor 563 set the frequency of the on-chip oscillator which in turns controls the width of the transmitted pulse. The output of the remote control encoder unit 561 is connected to either the IR transmitter sub-system 580A or the RF transmitter sub-system 580B.

Figure 12A:
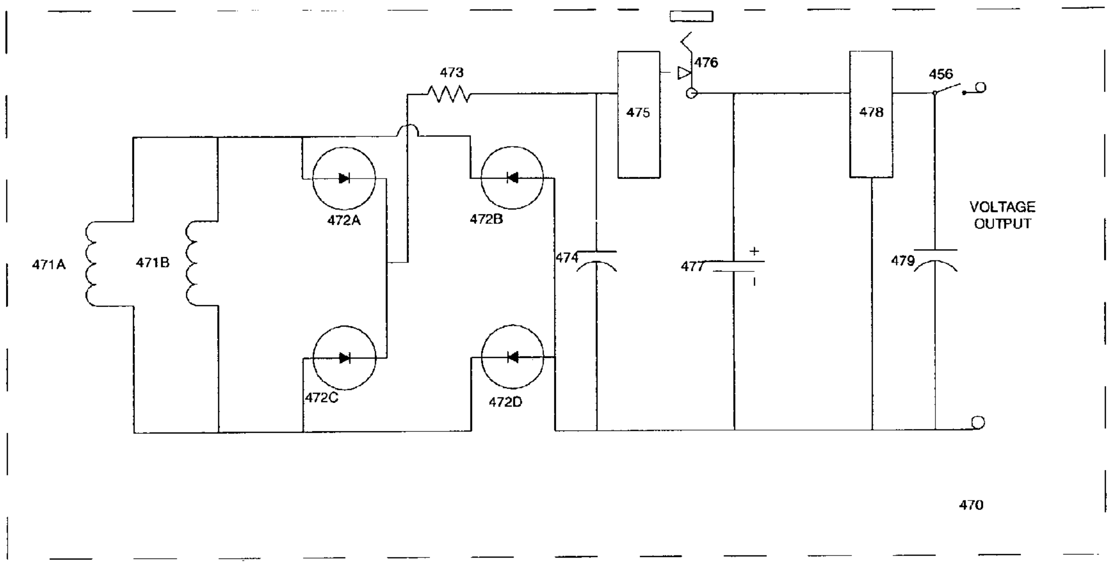

FIG. 12A is the schematic diagram for the power unit 470 for the left foot electronics package 402. Piezo-electric transducer 471A and 471B generate an AC voltage when they are compressed or they expand which is rectified by the bridge diodes 472A, 472B, 472C, and 472D and connected by load resistor 473 to an energy storage capacitor 474. The energy storage capacitor 474 stores the rectified power to a predetermined energy level. At this energy level the output of the energy storage capacitor 474 is connected to voltage regulator unit 475 which is in turn is connected to battery unit 477. Capacitor 474 provides filtering to the rectified DC from energy storage capacitor 474. The battery unit 477 in turn is connected to another voltage regulator unit 478, which is set to provide the correct DC voltage to the electronics package 402. Capacitor 479 provides additional filtering of DC output from voltage regular unit 478. Switch 456 is the on/off switch for the electronics package 402. Jack 476 is the input connector for an external battery-charging unit (not shown).

Figure 12B:
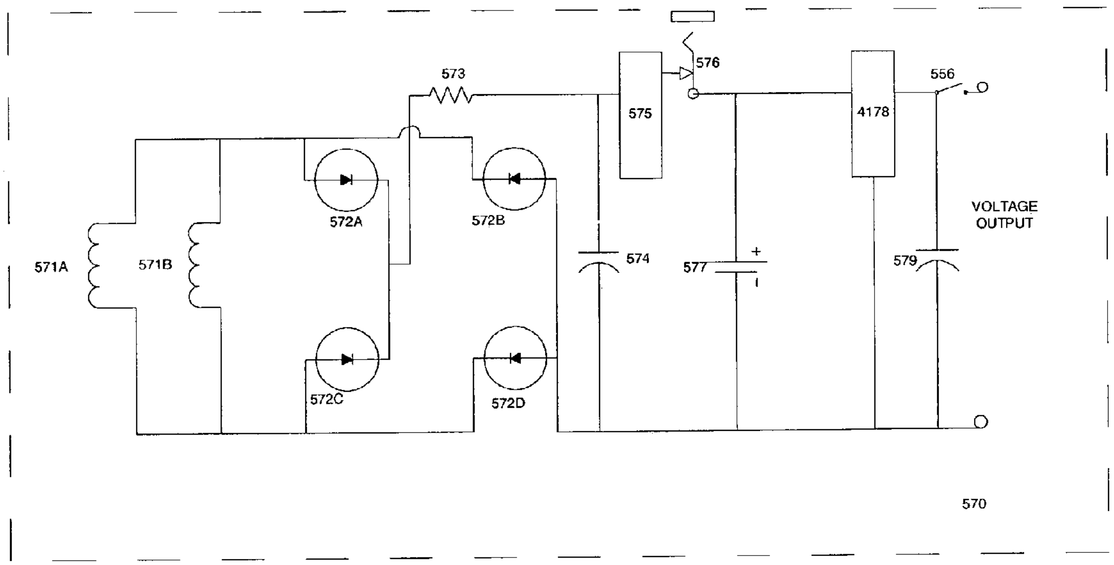

FIG. 12B is the schematic diagram for the power unit 570 for the right foot electronics package 412. Piezo-electric transducer 571A and 571B generate an AC voltage when they are compressed or they expand which is rectified by the bridge diodes 572A, 572B, 572C, and 572D and connected by load resistor 573 to an energy storage capacitor 574. The energy storage capacitor 574 stores the rectified power to a predetermined energy level. At this energy level the output of the energy storage capacitor 574 is connected to voltage regulator unit 575 which is in turn is connected to battery unit 577. Capacitor 574 provides filtering to the rectified DC from energy storage capacitor 574. The battery unit 577 in turn is connected to another voltage regulator unit 578, which is set to provide the correct DC voltage to the electronics package 412. Capacitor 579 provides additional filtering of DC output from voltage regular unit 578. Switch 556 is the on/off switch for the electronics package 412. Jack 576 is the input connector for an external battery-charging unit (not shown).

Figure 13A:
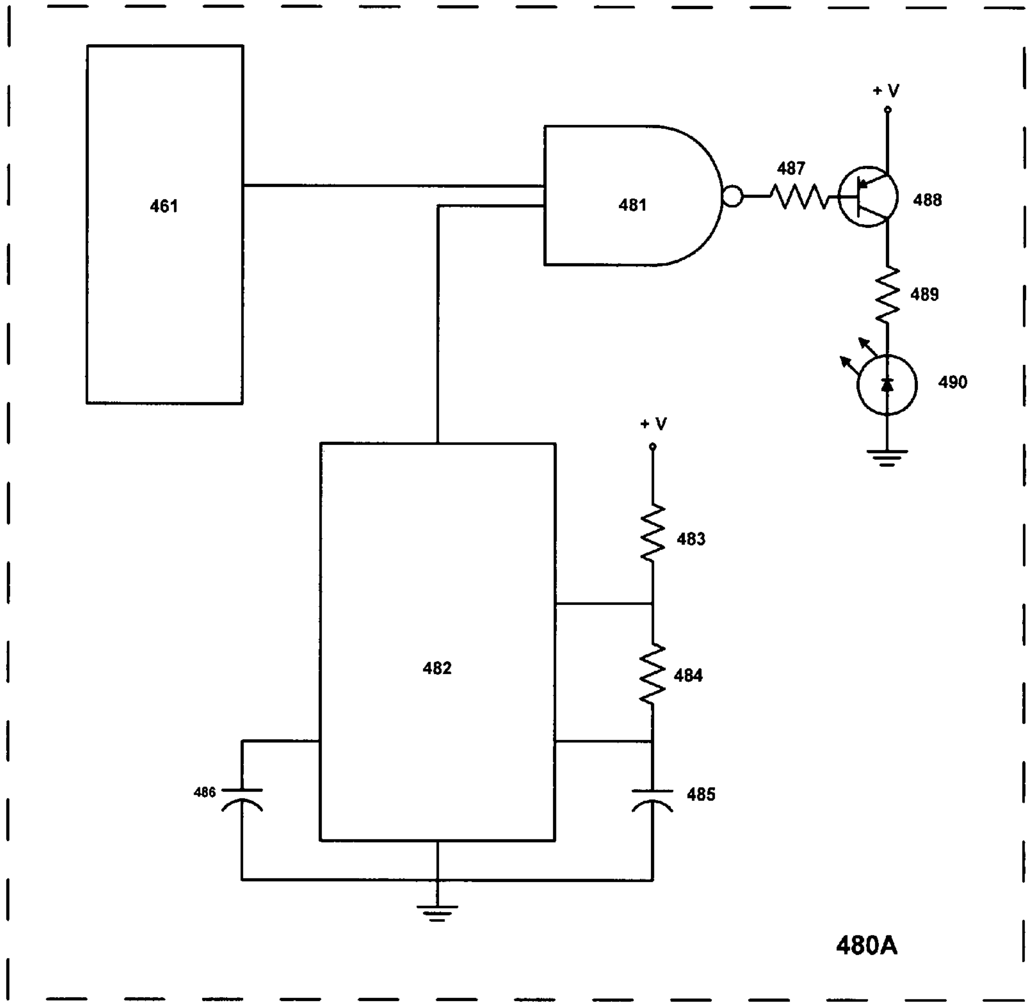

FIG. 13A is the schematic and block diagram of the IR transmitter sub-system 480A for the left foot. The digital output from remote control encoder unit 461 is connected to CMOS NAND gate 481. A timing chip 482 set the modulation rate of the IR transmitter lamp 490. Resistors 483 and 484 and capacitor 485 determine the modulation frequency. Capacitor 486 set the control voltage within the timing chip 482. The output of CMOS NAND 481 is connected to a limiting resistor 487, which is connected to a NPN transistor 488. Resistor 487 limits the base current in the NPN transistor 488. The resistor 489 limits the current through the collector of the NPN transistor 488.

Figure 13B:
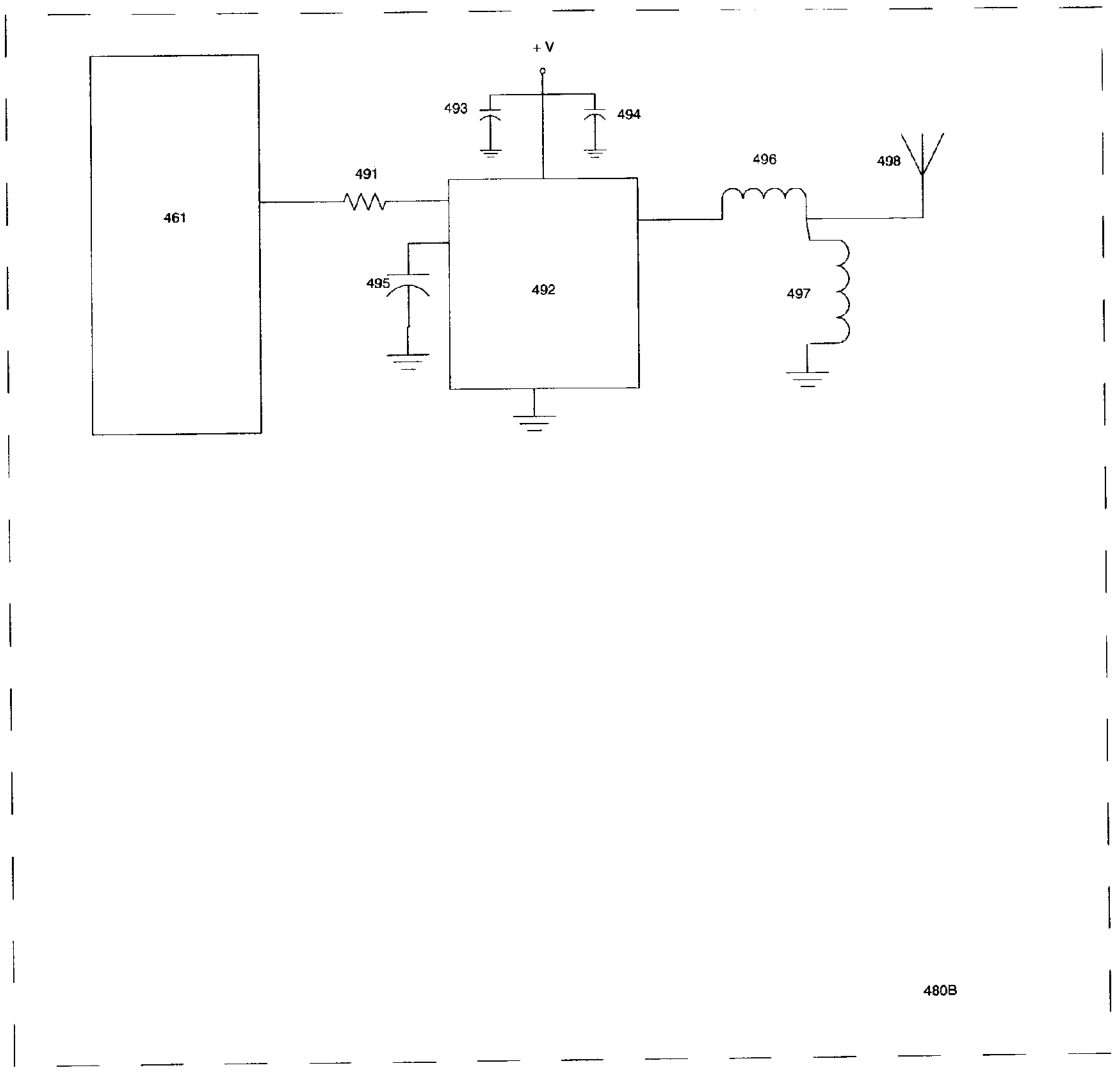

FIG. 13B is the left foot schematic diagram of the RF transmitter unit 480B. The digital output of the remote control encoder unit 461 is connected to RF transmitter unit 492 by coupling resistor 491. While capacitor 493 is the DC bypass capacitor to shunt any unfiltered DC to ground. Capacitors 494 and 495 are RF bypass capacitors to shunt any stray RF. RF coils 496 and 497 are used to tune the antenna element 498. RF coil 497 is used as a shunt-tuning coil, while RF coil 496 is used as a series-tuning coil.

Figure 13C:
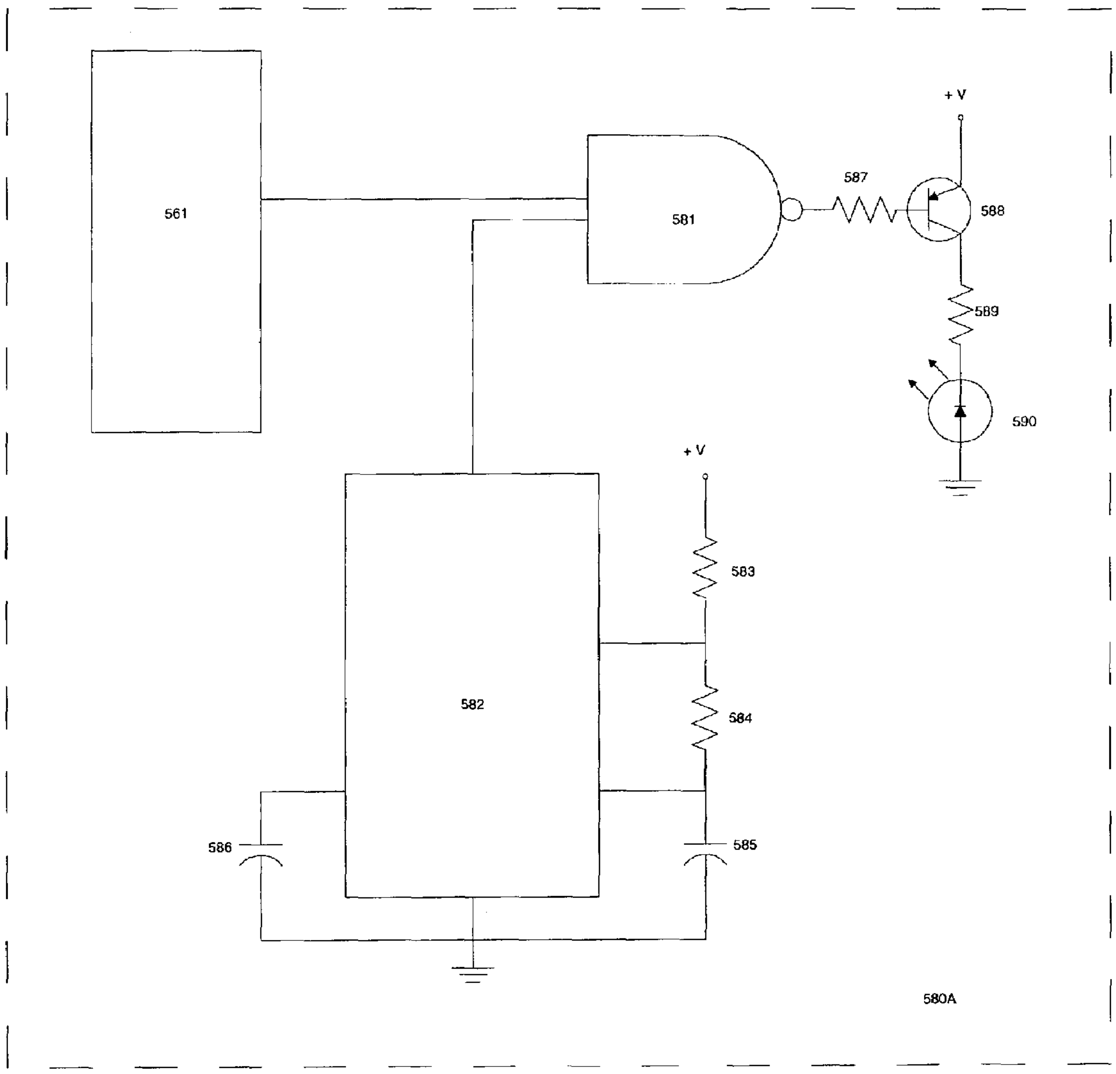

FIG. 13C is the schematic and block diagram of the IR transmitter sub-system 580A for the right foot. The digital output from remote control encoder unit 561 is connected to CMOS NAND gate 581. A timing chip 582 set the modulation rate of the IR transmitter lamp 590. Resistors 583 and 584 and capacitor 585 determine the modulation frequency. Capacitor 586 set the control voltage within the timing chip 582. The output of CMOS NAND 581 is connected to a limiting resistor 587, which is connected to a NPN transistor 588. Resistor 587 limits the base current in the NPN transistor 588. The resistor 589 limits the current through the collector of the NPN transistor 588.

Figure 13D:
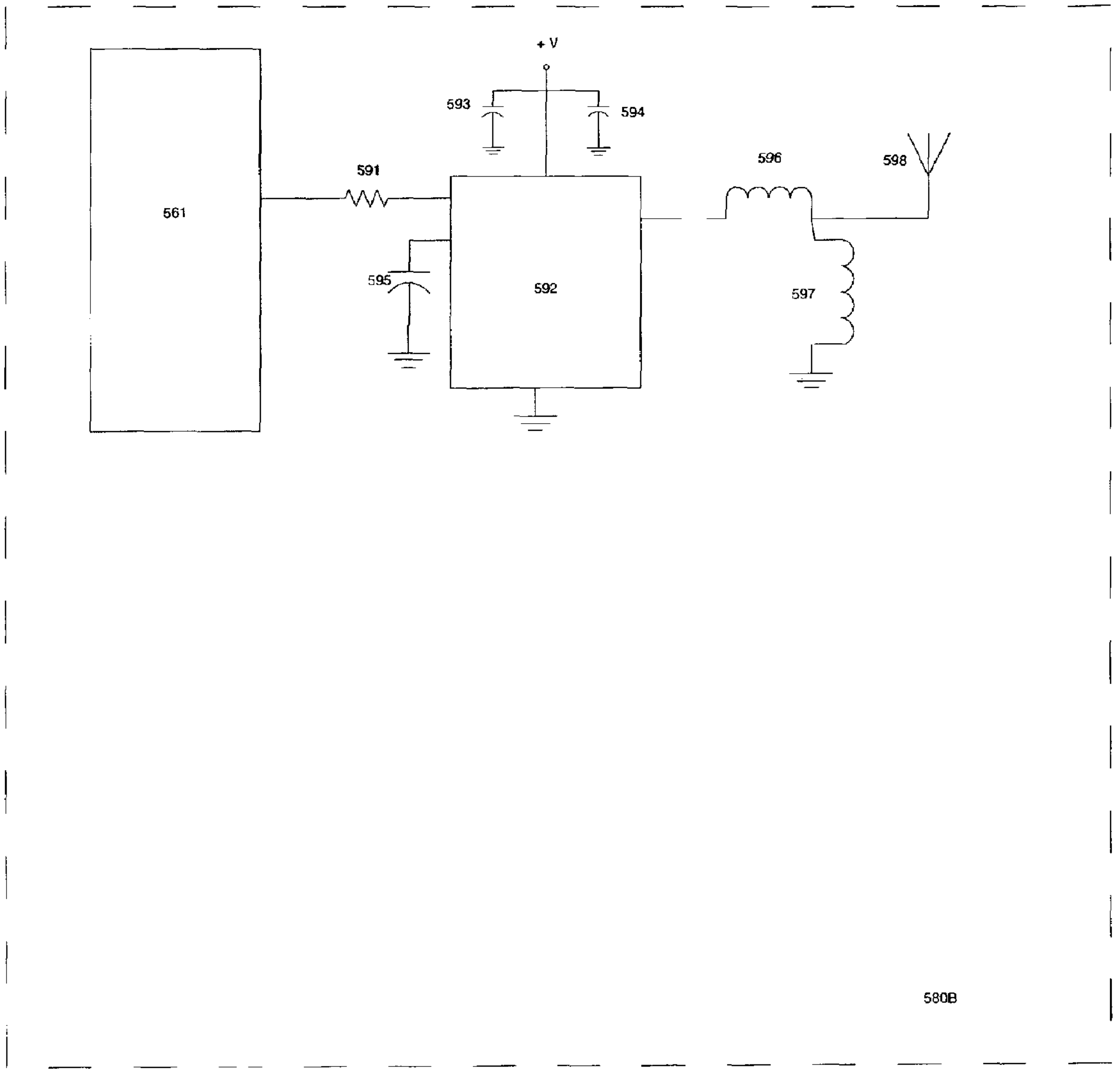

FIG. 13D is the right foot schematic diagram of the RF transmitter unit 580B. The digital output of the remote control encoder unit 561 is connected to RF transmitter unit 592 by coupling resistor 591. While capacitor 593 is the DC bypass capacitor to shunt any unfiltered DC to ground. Capacitors 594 and 595 are RF bypass capacitors to shunt any stray RF. RF coils 596 and 597 are used to tune the antenna element 598. RF coil 597 is used as a shunt-tuning coil, while RF coil 596 is used as a series-tuning coil.

Figure 14A:
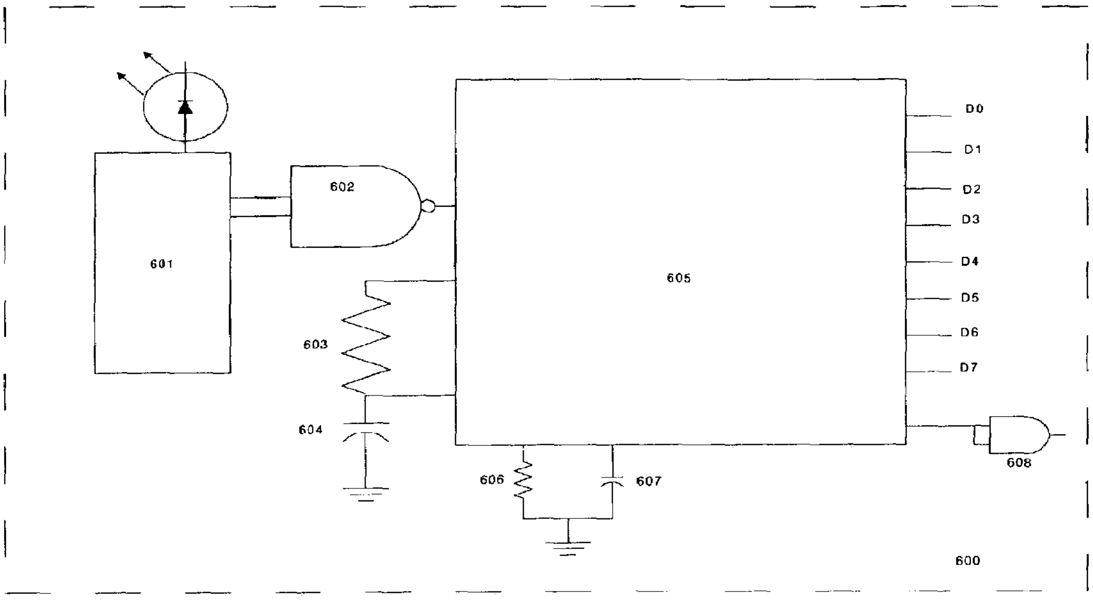

FIG. 14A is the schematic diagram of the remote IR receiver unit 600. The IR signals from the IR transmitters units 480A and 580A are detected by IR receiver module 601 and outputted to a NAND gate 602 which is connected to the remote control decoder unit 605. In order to match the IR transmitter oscillator frequency, resistor 603 and capacitor 604 set the timing that discriminates between narrow and wide pulses. Resistor 606 and capacitor 607 set the timing that detects the end of an encoded word and the end of a transmission. The output from the remote control decoder unit 605 is connected to a microprocessor 631.

Figure 14B:
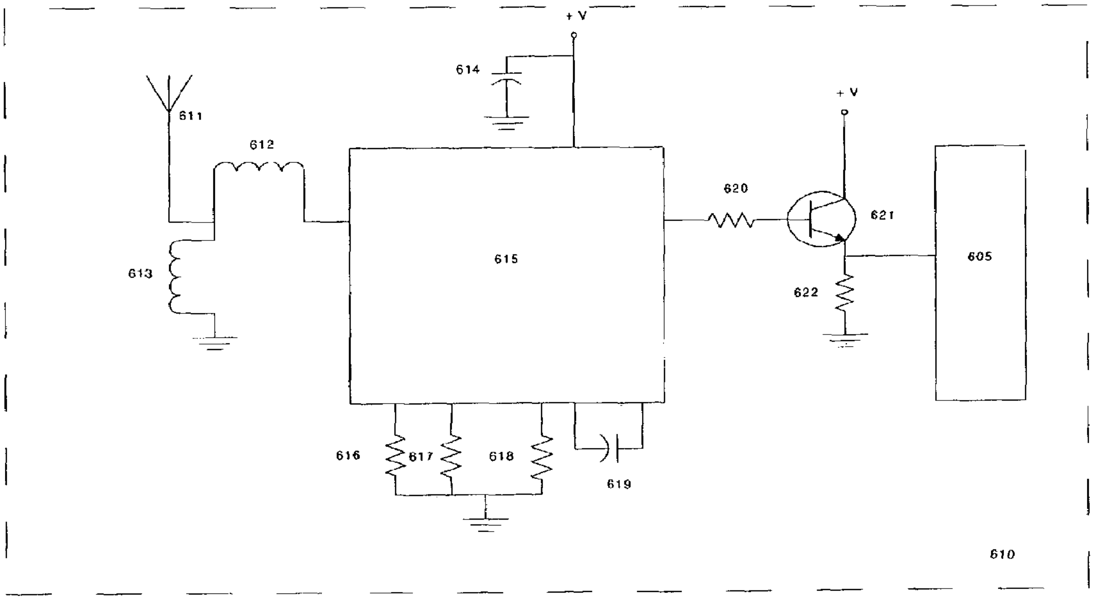

FIG. 14B is the remote RF receiver unit 610. The digital outputs from the RF transmitter units 480B and 580B are detected antenna 611, which is then connected to the RF tuning coils 612 and 613. RF coil 613 is used as a shunt-tuning coil, while RF coil 612 is used as a series-tuning coil. The output is the feed into receiver module 615. The output is the connected to a coupling resistor 620, which in turn is connected to a bipolar NPN transistor 621, a buffer amplifier, which provides buffering between the receiver module 615 and the remote control encoder unit 605. This in turn is connected to microprocessor unit 631. Resistor 622 is the current limiter in buffer amplifier 621. Capacitor 614 is to provide as a RF bypass. Capacitor 619 provides coupling of internal components within the receiver module 615. Resistor 616 sets the modulated pulse rate, while resistor 617 sets the modulated pulse width. Resistor 618 sets the low pass filter circuit.

Figure 15:
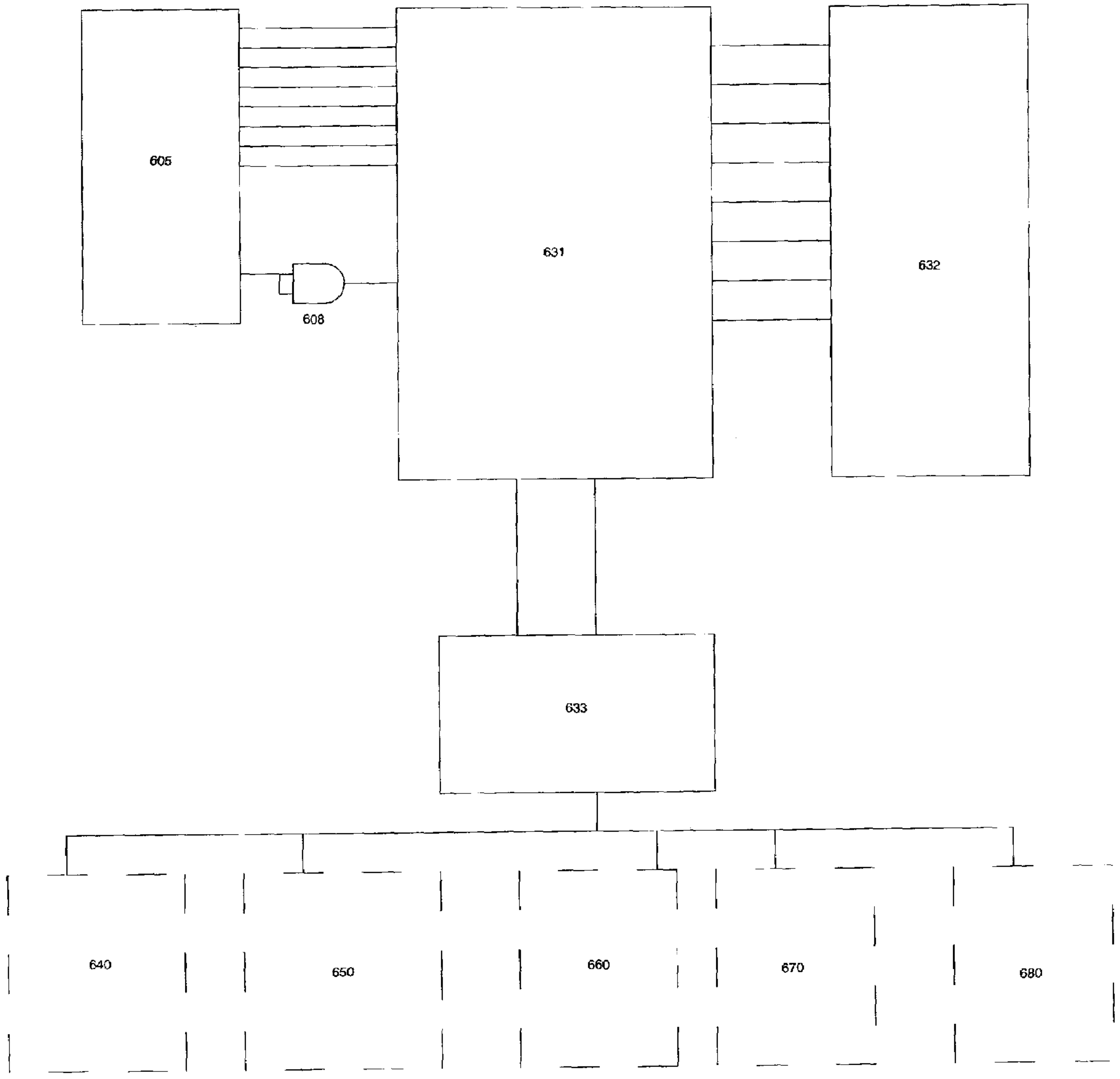
FIG. 15 is the block diagram for the remote processing sub-system configuration.

FIG. 15 is the block diagram for the remote electronics configuration for the apparatus. The remote electronics configuration of the apparatus comprises of digital and control inputs from the remote decoder units 605 and 608, which is connected to microprocessor 631. Programming and data storage is provided by memory unit 632. Outputs from the microprocessor unit 631 are connected to UART 633, which in turn is connected to several choices of outputting devices. These include cassette recorder unit 640 or solid state recorder 650 or remote storage device 670 or remote computer terminal 660 or virtual walker 680.

The remote computer terminal 660 allows a qualified practitioner to program the microprocessor unit(s) 431, 531 and/or 631 for specific settings for the control of the apparatus by the user. The input/output UART unit 633 provides a communication path for transferring data to and from the microprocessor unit 631.

The microprocessor units 431, 531 and 631 have memory in the form of a multi-section storage memory. The memory stores at least one program that dictates the desired maximum speed of the apparatus. The microprocessor memory can also store a plurality of programs of different parameters, where the programs are selectable automatically or external inputs via the remote computer terminal 633 inputs. The programs are preferably stored in secure memory. Alternately, the microprocessor units 431, 531 and 631 can be programmed by an external programming source to adjust the parameters by which the apparatus will operate. The external programming will come via some external-programming source such as an external computer. This allows a qualified practitioner to program the microprocessor for specific needs of the user. Data of interest to the clinician (such as user's stride, force differentials between limbs and etc.) is stored in data storage units 640, 650 and/or remote computer terminal 660.

All RF transmissions are subject to noise, interference and fading. Most short-range RF wireless data communications use some form of packet protocol to automatically assure information is received correctly at the correct destination. A packet generally includes a preamble, a start symbol, routing instruction, packet ID, message segment, error correct bits, and other information (if required). Various correction schemes can be employed to minimize transmission errors.

In describing the invention, reference has been made to a preferred embodiment and illustrative advantages of the invention. Those skilled in the art, however, and familiar with the instant disclosure of the subject invention, may recognize that numerous other modifications, variations, and adaptations may be made without departing from the scope of the invention. With these modifications, variations and adaptations can be applied to the various units within the apparatus.

I claim:

1. A walker apparatus comprising a frame, said frame having a handle portion adapted to be gripped by a user during ambulatory movement following said walker apparatus, a plurality of wheels, mounting means mounting each wheel on said frame, a drive mechanism for controlling a direction and speed of movement of said walker apparatus, connecting means connecting said drive mechanism to at least one of said plurality of wheels, said drive mechanism operative when said walker apparatus is used, an electrical circuit connected to, for controlling operation of, said drive mechanism, and control means for controlling operation of said electrical circuit, said control means comprising a plurality of sensors located within an outsole portion of a covering for each foot of the user, wherein each said covering for each said foot of the user includes said outsole portion, wherein said outsole portion comprises said plurality of sensors located within said outsole portion, each said sensor arranged in a position within each outsole portion to respond to characteristics that normally are recognized as criteria in a determination of an individual's gait of movement of the user, and said sensors within each outsole portion adapted to provide a continuous signal controlling said electrical circuit and said drive mechanism indicative of a total response of said sensors over time, including any change in response that may occur indicative of a change in said gait of movement.

2. The walker apparatus of claim 1 wherein said control means further comprises a pair of shoes each having a sole plate portion, a heel section, outer shoe liner, and electronic means for controlling said walker apparatus.

3. The walker apparatus of claim 1 further comprising electronic means including said sensors and a microprocessor unit including a memory, and input/output modules.

4. The walker apparatus of claim 1 wherein an output signal of each sensor is characterized as a force measurement associated with the gait of movement of the user during walking, turning and/or running sequences.

5. The walker apparatus of claim 1 further comprising a wireless link for relay of an output signal from each said sensor output signal to said control means.

6. The walker apparatus of claim 5 further comprising a microprocessor within said control means, said microprocessor adapted to analyze said output signal of each sensor output and provide guidance and control parameters to said drive mechanism.

7. The walker apparatus of claim 1 wherein said control means comprises a pair of shoes having a sole plate portion, and each of said plurality of sensors comprises a piezo-electric sensor mechanically connected to said sole plate portion for producing a signal representing a force applied to said sole plate.

8. A walker apparatus capable of use with stability in operation both in assisting an individual in movement from a first non-ambulatory disposition to a second ambulatory disposition, and thereafter supporting said individual while in said second disposition for walking movement at a pace and in directions determined by operative conditions of use comprising:

a main frame including first and second legs each having a first end at a forward location and a second end at a rearward location, respectively, of said walker apparatus, said legs toward said rearward location being spaced apart, one to the other, at a distance greater than to a spacing of said legs at said forward location, and a member including opposed upper and lower, surfaces, substantially parallel to one another;

first means for mounting said member on said frame in a manner that said lower surface extends between, and upwardly from, locations along said first and second legs closer to said forward location than said rearward location;

a first and second support, each having a first and second end, for positioning and stabilizing said member on an orientation with said upper surface located within a plane above and substantially parallel to said first and second legs;

second means for mounting said first end of said first and second supports, respectively, to said first and second legs within substantially said forward location of each, and said second end of first and second supports equidistantly spaced from a center-line of said member;

a plurality of wheels for supporting said main frame said wheels arranged in a pattern providing said walker apparatus stability in said operative conditions of use on and along a supporting surface;

third and fourth means for mounting, respectively, one of said wheels of said plurality of wheels on said first and second legs within substantially said rearward location;

fifth means for mounting each remaining wheel of said plurality of wheels and interconnecting said first end of each leg;

first and second lift bar each said lift bar having a first and second end;

sixth and seventh means substantially at said spaced locations along said opposed, upper surface of said member providing a pivot mounting, respectively, for said first end of each lift bar whereby each said lift bar extends toward said rearward location;

handle means carried on said second end of each lift bar adapted to be grasped by said individual;

first and second lift bar drive mechanism, each said first and second lift bar drive mechanism having a first and second end;

eighth means connecting said first end of each said lift bar drive mechanisms to said member at a location below said opposed, upper surface and ninth means connecting said second end of each said lift bar, respectively; and power means for driving each lift bar drive mechanism whereby said second end of each lift bar is capable of movement between indeterminate positions including a position near said surface to another position, above said surface in assisting said individual while grasping each said handle in movement from said first non-ambulatory to said second ambulatory disposition.

9. The walker apparatus of claim 8 wherein both said first and second leg and lift bars each include of individual segments with the segment most at a back from rearward of said walker apparatus adapted to be received telescopically within an adjoining segment, with the two segments received telescopically within the next adjoining segment, and so forth, resulting in a single cluster of segments closer to said forward region of the walker apparatus.

10. The walker apparatus of claim 9 further comprising switch means including on/off capability associated with said pluralities of individual segments to alert said individual to conditions that said individual segments are in non-operative locations not fully clustered or not fully extended.

11. The walker apparatus of claim 8 wherein said main frame includes a substantially rectangular opening defined by a pair of opposed, substantially vertical confronting surfaces, and further comprising a seat having an operative position extending toward said rearward location of said walker apparatus, and a non-operative position within said opening between said surfaces.

12. The walker apparatus of claim 11 wherein said vertical confronting surfaces each define a pair of rails along opposite edges, and further comprising:

a bar, opposite ends of said bar mounted within and movable along said pair of rails;

said seat along an edge adjacent said main frame supported by said bar;

bracket means mounted on said main frame; and a pair of seat braces extending between said bracket means and said seat at spaced locations along the opposite edge.

13. The walker apparatus of claim 8 wherein each leg of said first and second legs extends from said first end at said forward location of said walker apparatus to said second end at said rearward location of said walker apparatus in a pattern generally forming a triangle.

14. The walker apparatus of claim 13 wherein said fifth means mounts only a single wheel in position substantially at an apex of said triangle.

15. The walker apparatus of claim 14 further including a housing member at said forward location, and wherein said fifth means mounts said single wheel to said housing member.

16. The walker apparatus of claim 15 further comprising a pair of non-skid assembly units, tenth means for mounting each non-skid assembly unit to a lower surface of a respective leg substantially at said first end throughout a distance toward said second end, and said fifth means for raising said single wheel whereby said non-skid assembly units support said walker apparatus on a surface supporting said walker apparatus, to stabilize said walker apparatus during said assist of said individual in movement from said first non-ambulatory to said second ambulatory disposition.

17. The walker apparatus of claim 15 wherein said power means drives said wheel, and eleventh means connecting said power means and said wheel.

* * * * *